US011940895B2

(12) United States Patent
Poghosyan et al.

(10) Patent No.: US 11,940,895 B2
(45) Date of Patent: *Mar. 26, 2024

(54) METHODS AND SYSTEMS FOR INTELLIGENT SAMPLING OF APPLICATION TRACES

(71) Applicant: VMware LLC, Palo Alto, CA (US)

(72) Inventors: Arnak Poghosyan, Yerevan (AM); Ashot Nshan Harutyunyan, Yerevan (AM); Naira Movses Grigoryan, Yerevan (AM); Clement Pang, Palo Alto, CA (US); George Oganesyan, Yerevan (AM); Karen Avagyan, Yerevan (AM)

(73) Assignee: VMware LLC, Palo Alto, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/367,490

(22) Filed: Jul. 5, 2021

(65) Prior Publication Data

US 2022/0283924 A1 Sep. 8, 2022

Related U.S. Application Data

(60) Provisional application No. 63/155,349, filed on Mar. 2, 2021.

(51) Int. Cl.
*G06F 11/00* (2006.01)
*G06F 11/07* (2006.01)
*G06F 11/34* (2006.01)

(52) U.S. Cl.
CPC ...... *G06F 11/3466* (2013.01); *G06F 11/0709* (2013.01); *G06F 11/076* (2013.01);
(Continued)

(58) Field of Classification Search
CPC .. G06F 11/079; G06F 11/0709; G06F 11/076; G06F 11/0793; G06F 11/0706;
(Continued)

(56) References Cited

U.S. PATENT DOCUMENTS 6,067,588 A * 5/2000 Ito .................. G06F 11/0703
714/48
9,772,927 B2 * 9/2017 Gounares ........... G06F 3/0484
(Continued)

*Primary Examiner* — Katherine Lin
(74) *Attorney, Agent, or Firm* — Quarles & Brady LLP

(57) ABSTRACT

Computer-implemented methods and systems described herein perform intelligent sampling of application traces generated by an application. Computer-implemented methods and systems determine different sampling rates based on frequency of occurrence of trace types and/or frequency of occurrence of durations of the traces. Each sampling rate corresponds to a different trace type and/or different duration. The sampling rates for low frequency trace types and durations are larger than the sampling rates for high frequency trace types and durations. The relatively larger sampling rates for low frequency trace types and low frequency durations ensures that low frequency trace types and low frequency durations are sampled in sufficient numbers and are not passed over during sampling of the application traces. The set of sampled traces are stored in a data storage device.

24 Claims, 45 Drawing Sheets

(52) U.S. Cl.
CPC ........ *G06F 11/0781* (2013.01); *G06F 11/079* (2013.01); *G06F 11/0793* (2013.01)

(58) Field of Classification Search
CPC ............... G06F 11/0703; G06F 11/008; G06F 11/0754; G06F 11/0751; G06F 11/3466; G06F 11/3495; G06F 11/3476; G06F 11/349; G06F 11/0781; G06F 11/0787; G06F 11/0766
See application file for complete search history.

(56) References Cited

U.S. PATENT DOCUMENTS

| | | | |
|---|---|---|---|
| 11,200,138 B1* | 12/2021 | Wu | G06F 11/3006 |
| 2012/0143795 A1* | 6/2012 | Han | G06F 11/079 |
| | | | 714/E11.029 |
| 2021/0026646 A1* | 1/2021 | Jha | G06F 9/3891 |

* cited by examiner

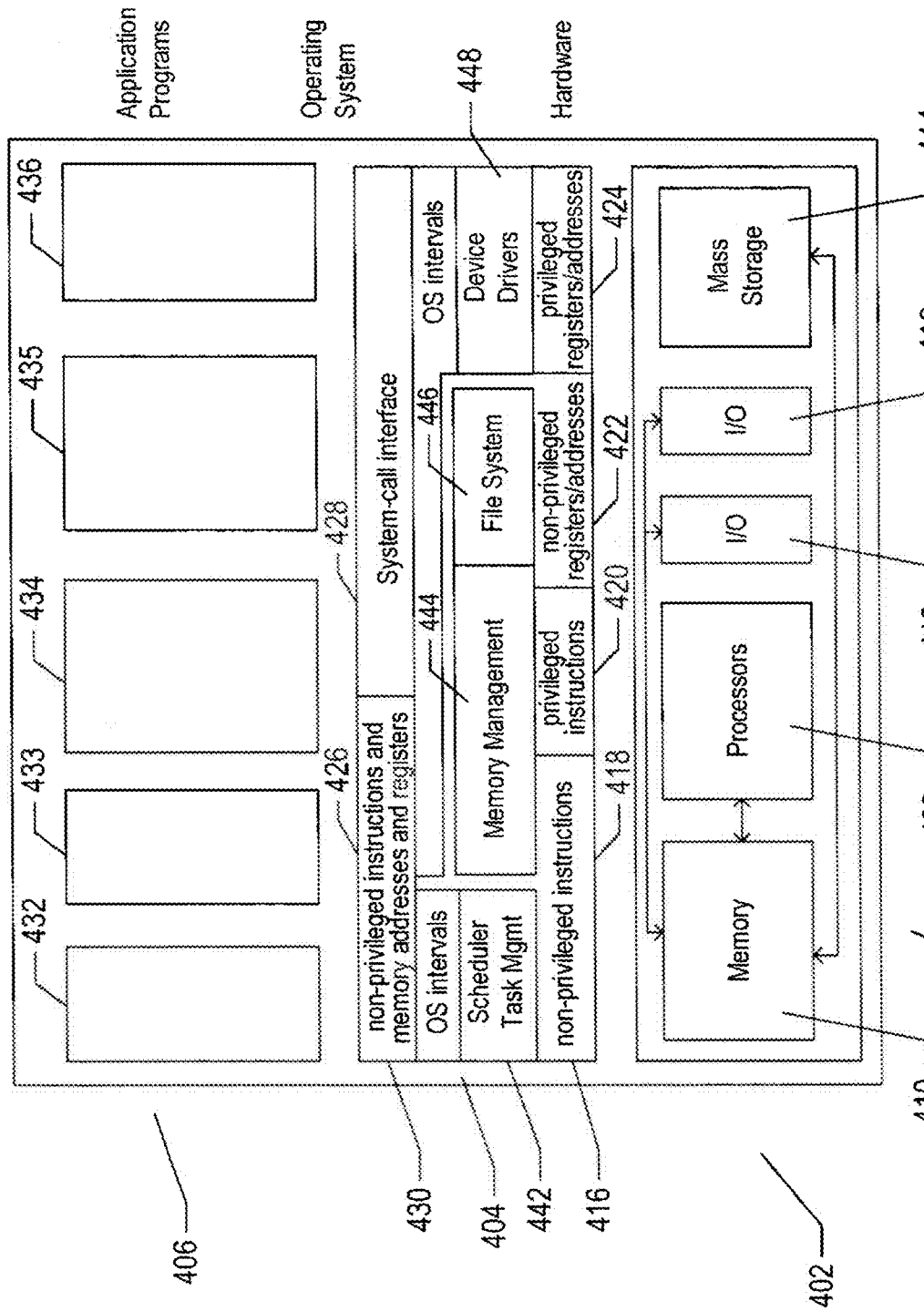

|     | 3410 | 3412 Initial | Pr | 3414 Cons | C% | 3416 Aggr | A% | 3418 Sup-Aggr | SA% |
|-----|------|---------|------|------|-----|------|-----|---------|-----|
| 0   |      | 788     | 0.04 | 758  | 1.0 | 634  | 0.8 | 439     | 0.6 |
| 1   |      | 3996    | 0.20 | 3215 | 0.8 | 2229 | 0.6 | 1339    | 0.3 |
| 2   |      | 3778    | 0.18 | 3080 | 0.8 | 2154 | 0.6 | 1301    | 0.3 |
| 3   |      | 2082    | 0.10 | 1870 | 0.9 | 1418 | 0.7 | 906     | 0.4 |
| 4   |      | 249     | 0.01 | 246  | 1.0 | 222  | 0.9 | 167     | 0.7 |
| 5   |      | 2043    | 0.10 | 1839 | 0.9 | 1397 | 0.7 | 895     | 0.4 |
| 6   |      | 142     | 0.01 | 142  | 1.0 | 131  | 0.9 | 101     | 0.7 |
| 7   |      | 104     | 0.01 | 104  | 1.0 | 97   | 0.9 | 77      | 0.7 |
| 8   |      | 64      | 0.00 | 64   | 1.0 | 61   | 1.0 | 49      | 0.8 |
| 9   |      | 621     | 0.03 | 603  | 1.0 | 513  | 0.8 | 362     | 0.6 |
| 10  |      | 216     | 0.01 | 214  | 1.0 | 194  | 0.9 | 147     | 0.7 |
| 11  |      | 62      | 0.00 | 62   | 1.0 | 59   | 1.0 | 48      | 0.8 |
| 12  |      | 241     | 0.01 | 239  | 1.0 | 215  | 0.9 | 162     | 0.7 |
| 13  |      | 93      | 0.00 | 93   | 1.0 | 87   | 0.9 | 69      | 0.7 |
| 14  |      | 49      | 0.00 | 49   | 1.0 | 47   | 1.0 | 39      | 0.8 |
| 15  |      | 44      | 0.00 | 44   | 1.0 | 42   | 1.0 | 35      | 0.8 |
| 16  |      | 98      | 0.00 | 98   | 1.0 | 92   | 0.9 | 73      | 0.7 |
| 17  |      | 41      | 0.00 | 41   | 1.0 | 40   | 1.0 | 33      | 0.8 |
| 18  |      | 3       | 0.00 | 3    | 1.0 | 3    | 1.0 | 3       | 1.0 |
| 19  |      | 63      | 0.00 | 63   | 1.0 | 60   | 1.0 | 49      | 0.8 |
| 20  |      | 3       | 0.00 | 3    | 1.0 | 3    | 1.0 | 3       | 1.0 |
| 21  |      | 3028    | 0.15 | 2580 | 0.9 | 1863 | 0.6 | 1150    | 0.4 |
| 22  |      | 1413    | 0.07 | 1316 | 0.9 | 1042 | 0.7 | 689     | 0.5 |
| 23  |      | 23      | 0.00 | 23   | 1.0 | 23   | 1.0 | 19      | 0.8 |
| 24  |      | 546     | 0.03 | 532  | 1.0 | 457  | 0.8 | 326     | 0.6 |
| 25  |      | 58      | 0.00 | 58   | 1.0 | 55   | 0.9 | 45      | 0.8 |
| 26  |      | 51      | 0.00 | 51   | 1.0 | 49   | 1.0 | 40      | 0.8 |
| 27  |      | 526     | 0.03 | 513  | 1.0 | 442  | 0.8 | 316     | 0.6 |

****************************************************************

Initial Total Count -> 20425
Total Count After Conservative Sampling -> 17903 :: 87.7 %
Total Count After Aggressive Sampling -> 13629 :: 66.7 %
Total Count After Super-Aggressive Sampling -> 8882 :: 43.5 %

FIG. 34C

```
       3422         3424                      3426          3428            3430
3420 /          /            /             /             /
******************************************************************************
       Durations    Initial    Pr      Cons      C%    Aggr    A%   Sup-Aggr    SA%
0    [     9.   1827.9]   6685   0.33   4498   67.3   2861   42.8     1629   24.4
1    [ 1827.9   3646.7]   5061   0.25   3808   75.2   2542   50.2     1491   29.5
2    [ 3646.7   5465.6]   6328   0.31   4368   69.0   2806   44.3     1607   25.4
3    [ 5465.6   7284.4]     81   0.00     81  100.0     76   93.8       61   75.3
4    [ 7284.4   9103.3]    235   0.01    233   99.1    210   89.4      159   67.7
5    [ 9103.3  10922.1]   1111   0.05   1051   94.6    852   76.7      575   51.8
6    [10922.1  12741. ]    925   0.05    884   95.6    729   78.8      499   53.9
******************************************************************************
Initial Total Count -> 20425
Total Count After Conservative Sampling    -> 14923 :: 73.1%
Total Count After Aggressive Sampling      -> 10076 :: 49.3%
Total Count After Super-Aggressive Sampling ->  6021 :: 29.5%
```

FIG. 34E

#### Trace Type 1

Trace Type\Freq. of Occ. -> 0.2

| Durations | N | Pr | Fin_Pr | C% | A% | Aggr | SA% | Sup-Aggr |
|---|---|---|---|---|---|---|---|---|
| [3271.  3753.4] | 1472 | 0.37 | 0.07 | 0.93 | 0.73 | 1077 | 0.48 | 710 |
| [3753.4 4235.8] | 1524 | 0.38 | 0.07 | 0.93 | 0.73 | 1108 | 0.48 | 728 |
| [4235.8 4718.2] | 639 | 0.16 | 0.03 | 0.97 | 0.82 | 526 | 0.58 | 371 |
| [4718.2 5200.6] | 278 | 0.07 | 0.01 | 0.99 | 0.88 | 246 | 0.66 | 184 |
| [5200.6 5683. ] | 83 | 0.02 | 0.00 | 1.00 | 0.94 | 78 | 0.75 | 63 |

Initial Total Count in a Trace Type -> 3996
Total Count in Trace Type After Conservative Sampling -> 3755 :: Percentage -> 94.0%
Total Count in Trace Type After Aggressive Sampling -> 3035 :: Percentage -> 76.0%
Total Count in Trace Type After Super-Aggressive Sampling -> 2056 :: Percentage -> 51.5%

FIG. 34G

METHODS AND SYSTEMS FOR INTELLIGENT SAMPLING OF APPLICATION TRACES

CROSS-REFERENCE TO RELATED APPLICATION

This application claims the benefit of U.S. Provisional Application No. 63/155,349, filed Mar. 3, 2021.

TECHNICAL FIELD

This disclosure is directed to automated methods and systems for intelligent sampling of application traces.

BACKGROUND

Electronic computing has evolved from primitive, vacuum-tube-based computer systems, initially developed during the 1940s, to modern electronic computing systems in which large numbers of multi-processor computer systems, such as server computers, work stations, and other individual computing systems are networked together with large-capacity data storage devices and other electronic devices to produce geographically distributed computing systems with hundreds of thousands, millions, or more components that provide enormous computational bandwidths and data-storage capacities. These large, distributed computing systems include data centers and are made possible by advances in computer networking, distributed operating systems and applications, data-storage appliances, computer hardware, and software technologies. The number and size of data centers have continued to grow to meet the increasing demand for information technology ("IT") services, such as running applications for organizations that provide business services, web services, and other cloud services to millions of customers each day.

In order to aid system administrators and application owners with detecting performance problems with applications executed in distributed computing systems, management tools have been developed to collect traces of applications. An application trace, or simply a "trace," is a representation of a workflow executed by an application, such as the workflow of application components of a distributed application. Application owners analyze application traces to detect performance problems with their applications. For example, a distributed application may have multiple application components executed in VMs or containers on one or more hosts of a data center. The application traces are stored and analyzed by administrators and application developers to troubleshoot performance problems and perform root cause analysis.

Storage of application traces for a plurality of applications executing in a distributed computing environment over time creates an increasing demand for available data storage space. For example, a typical distributed application that serves hundreds of thousands of clients each day generates hundreds of thousands of corresponding application traces that are stored in data storage devices each day. For application owners, storing an enormous number of application traces increases the costs of operation. In addition, infrequently generated traces often contain information that reveals performance problems with an application and in particular problems with application components. As a result, administrators and developers have to sort through millions of application traces to identify the small number of application traces that are indicative of a performance problem, which is expensive and time consuming, in order to reduce the storage volume of applications traces and try to reduce the amount of time invested in identifying traces that are indicative of a performance problem, management tools use conventional sampling procedures that store a fraction of the traces. However, conventional sampling procedures fail to distinguish between the different types of traces. As a result, infrequently generated traces are often missed during sampling, which makes troubleshooting a performance problem an impossible task based on the sampled traces. Application owners and administrators seek computer-implemented methods and systems that reduce the amount of stored application traces and are able to capture low frequency types of traces that can be used to accurately troubleshoot and perform root cause analysis of an application.

SUMMARY

Computer-implemented methods and systems described herein perform intelligent sampling of application traces generated for an application. The computer-implemented methods and systems sort the applications according to different trace types and different durations and generate different sampling rates, where each sampling rate corresponds to a different trace type and/or different duration. The sampling rates for low frequency trace types and low frequency durations are larger than the sampling rates for high frequency trace types and high frequency durations. The relatively larger sampling rates for low frequency trace types and low frequency durations ensures that low frequency trace types and low frequency durations are sampled in sufficient numbers and are not passed over during sampling of the application traces. As a result, computer-implemented intelligent sampling reduces the number of application traces stored in a data storage device while avoiding the risk of failing to store infrequently generated traces, thereby ensuring that a set of sampled traces contains the different trace types and durations generated by the application and the set can be used to accurately perform troubleshooting and root cause analysis.

DESCRIPTION OF THE DRAWINGS

FIG. 4 shows generalized hardware and software components of a general-purpose computer system.

FIGS. 34C-34D show sampling results obtained from performing intelligent sampling.

FIGS. 34E-34F show sampling results obtained from performing duration sampling.

FIGS. 34G-34H show sampling results obtained from performing hybrid sampling.

DETAILED DESCRIPTION

This disclosure presents computer-implemented methods and systems that intelligently sample application traces generated by applications running in a distributed computing system. In the first subsection, computer hardware, complex computational systems, and virtualization are described. Computer-implemented methods and systems for sampling of application traces are described below in the second subsection.

Computer Hardware, Complex Computational Systems, and Virtualization

The term "abstraction" as used to describe virtualization below is not intended to mean or suggest an abstract idea or concept. Computational abstractions are tangible, physical interfaces that are implemented, ultimately, using physical computer hardware, data storage devices, and communications systems. Instead, the term "abstraction" refers, in the current discussion, to a logical level of functionality encapsulated within one or more concrete, tangible, physically-implemented computer systems with defined interfaces through which electronically-encoded data is exchanged, process execution launched, and electronic services are provided. Interfaces may include graphical and textual data displayed on physical display devices as well as computer programs and routines that control physical computer processors to carry out various tasks and operations and that are invoked through electronically implemented application programming interfaces ("APIs") and other electronically implemented interfaces.

Figure 1:
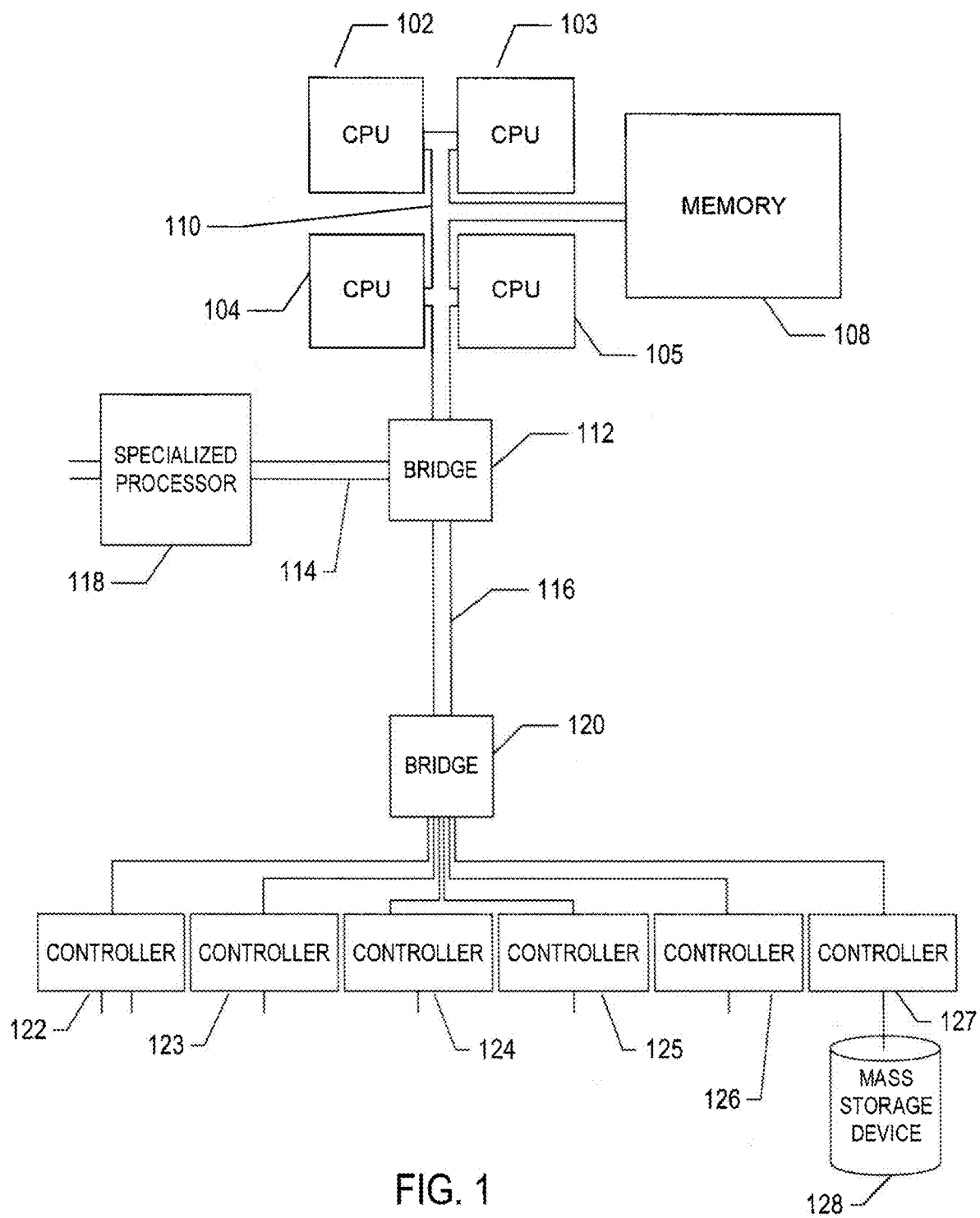
FIG. 1 shows an architectural diagram for various types of computers.

FIG. 1 shows a general architectural diagram for various types of computers. Computers that receive, process, and store log messages may be described by the general architectural diagram shown in FIG. 1, for example. The computer system contains one or multiple central processing units ("CPUs") 102-105, one or more electronic memories 108 interconnected with the CPUs by a CPU/memory-subsystem bus 110 or multiple busses, a first bridge 112 that interconnects the CPU/memory-subsystem bus 110 with additional busses 114 and 116, or other types of high-speed interconnection media, including multiple, high-speed serial interconnects. These busses or serial interconnections, in turn, connect the CPUs and memory with specialized processors, such as a graphics processor 118, and with one or more additional bridges 120, which are interconnected with high-speed serial links or with multiple controllers 122-127, such as controller 127, that provide access to various different types of mass-storage devices 128, electronic displays, input devices, and other such components, subcomponents, and computational devices. It should be noted that computer-readable data storage devices include optical and electromagnetic disks, electronic memories, and other physical data storage devices.

Of course, there are many different types of computer-system architectures that differ from one another in the number of different memories, including different types of hierarchical cache memories, the number of processors and the connectivity of the processors with other system components, the number of internal communications busses and serial links, and in many other ways. However, computer systems generally execute stored programs by fetching instructions from memory and executing the instructions in one or more processors. Computer systems include general-purpose computer systems, such as personal computers ("PCs"), various types of server computers and workstations, and higher-end mainframe computers, but may also include a plethora of various types of special-purpose computing devices, including data-storage systems, communications routers, network nodes, tablet computers, and mobile telephones.

Figure 2:
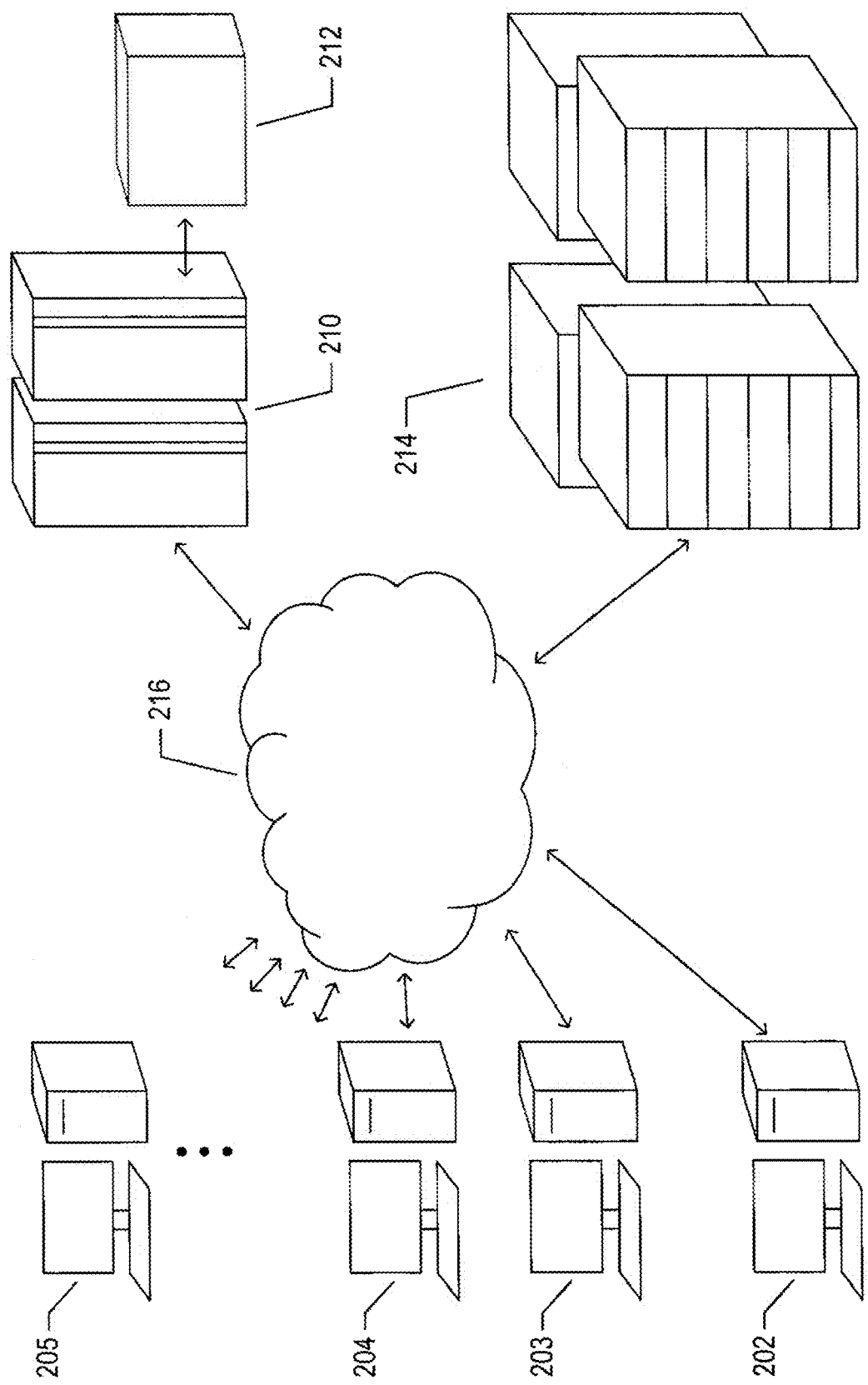
FIG. 2 shows an Internet-connected distributed computer system.

FIG. 2 shows an Internet-connected distributed computer system. As communications and networking technologies have evolved in capability and accessibility, and as the computational bandwidths, data-storage capacities, and other capabilities and capacities of various types of computer systems have steadily and rapidly increased, much of modern computing now generally involves large distributed systems and computers interconnected by local networks, wide-area networks, wireless communications, and the Internet. FIG. 2 shows a typical distributed system in which a large number of PCs 202-205, a high-end distributed mainframe system 210 with a large data-storage system 212, and a large computer center 214 with large numbers of rack-mounted server computers or blade servers all interconnected through various communications and networking systems that together comprise the Internet 216. Such distributed computing systems provide diverse arrays of functionalities. For example, a PC user may access hundreds of millions of different web sites provided by hundreds of thousands of different web servers throughout the world and may access high-computational-bandwidth computing services from remote computer facilities for running complex computational tasks.

Until recently, computational services were generally provided by computer systems and data centers purchased, configured, managed, and maintained by service-provider organizations. For example, an e-commerce retailer generally purchased, configured, managed, and maintained a data center including numerous web server computers, back-end computer systems, and data-storage systems for serving web pages to remote customers, receiving orders through the web-page interface, processing the orders, tracking completed orders, and other myriad different tasks associated with an e-commerce enterprise.

Figure 3:
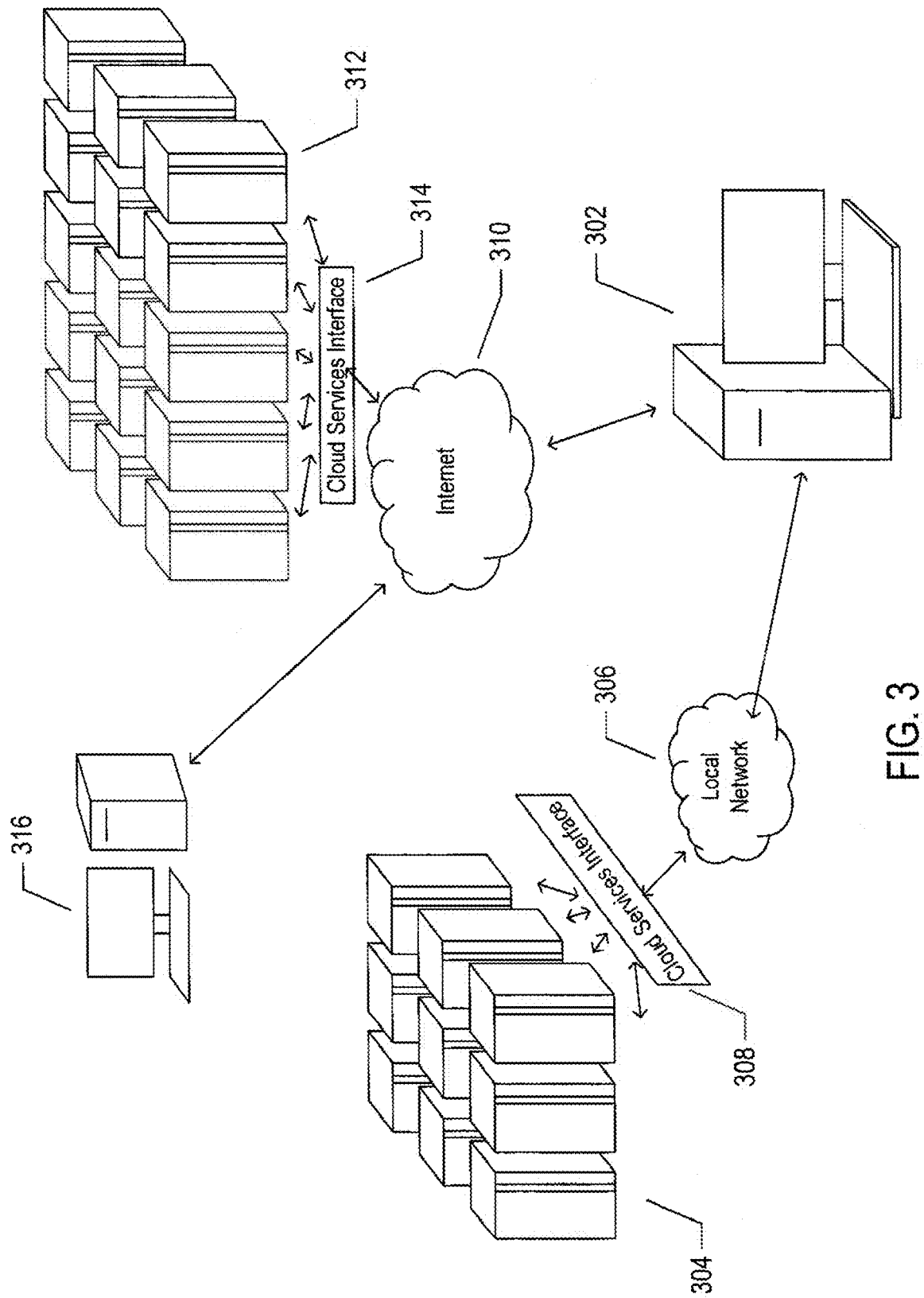
FIG. 3 shows cloud computing.

FIG. 3 shows cloud computing. In the recently developed cloud-computing paradigm, computing cycles and data-storage facilities are provided to organizations and individuals by cloud-computing providers. In addition, larger organizations may elect to establish private cloud-computing facilities in addition to, or instead of, subscribing to computing services provided by public cloud-computing service providers. In FIG. 3, a system administrator for an organization, using a PC 302, accesses the organization's private cloud 304 through a local network 306 and private-cloud interface 308 and accesses, through the Internet 310, a public cloud 312 through a public-cloud services interface 314. The administrator can, in either the case of the private cloud 304 or public cloud 312, configure virtual computer systems and even entire virtual data centers and launch execution of application programs on the virtual computer systems and virtual data centers in order to carry out any of many different types of computational tasks. As one example, a small organization may configure and run a virtual data center within a public cloud that executes web servers to provide an e-commerce interface through the public cloud to remote customers of the organization, such as a user viewing the organization's e-commerce web pages on a remote user system 316.

Cloud-computing facilities are intended to provide computational bandwidth and data-storage services much as utility companies provide electrical power and water to consumers. Cloud computing provides enormous advantages to small organizations without the devices to purchase, manage, and maintain in-house data centers. Such organizations can dynamically add and delete virtual computer systems from their virtual data centers within public clouds in order to track computational-bandwidth and data-storage needs, rather than purchasing sufficient computer systems within a physical data center to handle peak computational-bandwidth and data-storage demands. Moreover, small organizations can completely avoid the overhead of maintaining and managing physical computer systems, including hiring and periodically retraining information-technology specialists and continuously paying for operating-system and data-base-management-system upgrades. Furthermore, cloud-computing interfaces allow for easy and straightforward configuration of virtual computing facilities, flexibility in the types of applications and operating systems that can be configured, and other functionalities that are useful even for owners and administrators of private cloud-computing facilities used by a single organization.

FIG. 4 shows generalized hardware and software components of a general-purpose computer system, such as a general-purpose computer system having an architecture similar to that shown in FIG. 1. The computer system 400 is often considered to include three fundamental layers: (1) a hardware layer or level 402; (2) an operating-system layer or level 404; and (3) an application-program layer or level 406. The hardware layer 402 includes one or more processors 408, system memory 410, various different types of input-output ("I/O") devices 410 and 412, and mass-storage devices 414. Of course, the hardware level also includes many other components, including power supplies, internal communications links and busses, specialized integrated circuits, many different types of processor-controlled or microprocessor-controlled peripheral devices and controllers, and many other components. The operating system 404 interfaces to the hardware level 402 through a low-level operating system and hardware interface 416 generally comprising a set of non-privileged computer instructions 418, a set of privileged computer instructions 420, a set of non-privileged registers and memory addresses 422, and a set of privileged registers and memory addresses 424. In general, the operating system exposes non-privileged instructions, non-privileged registers, and non-privileged memory addresses 426 and a system-call interface 428 as an operating-system interface 430 to application programs 432-436 that execute within an execution environment provided to the application programs by the operating system. The operating system, alone, accesses the privileged instructions, privileged registers, and privileged memory addresses. By reserving access to privileged instructions, privileged registers, and privileged memory addresses, the operating system can ensure that application programs and other higher-level computational entities cannot interfere with one another's execution and cannot change the overall state of the computer system in ways that could deleteriously impact system operation. The operating system includes many internal components and modules, including a scheduler 442, memory management 444, a file system 446, device drivers 448, and many other components and modules. To a certain degree, modern operating systems provide numerous levels of abstraction above the hardware level, including virtual memory, which provides to each application program and other computational entities a separate, large, linear memory-address space that is mapped by the operating, system to various electronic memories and mass-storage devices. The scheduler orchestrates interleaved execution of various different application programs and higher-level computational entities, providing to each application program a virtual, stand-alone system devoted entirely to the application program. From the application program's standpoint, the application program executes continuously without concern for the need to share processor devices and other system devices with other application programs and higher-level computational entities. The device drivers abstract details of hardware-component operation, allowing application programs to employ the system-call interface for transmitting and receiving data to and from communications networks, mass-storage devices, and other 1/0 devices and subsystems. The file system 446 facilitates abstraction of mass-storage-device and memory devices as a high-level, easy-to-access, file-system interface. Thus, the development and evolution of the operating system has resulted in the generation of a type of multi-faceted virtual execution environment for application programs and other higher-level computational entities.

While the execution environments provided h operating systems have proved to be an enormously successful level of abstraction within computer systems, the operating-system-provided level of abstraction is nonetheless associated with difficulties and challenges for developers and users of application programs and other higher-level computational entities. One difficulty arises from the fact that there are many different operating systems that run within various different types of computer hardware. In many cases, popular application programs and computational systems are developed to run on only a subset of the available operating systems and can therefore be executed within only a subset of the different types of computer systems on which the operating systems are designed to run. Often, even when an application program or other computational system is ported to additional operating systems, the application program or other computational system can nonetheless run more efficiently on the operating systems for which the application program or other computational system was originally targeted. Another difficulty arises from the increasingly distributed nature of computer systems. Although distributed operating systems are the subject of considerable research and development efforts, many of the popular operating systems are designed primarily for execution on a single computer system. In many cases, it is difficult to move application programs, in real time, between the different computer systems of a distributed computer system for high-availability, fault-tolerance, and load-balancing purposes. The problems are even greater in heterogeneous distributed computer systems which include different types of hardware and devices running different types of operating systems. Operating systems continue to evolve, as a result of which certain older application programs and other computational entities may be incompatible with more recent versions of operating systems for which they are targeted, creating compatibility issues that are particularly difficult to manage in large distributed systems.

Figure 5A:
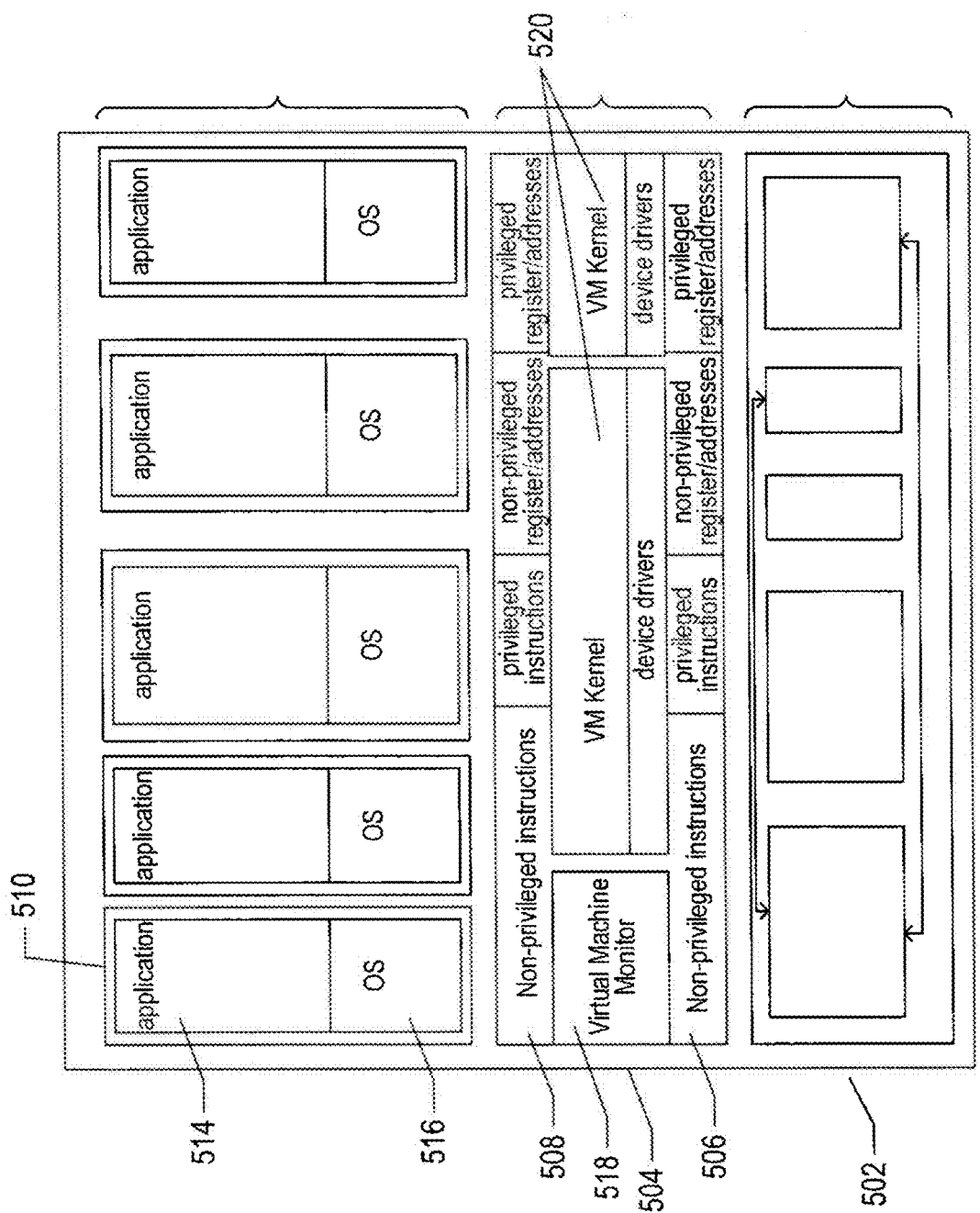
FIGS. 5A-5B show two types of virtual machine ("VM") and VM execution environments.
Figure 5B:
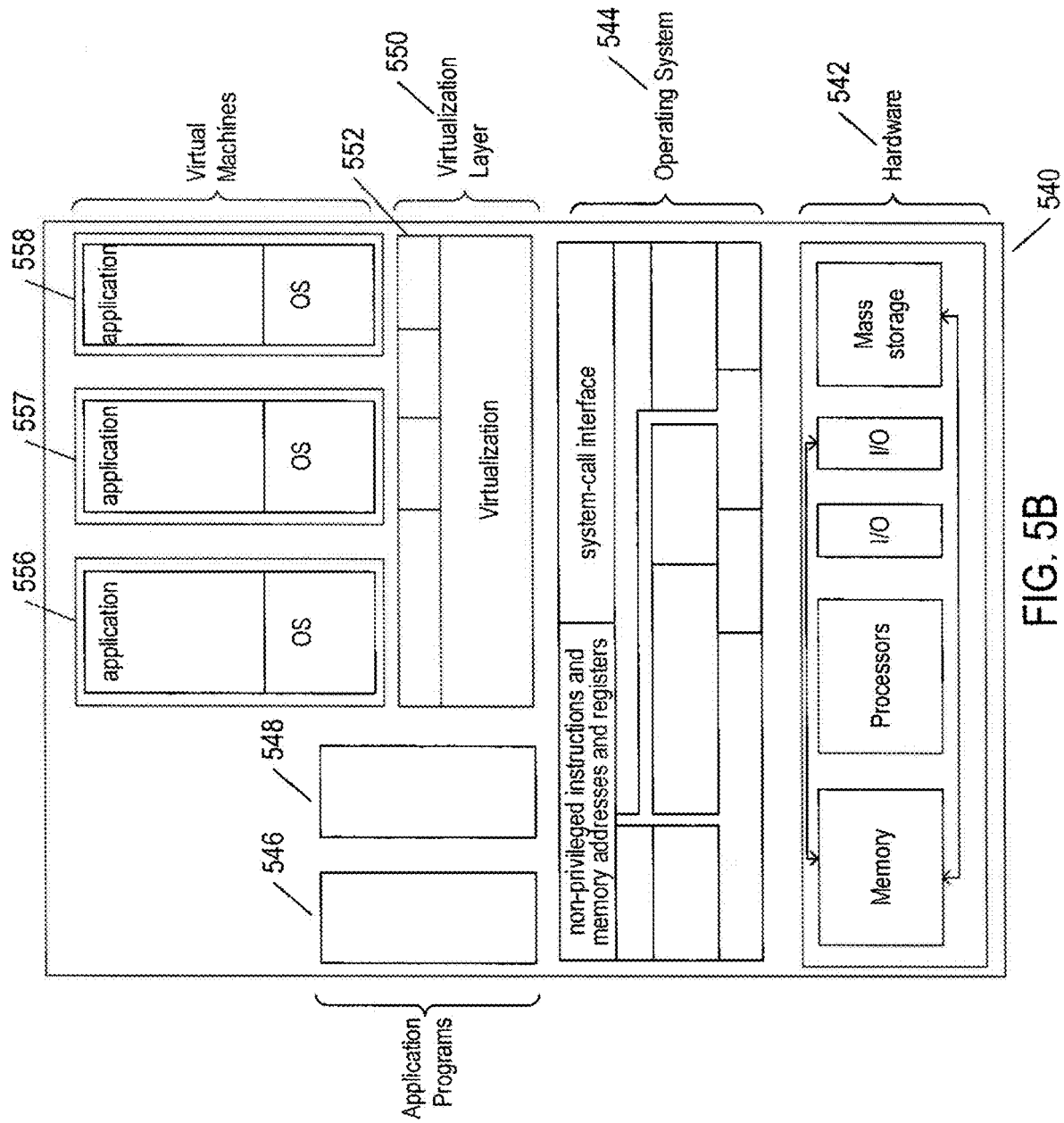

For all of these reasons, a higher level of abstraction, referred to as the "virtual machine," ("VM") has been developed and evolved to further abstract computer hardware in order to address many difficulties and challenges associated with traditional computing systems, including the compatibility issues discussed above. FIGS. 5A-B show two types of VM and virtual-machine execution environments. FIGS. 5A-B use the same illustration conventions as used in FIG. 4. FIG. 5A shows a first type of virtualization. The computer system 500 in FIG. 5A includes the same hardware layer 502 as the hardware layer 402 shown in FIG. 4. However, rather than providing an operating system layer directly above the hardware layer, as in FIG. 4, the virtualized computing environment shown in FIG. 5A features a virtualization layer 504 that interfaces through a virtualization-layer/hardware-layer interface 506, equivalent to interface 416 in FIG. 4, to the hardware. The virtualization layer 504 provides a hardware-like interface to VMs, such as VM 510, in a virtual-machine layer 511 executing above the virtualization layer 504. Each VM includes one or more application programs or other higher-level computational entities packaged together with an operating system, referred to as a "guest operating system." such as application 514 and guest operating system 516 packaged together within VM 510. Each VM is thus equivalent to the operating-system layer 404 and application-program layer 406 in the general-purpose computer system shown in FIG. 4. Each guest operating system within a VM interfaces to the virtualization layer interface 504 rather than to the actual hardware interface 506. The virtualization layer 504 partitions hardware devices into abstract virtual-hardware layers to which each guest operating system within a VM interfaces. The guest operating systems within the VMs, in general, are unaware of the virtualization layer and operate as if they were directly accessing a true hardware interface. The virtualization layer 504 ensures that each of the VMs currently executing within the virtual environment receive a fair allocation of underlying hardware devices and that all VMs receive sufficient devices to progress in execution. The virtualization layer 504 may differ for different guest operating systems. For example, the virtualization layer is generally able to provide virtual hardware interfaces for a variety of different types of computer hardware. This allows, as one example, a VM that includes a guest operating system designed for a particular computer architecture to run on hardware of a different architecture. The number of VMs need not be equal to the number of physical processors or even a multiple of the number of processors.

The virtualization layer 504 includes a virtual-machine-monitor module 518 ("VMM") that virtualizes physical processors in the hardware layer to create virtual processors on which each of the VMs executes. For execution efficiency, the virtualization layer attempts to allow VMs to directly execute non-privileged instructions and to directly access non-privileged registers and memory. However, when the guest operating system within a VM accesses virtual privileged instructions, virtual privileged registers, and virtual privileged memory through the virtualization layer 504, the accesses result in execution of virtualization-layer code to simulate or emulate the privileged devices. The virtualization layer additionally includes a kernel module 520 that manages memory, communications, and data-storage machine devices on behalf of executing VMs ("VM kernel"). The VM kernel, for example, maintains shadow page tables on each VM so that hardware-level virtual-memory facilities can be used to process memory accesses. The VM kernel additionally includes routines that implement virtual communications and data storage devices as well as device drivers that directly control the operation of underlying hardware communications and data storage devices. Similarly, the VM kernel virtualizes various other types of I/O devices, including keyboards, optical-disk drives, and other such devices. The virtualization layer 504 essentially schedules execution of VMs much like an operating system schedules execution of application programs, so that the VMs each execute within a complete and fully functional virtual hardware layer.

FIG. 5B shows a second type of virtualization. In FIG. 5B, the computer system 540 includes the same hardware layer 542 and operating system layer 544 as the hardware layer 402 and the operating system layer 404 shown in FIG. 4. Several application programs 546 and 548 are shown running in the execution environment provided by the operating system 544. In addition, a virtualization layer 550 is also provided, in computer 540, but, unlike the virtualization layer 504 discussed with reference to FIG. 5A, virtualization layer 550 is layered above the operating system 544, referred to as the "host OS," and uses the operating system interface to access operating-system-provided functionality as well as the hardware. The virtualization layer 550 comprises primarily a VivIIV1 and a hardware-like interface 552, similar to hardware-like interface 508 in FIG. 5A. The hardware-layer interface 552, equivalent to interface 416 in FIG. 4, provides an execution environment for a number of VMs 556-558, each including one or more application programs or other higher-level computational entities packaged together with a guest operating system.

In FIGS. 5A-5B, the layers are somewhat simplified for clarity of illustration. For example, portions of the virtualization layer 550 may reside within the host-operating-system kernel, such as a specialized driver incorporated into the host operating system to facilitate hardware access by the virtualization layer.

It should be noted that virtual hardware layers, virtualization layers, and guest operating systems are all physical entities that are implemented by computer instructions stored in physical data storage devices, including electronic memories, mass-storage devices, optical disks, magnetic disks, and other such devices. The term "virtual" does not, in any way, imply that virtual hardware layers, virtualization layers, and guest operating systems are abstract or intangible. Virtual hardware layers, virtualization layers, and guest operating systems execute on physical processors of physical computer systems and control operation of the physical computer systems, including operations that alter the physical states of physical devices, including electronic memories and mass-storage devices. They are as physical and tangible as any other component of a computer since, such as power supplies, controllers, processors, busses, and data storage devices.

Figure 6:
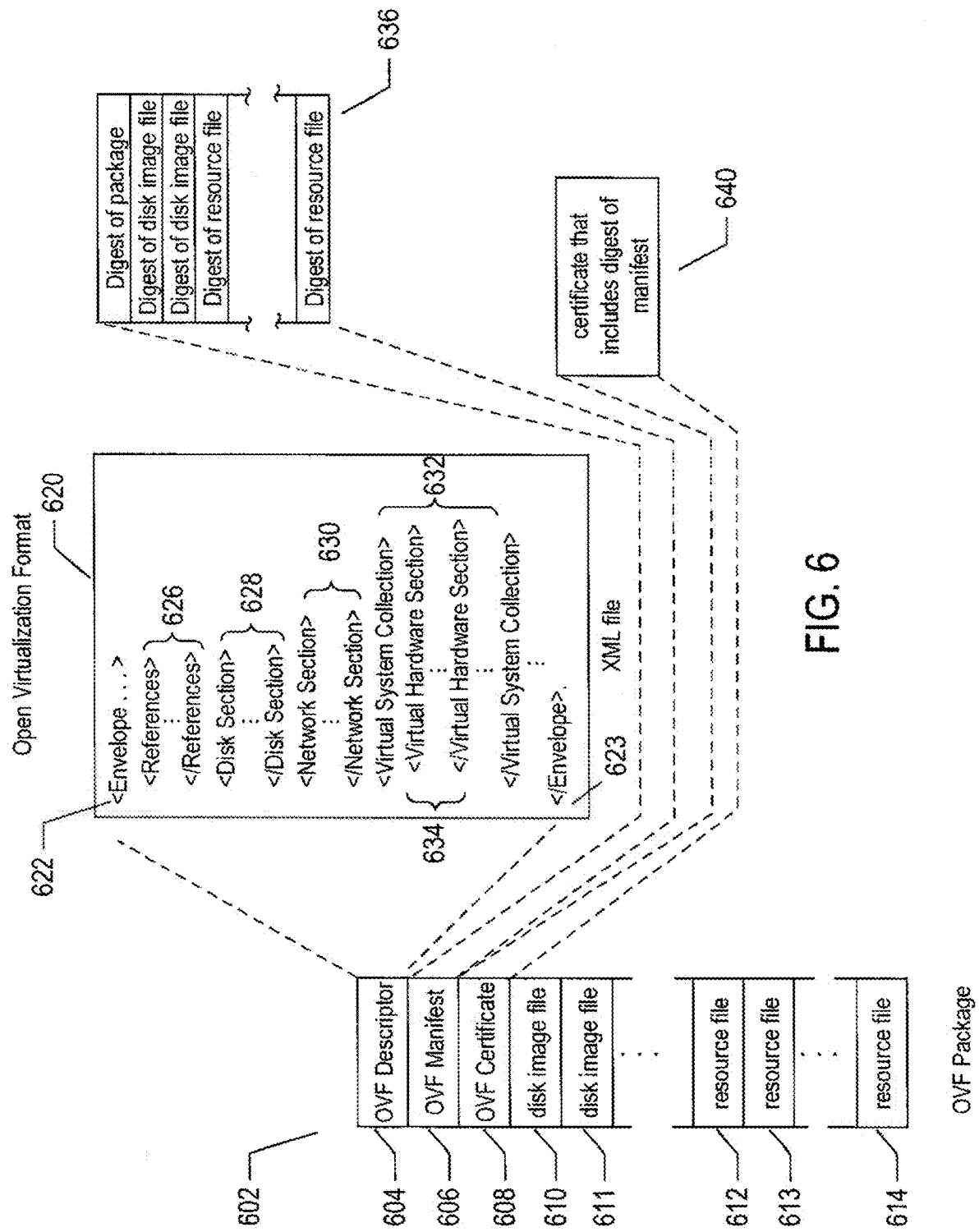
FIG. 6 shows an example of an open virtualization format package.

A VM or virtual application, described below, is encapsulated within a data package for transmission, distribution, and loading into a virtual-execution environment. One public standard for virtual-machine encapsulation is referred to as the "open virtualization format" ("OVF"). The OVF standard specifics a format for digitally encoding a VM within one or more data files. FIG. 6 shows an OVF package. An OVF package 602 includes an OVF descriptor 604, an OVF manifest 606, an OVF certificate 608, one or more disk-image files 610-611, and one or more device files 612-614. The OVF package can be encoded and stored as a single file or as a set of files. The OVF descriptor 604 is an XML document 620 that includes a hierarchical set of elements, each demarcated by a beginning tag and an ending tag. The outermost, or highest-level, element is the envelope element, demarcated by tags 622 and 623. The next-level element includes a reference element 626 that includes references to all files that are part of the OVF package, a disk section 628 that contains meta information about all of the virtual disks included in the OVF package, a network section 630 that includes meta information about all of the logical networks included in the OVF package, and a collection of virtual-machine configurations 632 which further includes hardware descriptions of each VM 634. There are many additional hierarchical levels and elements within a typical OVF descriptor. The OVF descriptor is thus a self-describing, XML file that describes the contents of an OVF package. The OVF manifest 606 is a list of cryptographic-hash-function-generated digests 636 of the entire OVF package and of the various components of the OVF package. The OVF certificate 608 is an authentication certificate 640 that includes a digest of the manifest and that is cryptographically signed. Disk image files, such as disk image file 610, are digital encodings of the contents of virtual disks and device files 612 are digitally encoded content, such as operating-system images. A VM or a collection of VMs encapsulated together within a virtual application can thus be digitally encoded as one or more files within an OVF package that can be transmitted, distributed, and loaded using well-known tools for transmitting, distributing, and loading files. A virtual appliance is a software service that is delivered as a complete software stack installed within one or more VMs that is encoded within an OVF package.

The advent of VMs and virtual environments has alleviated many of the difficulties and challenges associated with traditional general-purpose computing. Machine and operating-system dependencies can be significantly reduced or eliminated by packaging applications and operating systems together as VMs and virtual appliances that execute within virtual environments provided by virtualization layers running on many different types of computer hardware. A next level of abstraction, referred to as virtual data centers or virtual infrastructure, provide a data-center interface to virtual data centers computationally constructed within physical data centers.

Figure 7:
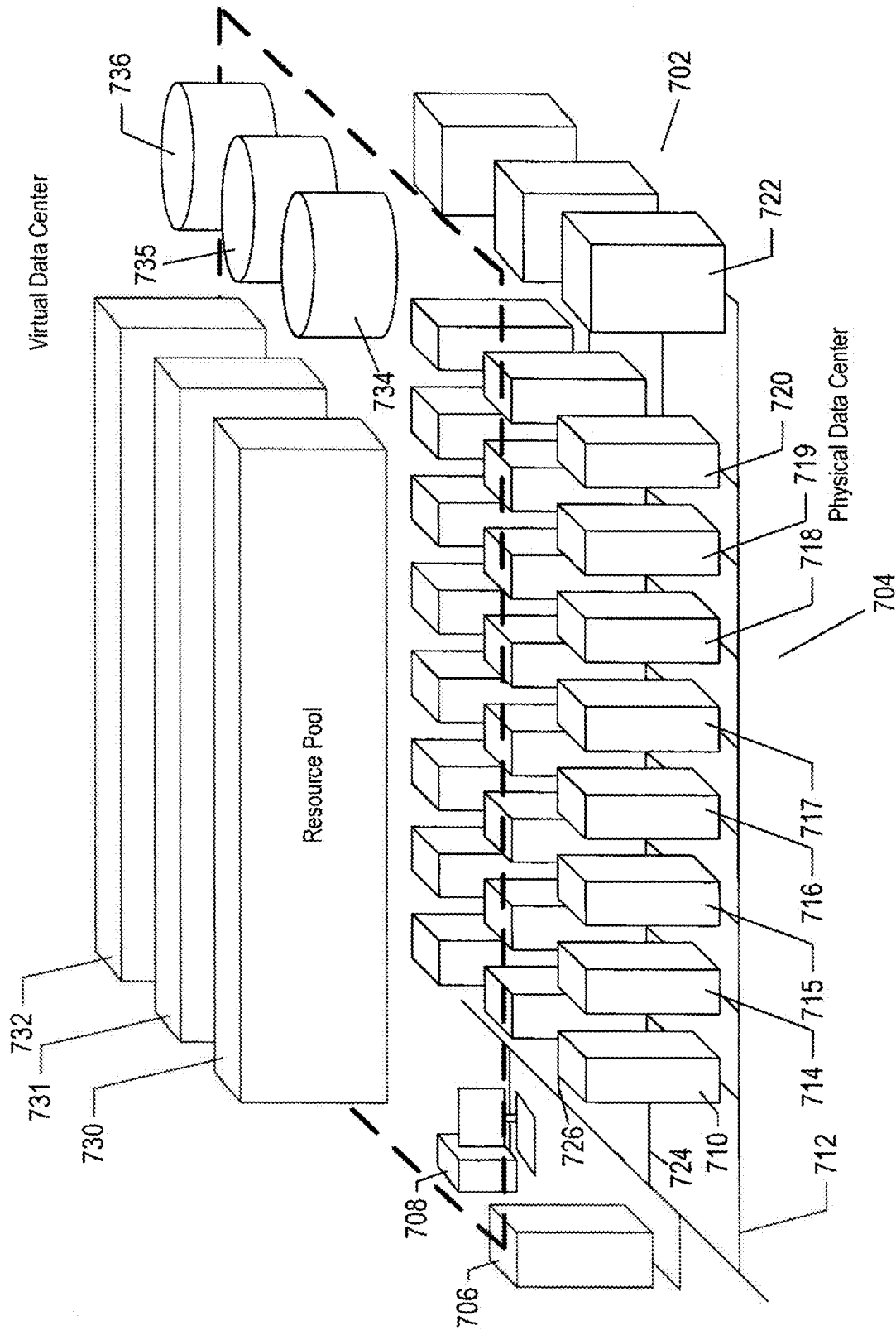
FIG. 7 shows example virtual data centers provided as an abstraction of underlying physical-data-center hardware components.

FIG. 7 shows virtual data centers provided as an abstraction of underlying physical-data-center hardware components. In FIG. 7, a physical data center 702 is shown below a virtual-interface plane 704. The physical data center consists of a virtual-data-center management server computer 706 and any of various different computers, such as PC 708, on which a virtual-data-center management interface may be displayed to system administrators and other users. The physical data center additionally includes generally large numbers of server computers, such as server computer 710, that are coupled together by local area networks, such as local area network 712 that directly interconnects server computer 710 and 714-720 and a mass-storage array 722. The physical data center shown in FIG. 7 includes three local area networks 712, 724, and 726 that each directly interconnects a bank of eight server computers and a mass-storage array. The individual server computers, such as server computer 710, each includes a virtualization layer and runs multiple VMs. Different physical data centers may include many different types of computers, networks, data-storage systems and devices connected according to many different types of connection topologies. The virtual-interface plane 704, a logical abstraction layer shown by a plane in FIG. 7, abstracts the physical data center to a virtual data center comprising one or more device pools, such as device pools 730-732, one or more virtual data stores, such as virtual data stores 734-736, and one or more virtual networks. In certain implementations, the device pools abstract banks of server computers directly interconnected by a local area network.

The virtual-data-center management interface allows provisioning and launching of VMs with respect to device pools, virtual data stores, and virtual networks, so that virtual-data-center administrators need not be concerned with the identities of physical-data-center components used to execute particular VMs. Furthermore, the virtual-data-center management server computer 706 includes functionality to migrate running VMs from one server computer to another in order to optimally or near optimally manage device allocation, provides fault tolerance, and high availability by migrating VMs to most effectively utilize underlying physical hardware devices, to replace VMs disabled by physical hardware problems and failures, and to ensure that multiple VMs supporting a high-availability virtual appliance are executing on multiple physical computer systems so that the services provided by the virtual appliance are continuously accessible, even when one of the multiple virtual appliances becomes compute hound, data-access bound, suspends execution, or fails. Thus, the virtual data center layer of abstraction provides a virtual-data-center abstraction of physical data centers to simplify provisioning, launching, and maintenance of VMs and virtual appliances as well as to provide high-level, distributed functionalities that involve pooling the devices of individual server computers and migrating VMs among server computers to achieve load balancing, fault tolerance, and high availability.

Figure 8:
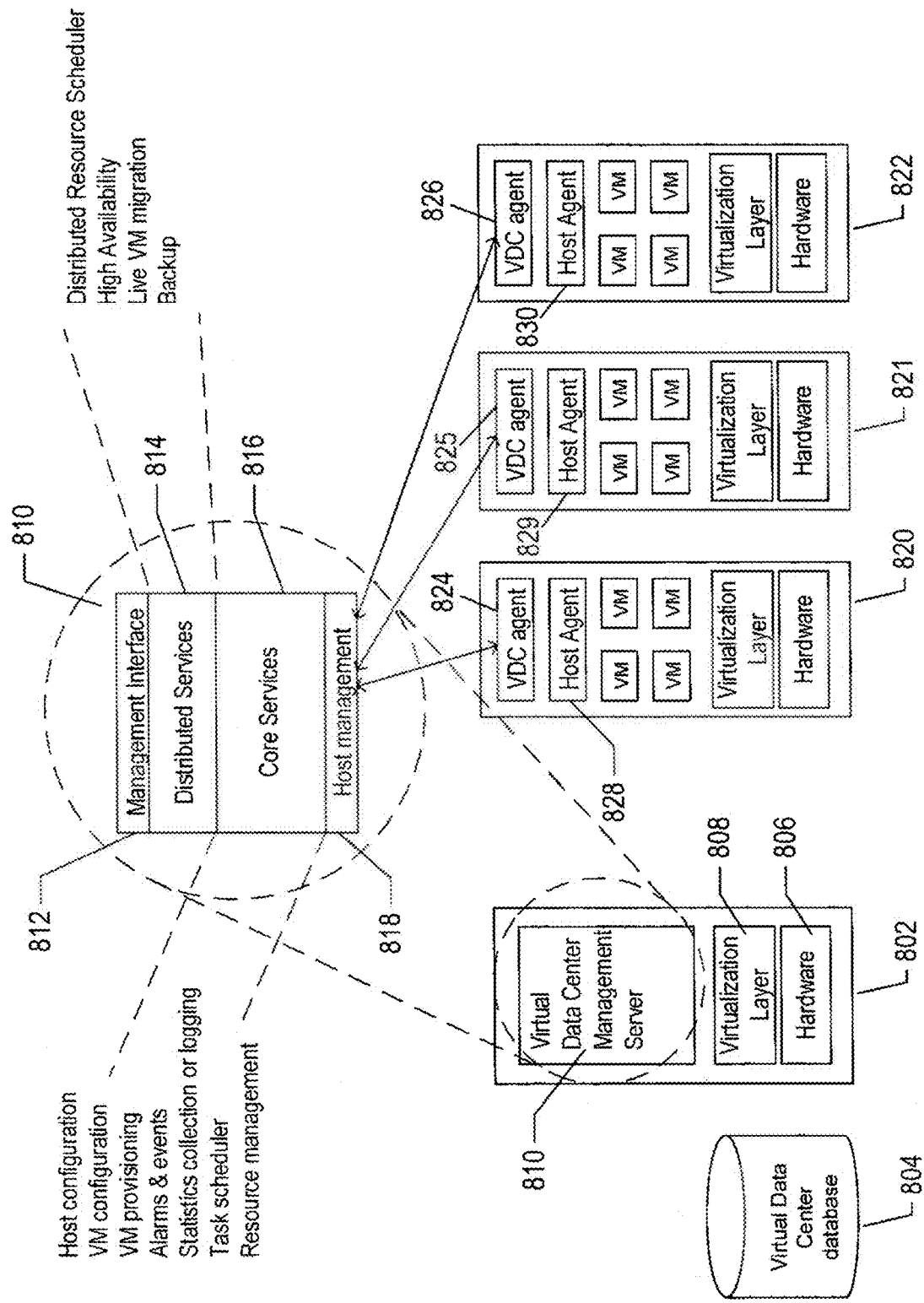
FIG. 8 shows virtual-machine components of a virtual-data-center management server and physical servers of a physical data center.

FIG. 8 shows virtual-machine components of a virtual-data-center management server computer and physical server computers of a physical data center above which a virtual-data-center interface is provided by the virtual-data-center management server computer. The virtual-data-center management server computer 802 and a virtual-data-center database 804 comprise the physical components of the management component of the virtual data center. The virtual-data-center management server computer 802 includes a hardware layer 806 and virtualization layer 808 and runs a virtual-data-center management-server VM 810 above the virtualization layer. Although shown as a single server computer in FIG. 8, the virtual-data-center management server computer ("VDC management server") may include two or more physical server computers that support multiple VDC-management-server virtual appliances. The virtual-data-center management-server VM 810 includes a management-interface component 812, distributed services 814, core services 816, and a host-management interface 818. The host-management interface 818 is accessed from any of various computers, such as the PC 708 shown in FIG. 7. The host-management interface 818 allows the virtual-data-center administrator to configure a virtual data center, provision VMs, collect statistics and view log files for the virtual data center, and to carry out other, similar management tasks. The host-management interface 818 interfaces to virtual-data-center agents 824, 825, and 826 that execute as VMs within each of the server computers of the physical data center that is abstracted to a virtual data center by the VDC management server computer.

The distributed services 814 include a distributed-device scheduler that assigns VMs to execute within particular physical server computers and that migrates VMs in order to most effectively make use of computational bandwidths, data-storage capacities, and network capacities of the physical data center. The distributed services 814 further include a high-availability service that replicates and migrates VMs in order to ensure that VMs continue to execute despite problems and failures experienced by physical hardware components. The distributed services 814 also include a live-virtual-machine migration service that temporarily halts execution of a VM, encapsulates the VM in an OVF package, transmits the OVF package to a different physical server computer, and restarts the VM on the different physical server computer from a virtual-machine state recorded when execution of the VM was halted. The distributed services 814 also include a distributed backup service that provides centralized virtual-machine backup and restore.

The core services 816 provided by the VDC management server VM 810 include host configuration, virtual-machine configuration, virtual-machine provisioning, generation of virtual-data-center alerts and events, ongoing event logging and statistics collection, a task scheduler, and a device-management module. Each physical server computers 820-822 also includes a host-agent VM 828-830 through which the virtualization layer can be accessed via a virtual-infrastructure application programming interface ("API"). This interface allows a remote administrator or user to manage an individual server computer through the infrastructure API. The virtual-data-center agents 824-826 access virtualization-layer server information through the host agents. The virtual-data-center agents are primarily responsible for off-loading certain of the virtual-data-center management-server functions specific to a particular physical server to that physical server computer. The virtual-data-center agents relay and enforce device allocations made by the VDC management server VM 810, relay virtual-machine provisioning and configuration-change commands to host agents, monitor and collect performance statistics, alerts, and events communicated to the virtual-data-center agents by the local host agents through the interface API, and to carry out other, similar virtual-data-management tasks.

The virtual-data-center abstraction provides a convenient and efficient level of abstraction for exposing the computational devices of a cloud-computing facility to cloud-computing-infrastructure users. A cloud-director management server exposes virtual devices of a cloud-computing facility to cloud-computing-infrastructure users. In addition, the cloud director introduces a multi-tenancy layer of abstraction, which partitions VDCs into tenant-associated VDCs that can each be allocated to an individual tenant or tenant organization, both referred to as a "tenant." A given tenant can be provided one or more tenant-associated VDCs by a cloud director managing the multi-tenancy layer of abstraction within a cloud-computing facility. The cloud services interface (308 in FIG. 3) exposes a virtual-data-center management interface that abstracts the physical data center.

Figure 9:
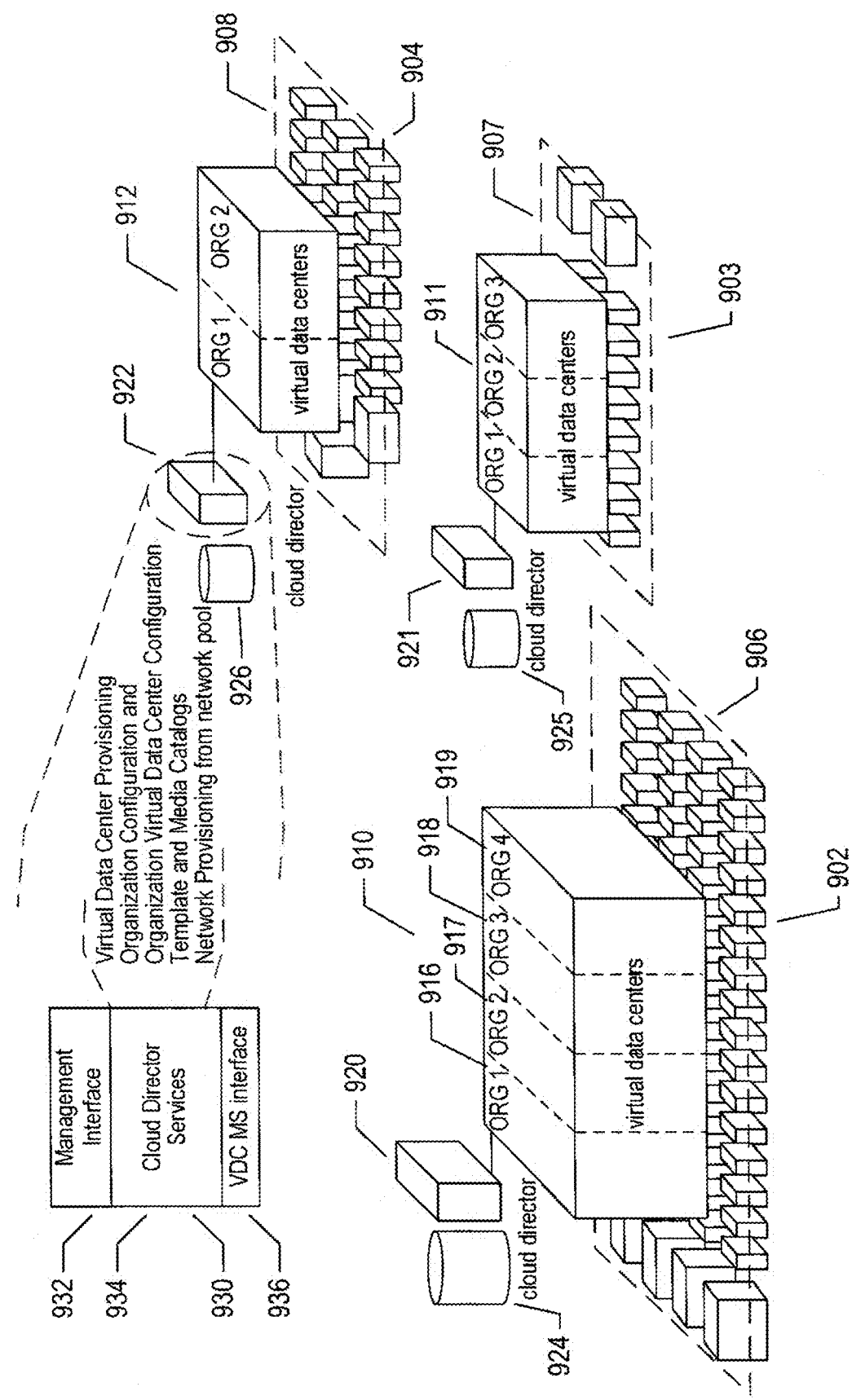
FIG. 9 shows a cloud-director level of abstraction.

FIG. 9 shows a cloud-director level of abstraction. In FIG. 9, three different physical data centers 902-904 are shown below planes representing the cloud-director layer of abstraction 906-908. Above the planes representing the cloud-director level of abstraction, multi-tenant virtual data centers 910-912 are shown. The devices of these multi-tenant virtual data centers are securely partitioned in order to provide secure virtual data centers to multiple tenants, or cloud-services-accessing organizations. For example, a cloud-services-provider virtual data center 910 is partitioned into four different tenant-associated virtual-data centers within a multi-tenant virtual data center for four different tenants 916-919. Each multi-tenant virtual data center is managed by a cloud director comprising one or more cloud-director server computers 920-922 and associated cloud-director databases 924-926. Each cloud-director server computer or server computers runs a cloud-director virtual appliance 930 that includes a cloud-director management interface 932, a set of cloud-director services 934, and a virtual-data-center management-server interface 936. The cloud-director services include an interface and tools for provisioning multi-tenant virtual data center virtual data centers on behalf of tenants, tools, and interfaces for configuring and managing tenant organizations, tools and services for organization of virtual data centers and tenant-associated virtual data centers within the multi-tenant virtual data center, services associated with template and media catalogs, and provisioning of virtualization networks from a network pool. Templates are VMs that each contains an OS and/or one or more VMs containing applications. A template may include much of the detailed contents of VMs and virtual appliances that are encoded within OVF packages, so that the task of configuring a VM or virtual appliance is significantly simplified, requiring only deployment of one OVF package. These templates are stored in catalogs within a tenant's virtual-data center. These catalogs are used for developing and staging new virtual appliances and published catalogs are used for sharing templates in virtual appliances across organizations. Catalogs may include OS images and other information relevant to construction, distribution, and provisioning of virtual appliances.

Considering FIGS. 7 and 9, the VDC-server and cloud-director layers of abstraction can be seen, as discussed above, to facilitate employment of the virtual-data-center concept within private and public clouds. However, this level of abstraction does not fully facilitate aggregation of single-tenant and multi-tenant virtual data centers into heterogeneous or homogeneous aggregations of cloud-computing facilities.

Figure 10:
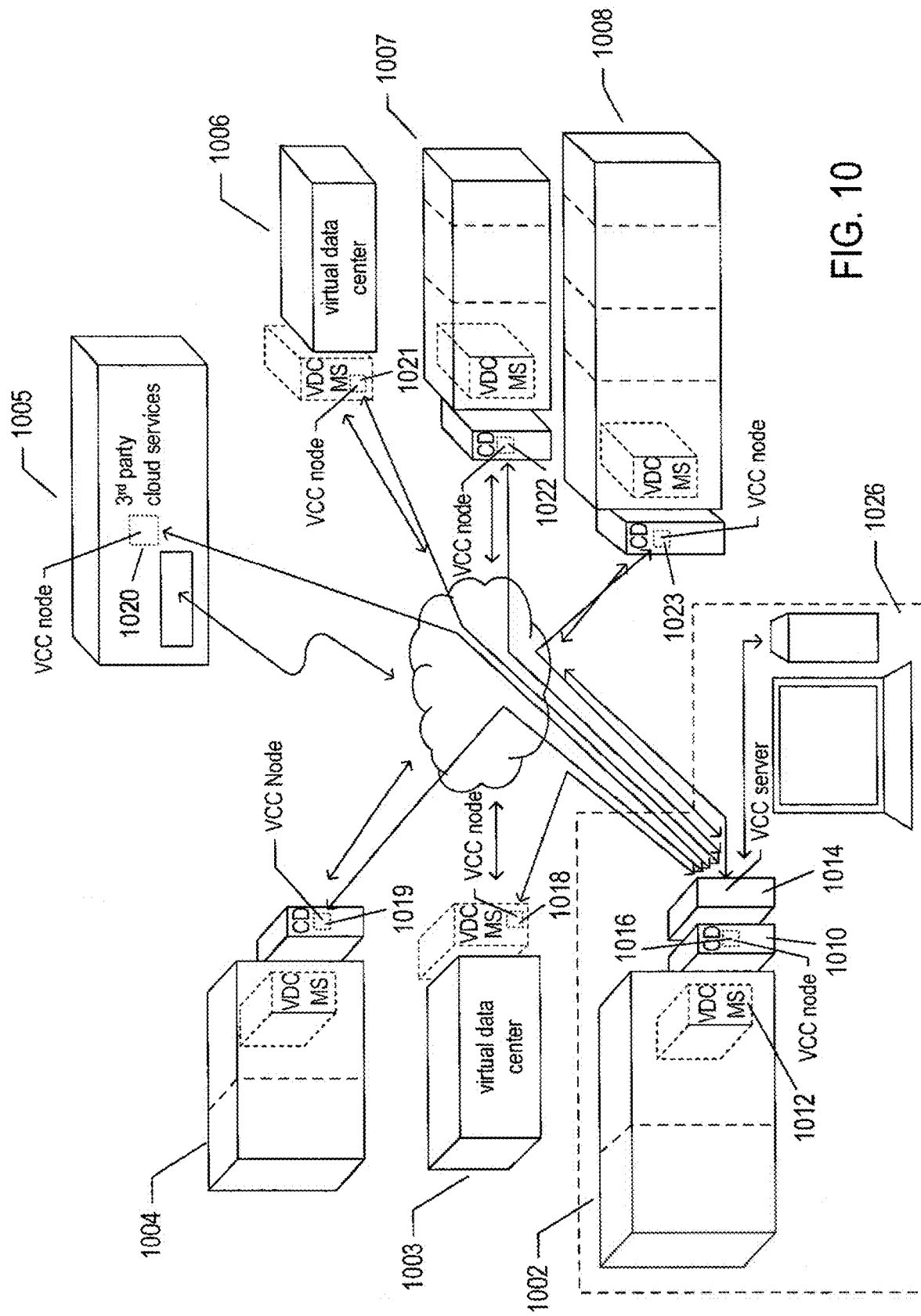
FIG. 10 shows virtual-cloud-connector nodes.

FIG. 10 shows virtual-cloud-connector nodes ("VCC nodes") and a VCC server, components of a distributed system that provides multi-cloud aggregation and that includes a cloud-connector server and cloud-connector nodes that cooperate to provide services that are distributed across multiple clouds. VMware vCloud™ VCC servers and nodes are one example of VCC server and nodes. In FIG. 10, seven different cloud-computing facilities are shown 1002-1008. Cloud-computing facility 1002 is a private multi-tenant cloud with a cloud director 1010 that interfaces to a VDC management server 1012 to provide a multi-tenant private cloud comprising multiple tenant-associated virtual data centers. The remaining cloud-computing facilities 1003-1008 may be either public or private cloud-computing facilities and may be single-tenant virtual data centers, such as virtual data centers 1003 and 1006, multi-tenant virtual data centers, such as multi-tenant virtual data centers 1004 and 1007-1008, or any of various different kinds of third-party cloud-services facilities, such as third-party cloud-services facility 1005. An additional component, the VCC server 1014, acting as a controller is included in the private cloud-computing facility 1002 and interfaces to a VCC node 1016 that runs as a virtual appliance within the cloud director 1010. A VCC server may also run as a virtual appliance within a VDC management server that manages a single-tenant private cloud. The VCC server 1014 additionally interfaces, through the Internet, to VCC node virtual appliances executing within remote VDC management servers, remote cloud directors, or within the third-party cloud services 1018-1023. The VCC server provides a VCC server interface that can be displayed on a local or remote terminal, PC, or other computer system 1026 to allow a cloud-aggregation administrator or other user to access VCC-server-provided aggregate-cloud distributed services. In general, the cloud-computing facilities that together form a multiple-cloud-computing aggregation through distributed services provided by the VCC server and VCC nodes are geographically and operationally distinct.

As mentioned above, while the virtual-machine-based virtualization layers, described in the previous subsection, have received widespread adoption and use in a variety of different environments, from personal computers to enormous, distributed computing systems, traditional virtualization technologies are associated with computational overheads. While these computational overheads have steadily decreased, over the years, and often represent ten percent or less of the total computational bandwidth consumed by an application running above a guest operating system in a virtualized environment, traditional virtualization technologies nonetheless involve computational costs in return for the power and flexibility that they provide.

While a traditional virtualization layer can simulate the hardware interface expected by any of many different operating systems, CSL virtualization essentially provides a secure partition of the execution environment provided by a particular operating system. As one example, OSL, virtualization provides a file system to each container, but the file system provided to the container is essentially a view of a partition of the general file system provided by the underlying operating system of the host. In essence, OSL virtualization uses operating-system features, such as namespace isolation, to isolate each container from the other containers running on the same host. In other words, namespace isolation ensures that each application is executed within the execution environment provided by a container to be isolated from applications executing within the execution environments provided by the other containers. A container cannot access files that are not included in the container's namespace and cannot interact with applications running in other containers. As a result, a container can be booted up much faster than a VM, because the container uses operating-system-kernel features that are already available and functioning within the host. Furthermore, the containers share computational bandwidth, memory, network bandwidth, and other computational resources provided by the operating system, without the overhead associated with computational resources allocated to VMs and virtualization layers. Again, however, OSL, virtualization does not provide many desirable features of traditional virtualization. As mentioned above, OSL virtualization does not provide a way to run different types of operating systems for different groups of containers within the same host and OSL-virtualization does not provide for live migration of containers between hosts, high-availability functionality, distributed resource scheduling, and other computational functionality provided by traditional virtualization technologies.

Figure 11:
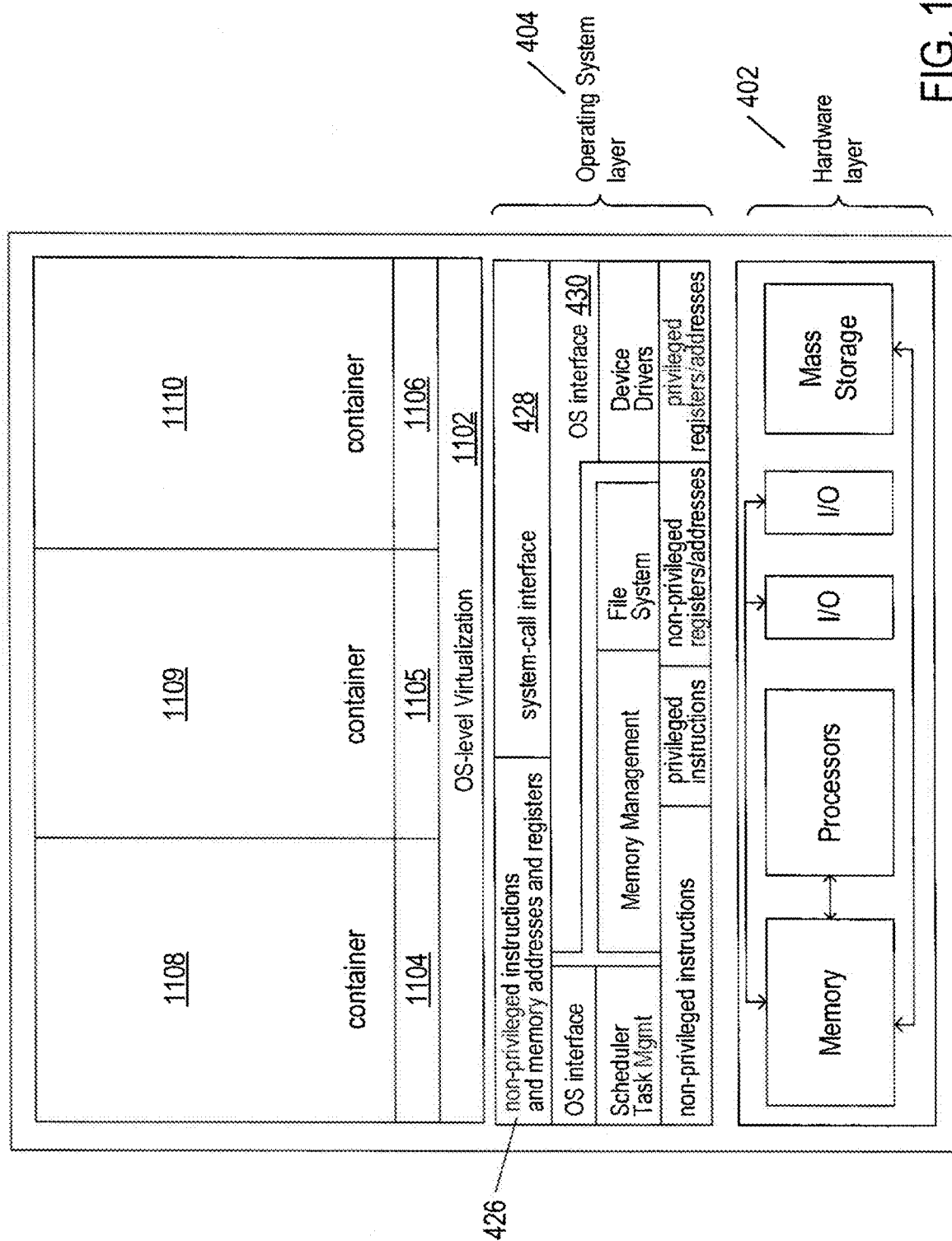
FIG. 11 shows an example server computer used to host three containers.

FIG. 11 shows an example server computer used to host three containers. As discussed above with reference to FIG. 4, an operating system layer 404 runs above the hardware 402 of the host computer. The operating system provides an interface, for higher-level computational entities, that includes a system-call interface 428 and the non-privileged instructions, memory addresses, and registers 426 provided by the hardware layer 402. However, unlike in FIG. 4, in which applications run directly above the operating system layer 404, OSL virtualization involves an OSL virtualization layer 1102 that provides operating-system interfaces 1104-1106 to each of the containers 1108-1110. The containers, in turn, provide an execution environment for an application that runs within the execution environment provided by container 1108. The container can be thought of as a partition of the resources generally available to higher-level computational entities through the operating system interface 430.

Figure 12:
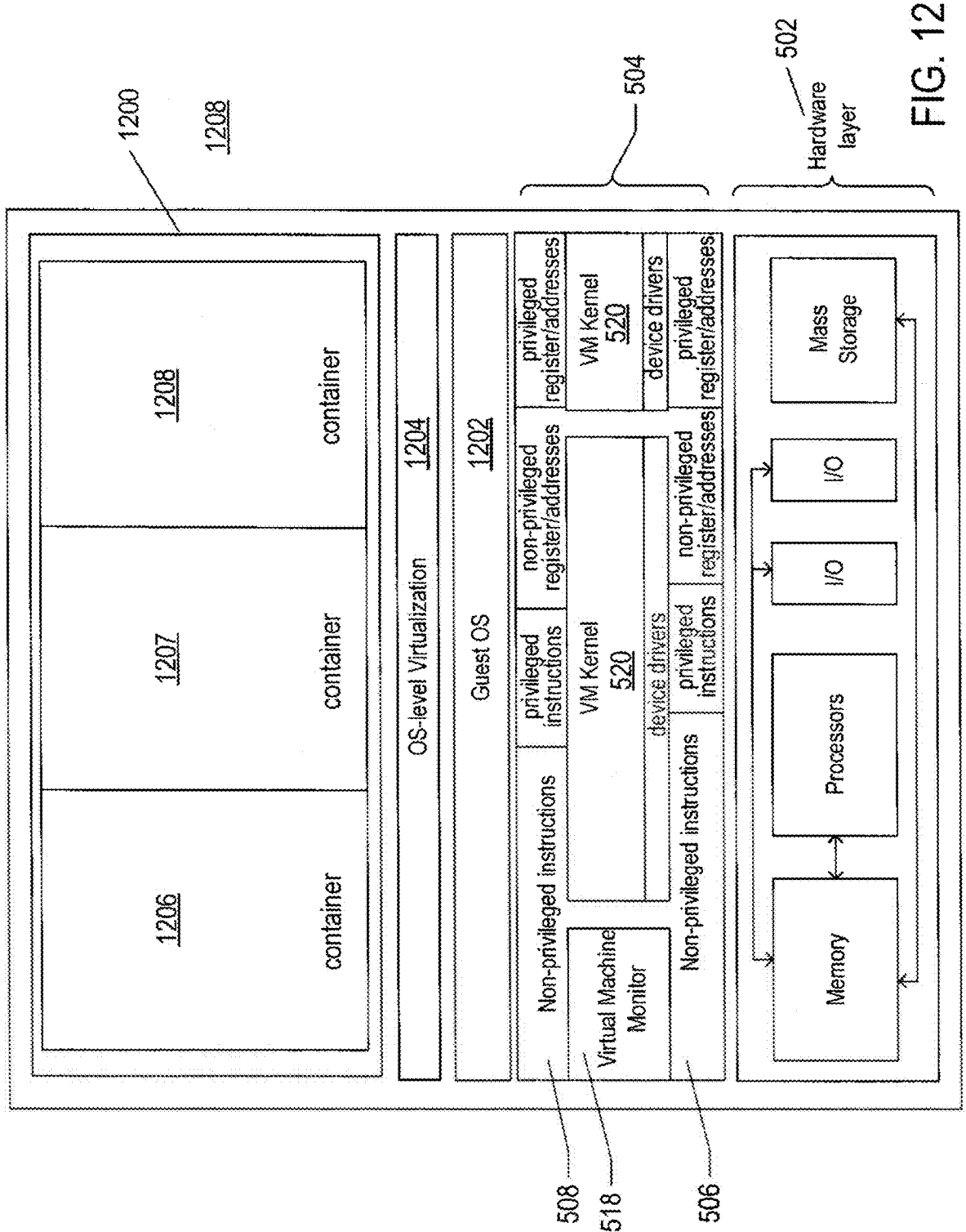
FIG. 12 shows an approach to implementing containers on a VM.

FIG. 12 shows an approach to implementing the containers on a VM. FIG. 12 shows a host computer similar to that shown in FIG. 5A, discussed above. The host computer includes a hardware layer 502 and a virtualization layer 504 that provides a virtual hardware interface 508 to a guest operating system 1102. Unlike in FIG. 5A, the guest operating system interfaces to an OSL-virtualization layer 1104 that provides container execution environments 1206-1208 to multiple application programs.

Note that, although only a single guest operating system and OSL virtualization layer are shown in FIG. 12, a single virtualized host system can run multiple different guest operating systems within multiple VMs, each of which supports one or more OSL-virtualization containers. A virtualized, distributed computing system that uses guest operating systems running within VMs to support OSL-virtualization layers to provide containers for running applications is referred to, in the following discussion, as a "hybrid virtualized distributed computing system."

Running containers above a guest operating system within a VM provides advantages of traditional virtualization in addition to the advantages of OSL virtualization. Containers can be quickly booted in order to provide additional execution environments and associated resources for additional application instances. The resources available to the guest operating system are efficiently partitioned among the containers provided by the OSL-virtualization layer 1204 in FIG. 12, because there is almost no additional computational overhead associated with container-based partitioning of computational resources. However, many of the powerful and flexible features of the traditional virtualization technology can be applied to VMs in which containers run above guest operating systems, including live migration from one host to another, various types of high-availability and distributed resource scheduling, and other such features. Containers provide share-based allocation of computational resources to groups of applications with guaranteed isolation of applications in one container from applications in the remaining containers executing above a guest operating system. Moreover, resource allocation can be modified at run time between containers. The traditional virtualization layer provides for flexible and scaling over large numbers of hosts within distributed computing systems and a simple approach to operating-system upgrades and patches. Thus, the use of OSL virtualization above traditional virtualization in a hybrid virtualized distributed computing system, as shown in FIG. 12, provides many of the advantages of both a traditional virtualization layer and the advantages of OSL virtualization.

Computer-Implemented Methods and Systems for Performing Intelligent Sampling of Application Traces A distributed application comprises multiple VMs or containers that run application components simultaneously on one or more host server computers of a distributed computing system. The components are typically executed separately in the VMs or containers. The server computers arc networked together so that information processing performed by the distributed application is distributed over the server computers, allowing the VMs or containers to exchange data. The distributed application can be scaled up or down to satisfy changing demands by scaling up or down the number of VMs or containers. As a result, a typical distributed application can process multiple requests from multiple clients at the same time.

Figure 13:
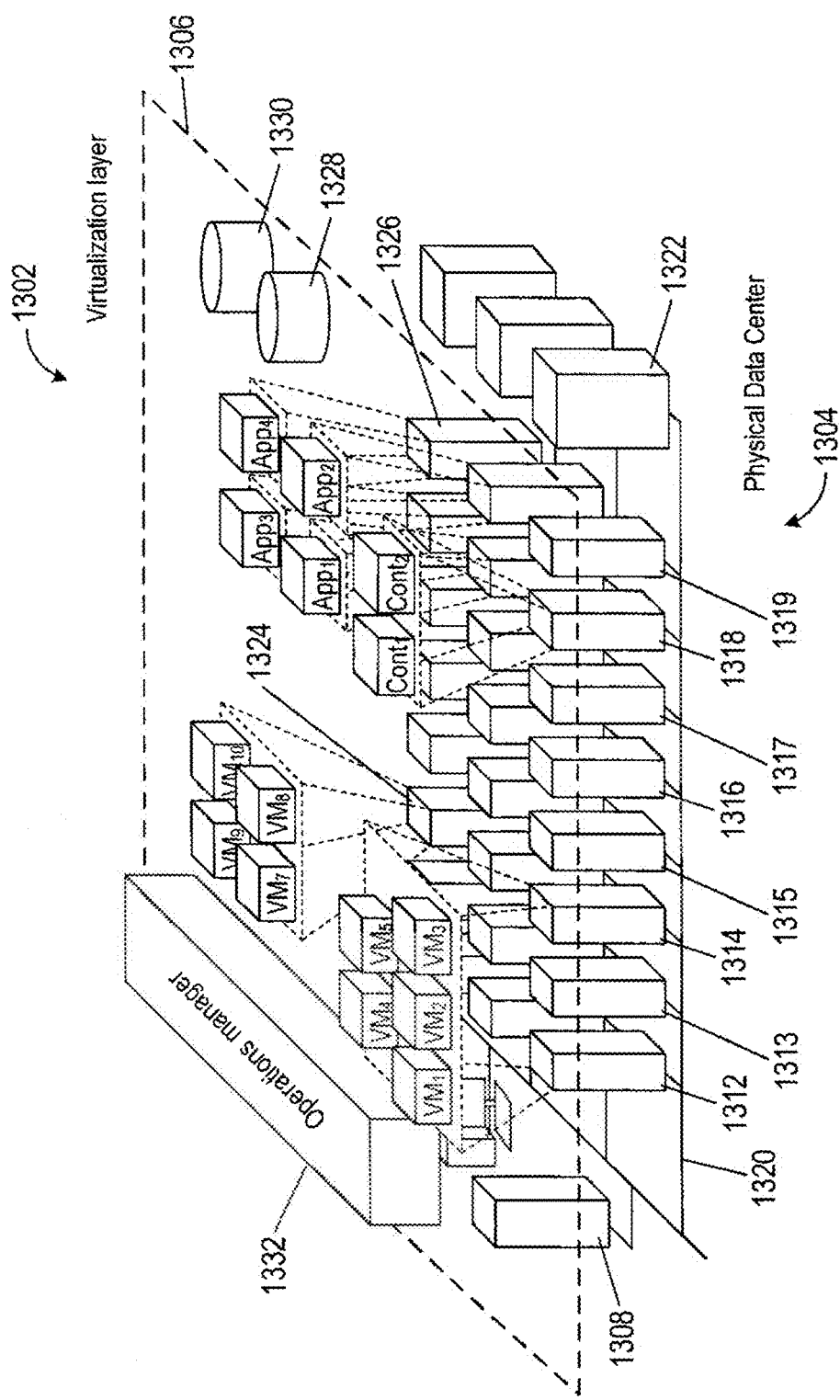
FIG. 13 shows an example of a virtualization layer located above a physical data center.

FIG. 13 shows an example of a virtualization layer 1302 that is executed in a physical data center 1304. For the sake of illustration, the virtualization layer 1302 is shown separated from the physical data center 1304 by a virtual-interface plane 1306. The physical data center 1304 is an example of a distributed computing system. The physical data center 1304 comprises physical objects, including an administration computer system 1308, an of various computers, such as PC 1310, on which a virtual data center ("VDC") management interface may be displayed to system administrators and other users, computers, such as computers 1312-1319, data storage devices, and network devices. Each computer may have multiple network interface cards ("NICs") that provide high bandwidth and networking to other computers and data storage devices in the physical data center 1304. The computers may be mounted in racks (not shown) that are networked together to form server-computer groups within the data center 1304. The example physical data center 1304 includes three computer groups, each of which have eight computers. For example, computer group 1320 comprises interconnected computers 1312-1319 that are connected to a mass-storage array 1322 via a switch (not shown). Within each computer group, certain computers are grouped together to form clusters. Each cluster provides an aggregated set of resources, such as processors, memory, and disk space, (i.e., resource pool) to objects in the virtualization layer 1302. Physical data centers are not limited to the example physical data center 1304. Different physical data centers may include many different types of computers, networks, data-storage systems, and devices connected according to many different types of connection topologies.

The virtualization layer 1302 includes virtual objects, such as VMs, applications, and containers, hosted by the computers in the physical data center 1304. The virtualization layer 1302 also includes a virtual network (not illustrated) comprising virtual switches, virtual routers, load balancers, and virtual NICs. Certain computers host VMs and containers as described above. For example, computer 1318 hosts two containers identified as $Cont_1$ and $Cont_2$; cluster of computers 1313 and 1314 host five VMs identified as $VM_1$, $VM_2$, $VM_3$, $VM_4$, and $VM_5$; computer 1324 hosts four VMs identified as $VM_7$, $VM_8$, $VM_9$, $VM_{10}$, Other computers may host applications as described above with reference to FIG. 4. For example, computer 1326 hosts a standalone application identified as $App_1$.

In FIG. 13, the VMs $VM_1$, $VM_2$, $VM_3$, $VM_4$, and $VM_5$ are application components of a distributed application executed on the cluster of server computers 1313 and 1314. The resources of the server computers 1313 and 1314 provide a resource pool for the five VMs. The VMs enable different software components of the distributed application to run on different operating systems, share the same pool of resources, and share data. The VMs $VM_1$, $VM_2$, $VM_3$, $VM_4$, and $VM_5$ may provide web services to customers. For example, $VM_1$ may provide frontend services that enables users to purchase items sold by an owner of the distributed application over the Internet. VMs $V_2$-$VM_5$ execute backend operations that complete each user's purchase, such as collecting money from a user's bank, charging a user's credit card, updating a user's information, updating the owner's inventory, and arranging for products to be shipped to the user. The VMs $VM_7$, $VM_8$, $VM_9$, and $VM_{10}$ execute a second distributed application on the server computer 1324. Containers $Cont_1$ and $Cont_2$ execute components of a third distributed application on the server computer 1318.

Application tracing tracks an application's flow and data progression with the results for each execution of the application presented in a separate application trace. An application trace, also called a "trace," represents a workflow executed by an application or a distributed application. A trace represents how a request, such as a user or client request, propagates through components of a distributed application or through services provided by each component of a distributed application. A trace consists of one or more spans. Each span represents an amount of time spent executing a service or performance of a function of the application.

Application traces may be used in troubleshooting to identify interesting patterns or performance problems with the application itself, the resources used to execute the application, and the network.

Figure 14A:
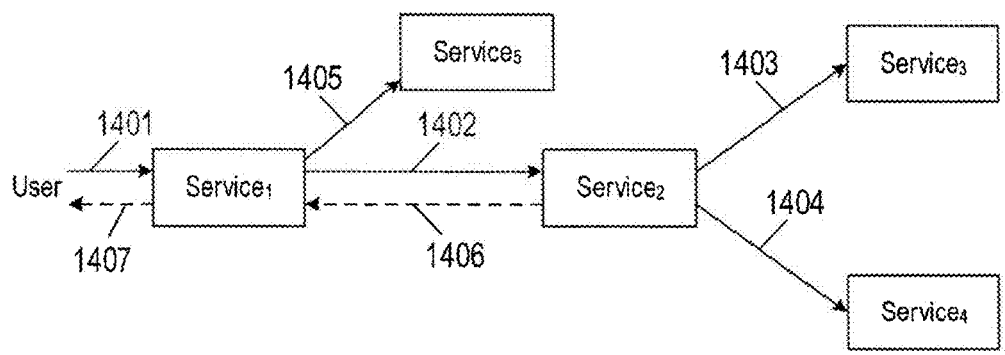
FIGS. 14A-14B show an example of a distributed application and an example application trace.
Figure 14B:
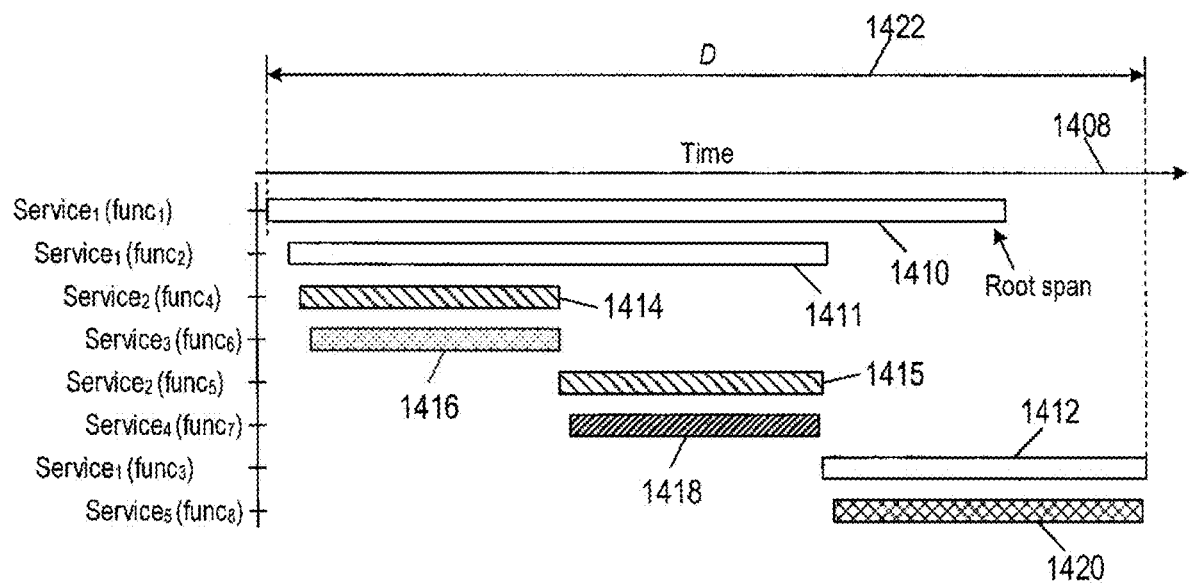

FIGS. 14A-14B show an example of a distributed application and an example application trace. FIG. 14A shows an example of five services provided by a distributed application. The services are represented by blocks identified as $Service_1$, $Service_2$, $Service_3$, $Service_4$, and $Service_5$. The services may be web services provided to customers. For example, $Service_1$ may be a web server that enables a user to purchase items sold by the application owner and communicates with other services. The services $Service_2$, $Service_3$, $Service_4$, and $Service_5$ are computational services that perform different functions to complete the user's request. The components perform different functions of a distributed application and are executed in separate VMs on one or more server computers or using shared resources of a resource pool provided by a cluster of server computers. For example, services $Service_1$, $Service_2$, $Service_3$, $Service_4$, and $Service_5$ are performed by five application components in VMs $VM_1$, $VM_2$, $VM_3$, $VM_4$, and $VM_5$, respectively, of FIG. 13. Directional arrows 1401-1405 represent requests for a service provided by the services $Service_1$, $Service_2$, $Service_3$, $Service_4$, and $Service_5$. For example, directional arrow 1401 represents a user's request for a service offered by $Service_1$, such as a functionality provided by a web server. After a request has been issued by the user, directional arrows 1403 and 1404 represent $Service_1$ requests for execution of services or functions performed by $Service_2$ and $Service_3$. Dashed directional arrows 1406 and 1407 represent responses. For example, $Service_2$ sends a response to $Service_1$ indicating that the operations performed by $Service_3$ and $Service_4$ have been completed. $Service_1$ then requests services from $Service_5$, as represented by directional arrow 1405, and provides a response to the user, as represented by directional arrow 1407.

FIG. 14B shows an example trace of the distributed application represented in FIG. 14A. Directional arrow 1408 is a time axis. The order in which services are executed are listed in column 1409. The services perform different functions indicated in parenthesis with service $Service_1$ and $Service_2$ performing more than one function. Each bar represents a time span, which is an amount of time (i.e., duration) spent performing one of the functions provided by a service. Unshaded bars 1410-1412 represent spans of time spent executing the different functions performed by $Service_1$. For example, bar 1410 represents the span of time $Service_1$ spends interacting with a user. Bar 1411 represents the span of time $Service_1$ spends interacting with the services provided by $Service_2$. Hash marked bars 1414-1415 represent spans of time spent executing $Service_2$ with services $Service_3$ and $Service_4$. Shaded bar 1416 represents a span of time spent executing $Service_3$. Dark hash marked bar 1418 represents a span of time spent executing $Service_4$. Cross-hatched bar 1420 represents a span of time spent executing $Service_5$.

Traces are classified according to trace type which is given by the span of the first service, operation, or function performed by an application. The first span is called the "root span" which is used as the trace type and is denoted by TT. For example, the span 1410 of the trace shown in FIG. 14B is the root span of the trace and is used as the trace type. A trace may also be classified by the order in which different services or functions are performed by an application. For example, the ordered sequence of services or functions listed in column 1409 may be used to define a trace type denoted by a 7-tuple: ($Service_1$, $Service_1$, $Service_2$, $Service_3$, $Service_4$, $Service_1$, $Service_5$). Each trace has a corresponding duration or total time of the trace denoted by D. The duration is the amount of time taken by the application to complete a request or perform a series of functions requested by a client. For example, time interval 1422 is the duration D of the trace shown in FIG. 14B, which represents the total amount time taken to execute the services in FIG. 14A.

Modern distributed applications generate enormous numbers of traces each day. For example, a shopping website may be accessed and used hundreds of thousands of times each day, resulting in storing hundreds of thousands of traces associated with each transaction in a data storage device. Many of the traces may be nearly identical and correspond to nearly identical operations performed by an application. On the other hand, less frequently generated traces may be used to troubleshoot performance of the application and identify a root cause a problem with the application. In recent years, application management tools have been developed to apply different sampling procedures that reduce the amount of storage dedicated to storing traces. The sampling procedures include rate-based sampling, duration-based sampling, and error-based sampling. Rate-based sampling, also called "probabilistic sampling," stores a fixed percentage of the generated traces. Duration-based sampling stores traces with durations that are greater than a predefined threshold. Error-based sampling stores only traces that record errors. However, these conventional sampling procedures fail to distinguish the different trace types and durations during sampling which leads to information distortion. Information distortion occurs when infrequently occurring traces are not included in the sampled traces. For example, conventional trace sampling procedures fail to consider the frequencies of different trace types and trace durations. Infrequently generated trace types and trace durations may contain information that is an indication of a performance problem with an application. However, because conventional sampling procedures do not make a distinction between high and low frequency generated trace types and trace durations, there is a risk that sampled traces obtain from conventional sampling procedures will not contain any, or not contain a sufficient representation, of the infrequently generated traces, resulting in a loss of potentially important information needed in troubleshooting performance of an application. As a result, troubleshooting performance problems with sampled traces obtained with conventional sampling procedures often gives an inaccurate representation of the trace types and durations which misleads administrators in identifying interesting performance patterns and misleads troubleshooting algorithms and administrators in detecting the root cause of a performance problem.

Computer-implemented methods and systems described below perform intelligent sampling of application traces in accordance with a user-selected sampling rate. The traces are generated for an application. The sampling and compression described below may be performed in real time on a stream of traces or performed on traces read from a trace database. Computer-implemented intelligent sampling described below stores enough traces across the different trace types and different durations regardless of frequency to enable accurate troubleshooting of performance problems without information distortion created by conventional sampling procedures. In particular, computer-implemented intelligent sampling methods and systems described below generate different sampling rates for different trace types and durations. The sampling rates for low frequency trace types and durations are larger than the sampling rates for higher frequency' trace types and durations. The sampling rates ensure that low frequency trace types and durations are sampled with a larger sampling rate than high frequency trace types and duration. Intelligent sampling described herein may be performed in place of or on the sampled traces obtained after the standard rate-base, duration-based, and error-based sampling procedures have been performed. Troubleshooting and root cause analysis is applied the sampled traces to identify the source of performance problems with the application and the application components. Computer-implemented methods and systems may then employ remedial measures to correct the performance problems. For example, VMs or containers executing application components may be migrated to different hosts to increase performance. Additional VM or containers may be started to alleviate the workloads on already existing VMs and containers. Network bandwidth may be increased to reduce latency between peer VMs.

Figure 15:
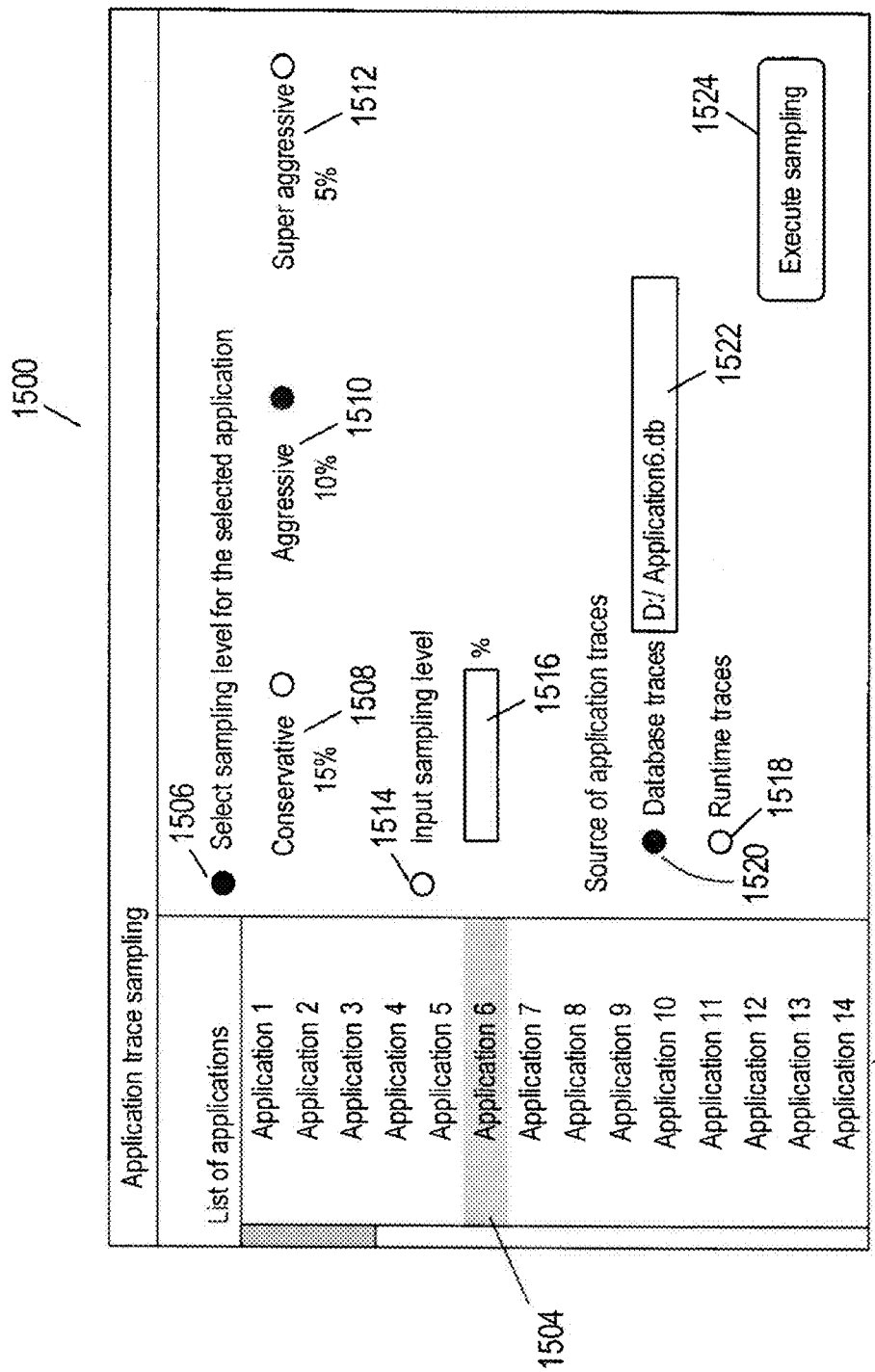
FIG. 15 shows an example graphical-user interface ("GUI") that enables a user to select an application and select a sampling rate for sampling traces of the selected application.

FIG. 15 shows an example graphical-user interface ("GUI") 1500 that enables a user to select an application and input a sampling rate for sampling traces of the selected application. A user, such as a system administrator or application owner, selects an application from a list of application provided in window 1502. For example, highlighted entry 1504 indicates a user has select "Application 6" by clicking on the application name with the cursor. The example GUI 1500 includes two ways the user may input a sampling level. The sampling level is the percentage (i.e., fraction) of traces that are to be sampled from traces and stored in a data storage device. A user may select choose to use a present sampling levels by clicking on button 1506. The user then selects one of the preset sampling levels identified as "conservative" 1508, "aggressive" 1510, and "super aggressive" 1512 as correspond to storing 15%, 10%, and 5% of the traces in the data storage device. The user may also choose to input a sampling level by clicking on button 1514 and entering a sampling level in field 1518 or sample traces stored in a database of traces by clicking on button 1520 and confirm a location for the database in field 1522. In this example GUI, shaded buttons 1506 1510 indicates that the use selected a preset sampling rate of 10% (i.e., aggressive sampling) and selected sampling of the database used to store the traces for "Application 6." When a user clicks on the "Execute sampling" button 1524, the sampling is executed on the traces at user-selected sampling rate as described below.

Conservative, aggressive, and super aggressive sampling rates correspond to different fractions of traces sampled from runtime traces or database traces of an application. For example, a conservative sampling rate samples and stores a larger number of traces than an aggressive sampling rate and an aggressive sampling rate samples and stores a larger number of traces than a super aggressive sampling rate. In the example GUI 1500 of FIG. 15, a user is allowed to pick a sampling rate from a range of sampling rates. In another implementation, a GUI 1500 may be configured to allow a user to select only one of three sampling rates: conservative, aggressive, and super aggressive.

Figure 16:
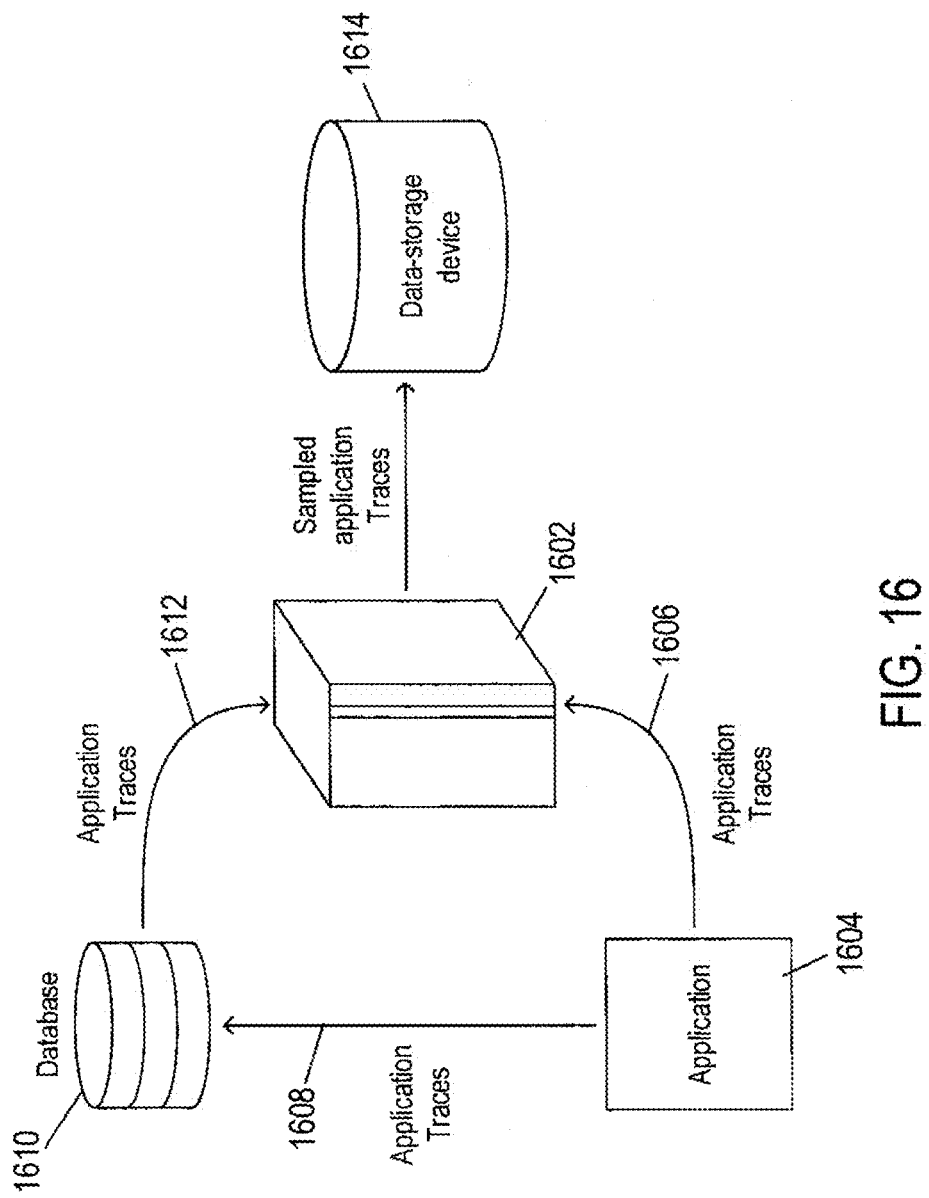
FIG. 16 shows an example of a computer system that executes machine-readable instructions for sampling traces produced by an application.

Computer-implemented methods and systems for intelligent sampling of application traces described below are encoded in machine-readable instructions that are executed in a computer system, such as a server computer. FIG. 16 shows an example of a computer system 1602 that executes machine-readable instructions for sampling traces produced by an application 1604. The traces may be sent directly from the application to the computer system 1602 as indicated by directional arrow 1606. Alternatively, the traces may be stored in a trace database 1608 as indicated by directional arrow 1610 and the computer system 1602 reads the traces from the database 1608 as indicated by directional arrow 1612. The computer system 1602 applies the user-selected sampling rate to the traces as described below and stores sampled traces in the data storage device 1614, thereby reducing the number of traces.

Figure 17:
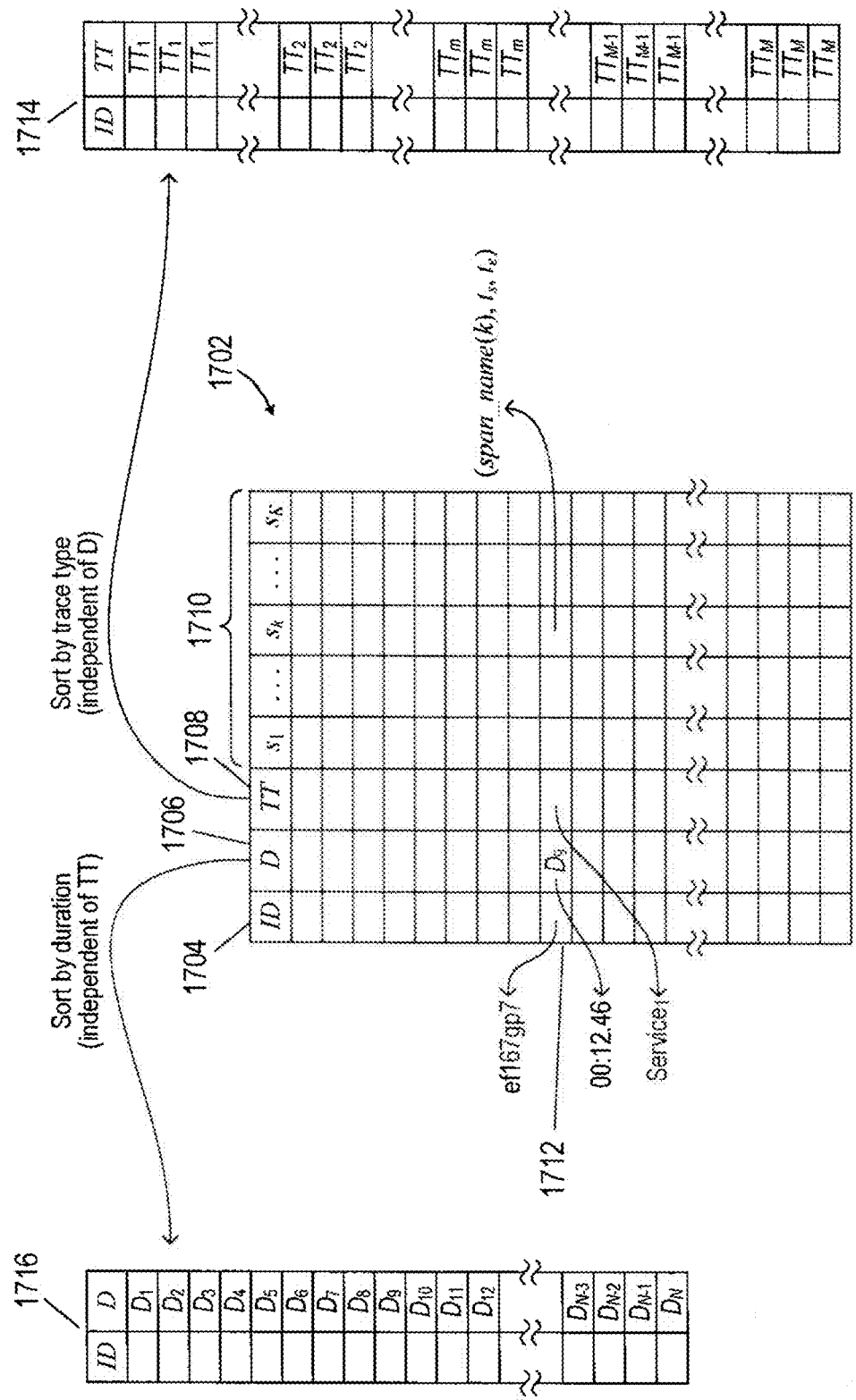
FIG. 17 shows an example of application trace data generated by an application.

FIG. 17 shows an example of application trace data 1702 generated by an application. The trace data 1702 may be stored in a trace database or sent directly to the server computer 1602 and stored in a buffer. Each row represents information associated with a trace. Each trace is assigned a trace identification ("ID"). Column 1704 is a list of trace IDs assigned to the traces in the trace data. Column 1706 is a list of durations of the traces. Column 1708 lists the trace type (i.e., root span). Columns 1710 list K different services or functions as described above with reference to FIG. 14B. Each entry in columns 1710 contains a span-tuple (span-name(k), $t_s$, $t_e$), where span-name(k) is a span name, $t_s$ is a start time of the span, and $t_e$ is an end time of the span. For example, trace 1712 has a trace ID "ef167gp7," a trace duration of 00:12.46 seconds, and a trace type "Service$_1$," which is the name of the root span of the trace.

Computer-implemented methods described below are able to perform three different processes for sampling traces. One process performs trace-type sampling based on frequencies of trace types. A second process performs sampling based on durations of traces independent of the trace type. A third process performs a hybrid trace-type and duration sampling. Each process is described separately below.

Trace-Type Sampling

Trace-type sampling is applied when trace types record important information about an application and frequent and infrequent trace types are preserved to investigate the application's performance. The trace-type sampling rate is different for each trace type and is inversely proportional to the frequency of the trace type in the trace data. The traces recorded in a set of trace data are sorted into groups of traces with the same trace type independent of trace durations and the number of traces in each group of traces are counted. Suppose a set of trace data contains N traces and M different trace types. Let $N_m$ be the number of traces with the m-th trace type, where index m=1, . . . , M. The number of traces in the set of trace data is related to the different trace types by $$N = \sum_{m=1}^{M} N_m$$

A frequency of occurrence of the m-th trace type in the set of trace data is given by:

$$p_m = \frac{N_m}{N} \qquad (1)$$

FIG. 17 shows an example of the traces of the set of trace data 1702 sorted according to trace types to obtain sorted trace types 1714. For the sake of illustration, the durations and span information are omitted. The trace types are denoted by $TT_m$, where m=1, . . . , M and M is the number of different trace types in the trace data 1702. Suppose the trace data contains 10,000 traces with 520 traces of trace type $TT_1$ (i.e., $N_1$=520) and 1,070 traces of trace type TT$_2$ (i.e., N$_2$=1,070). The frequency of occurrence of the trace type TT$_1$ is p$_1$=0.052 and the frequency of occurrence of the trace type TT$_2$ is p$_2$=0.107.

The trace-type sampling rate of each m-th trace type is the inverse of the frequency of occurrence of the m-th trace type and is given by.

$$r_m = 1 - (p_m)^\beta \quad (2)$$

where $0 \leq \beta$ and is called the "trace-type sampling parameter."

The trace-type sampling rate in Equation (2) is the fraction of m-th trace type traces to be sampled and stored in a data storage device. The trace-type sampling parameter β corresponds to an amount of trace sampling based on the user-selected sampling level described above. For example, "conservative" sampling corresponds to β=1, "aggressive" sampling corresponds to β=0.5, and "super aggressive" sampling corresponds to β=0.25. The trace-type sampling parameter β may be selected to provide the user-selected sampling level as described below.

The number of traces of the m-th trace type stored in the data storage device is given by:

$$\overline{N}_m = N_m \times r_m \quad (3)$$

where $\overline{N}_m$ is rounded to the nearest integer number.

The $\overline{N}_m$ traces are randomly sampled from the group of $N_m$ traces and are stored in a data storage device as described below. The remaining unsampled traces of the m-th trace type (i.e., $N_{rem} = N_m - \overline{N}_m$) are discarded by deleting the traces from the data storage device or from a buffer where traces are temporarily stored during sampling.

Each trace type has an associated sampling rate represented by Equation (2). The trace-type sampling rate is the fraction of traces that belong to the m-th trace type and are sampled and stored in a data storage device. The trace-type sampling rate represented by Equation (2) ensures that rarely occurring trace types are sampled at a higher sampling rate than more frequently occurring trace types. Consider the example above with the frequency of occurrence p$_1$=0.0520 for the trace type TT$_1$ and the frequency of occurrence p$_2$=0.1070 for the trace type TT$_2$. The following table shows the trace-type sampling rates for the example trace types TT$_1$ and TT$_2$:

| Table of Trace-type Sampling Rates | | | |
| --- | --- | --- | --- |
| Trace type | Conservative (β = 1) | Aggressive (β = 0.5) | Sup. Agg. (β = 0.25) |
| TT$_1$ | 0.948 | 0.771 | 0.522 |
| TT$_2$ | 0.893 | 0.673 | 0.428 |

Note that traces with the less frequently occurring trace type TT$_1$ are sampled with a larger trace-type sampling rate than the more frequently occurring trace type TT$_2$ across the conservative, aggressive, and super aggressive sampling rates.

Figure 18:
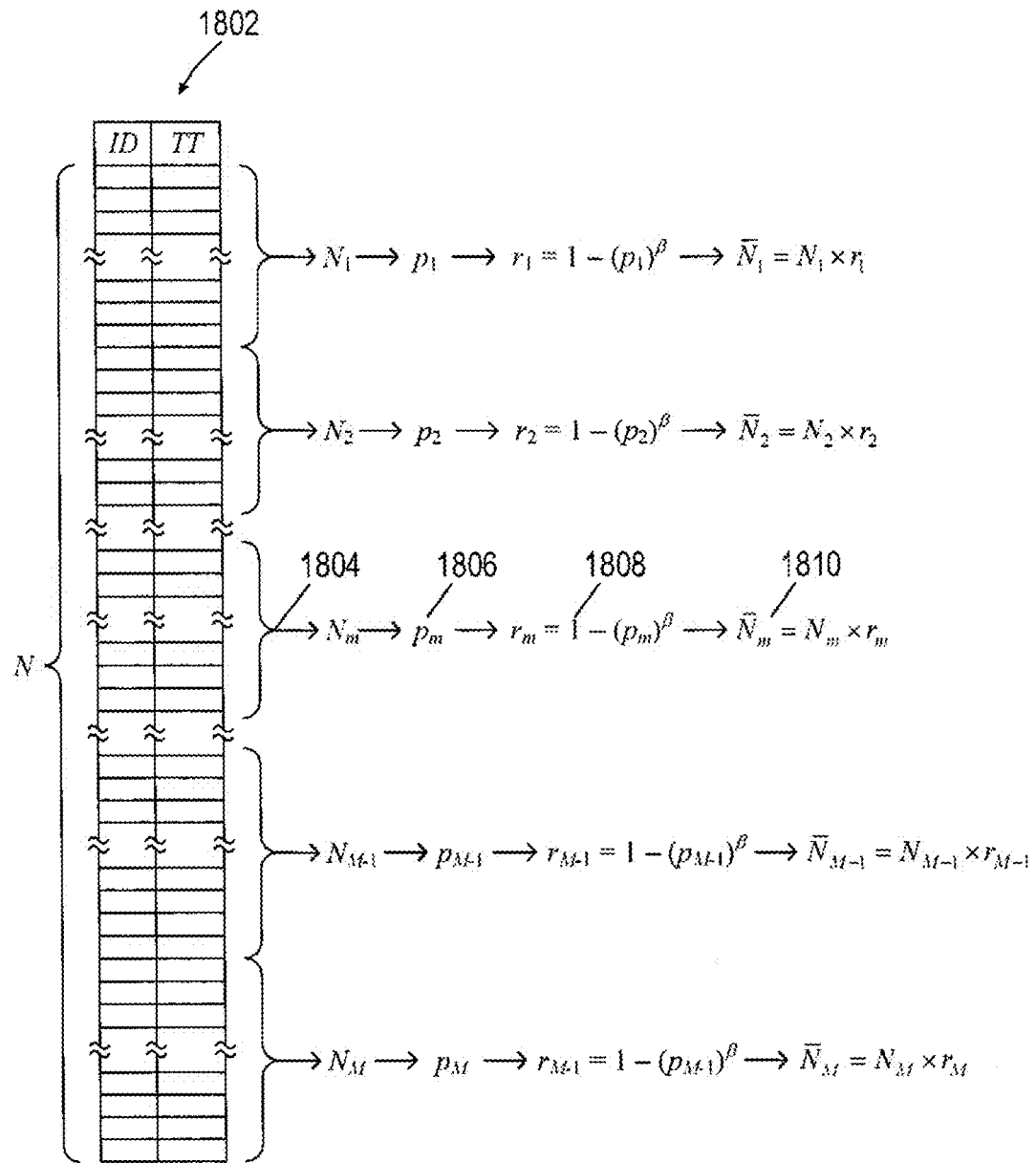
FIG. 18 shows an example calculation of traces sampled from a set trace data sorted according to trace type.

FIG. 18 shows an example calculation of the number of traces sampled from a set trace data 1802 sorted according to trace type. The set of trace data comprises N traces and M different groups of traces where the traces in each group are the same trace type. For example, group of traces 1804 has N$_m$ traces with the same trace type. For each group of traces, a frequency of occurrence is computed as described above with reference to Equation (1) and a trace-type sampling rate is computed as described above with reference to Equation (2). For example, frequency of occurrence p$_m$ 1806 and trace-type sampling rate r$_m$ 1808 are computed for the group of traces 1804 according to Equations (1) and (2), respectively. The trace-type sampling rates are used to determine the number of traces that are sampled from each group of traces. The traces may be randomly sampled from each group then stored in a data storage device. For example, $\overline{N}_m$ 1810 traces may be randomly sampled from the group of traces 1804.

Each trace type has a separate compression ratio and compression rate. The compression ratio of the m-th trace type is $1/(p_m)^\beta$. The compression rate of the m-th trace type is $1 - (r_m)^\beta = (p_m)^\beta$. Let $\overline{N}$ be the total number of traces sampled from a set of trace data for each of the M different trace-type sampling rates. The total number of traces sampled from the set of trace data is related to the number of traces in the original set of trace data as follows:

$$\overline{N} = \sum_{m=1}^{M} \overline{N}_m = \sum_{m=1}^{M} N_m \times r_m = N \sum_{m=1}^{M} (1 - (p_m)^\beta) p_m = N \times G^{(\beta)}$$

where $$G^{(\beta)} = \sum_{m=1}^{M} p_m * (1 - (p_m)^\beta) = 1 - \sum_{m=1}^{M} (p_m)^{\beta+1}$$

is the modified Gini index for the trace type distribution $\{p_m\}$. The modified Gini index equals the fraction of stored traces sampled from the set of trace data across the M different trace types:

$$G^{(\beta)} = \frac{\overline{N}}{N}$$

The compression rate across the different trace types is given by $$C^{(\beta)} = 1 - G^{(\beta)} \quad (4a)$$

Trace-type sampling is selected when the frequencies of occurrence of the different event types are diverse. Diversity of frequencies of occurrence may be measured by the modified Gini index or entropy of the frequencies of occurrences. For example, trace-type sampling may be selected when the modified Gini index satisfies the following condition:

$$G^{(\beta)} \leq Th_G \quad (4b)$$

where $Th_G$ is a modified Gini index threshold (e.g., $Th_G$=0.1, 0.05, or 0.01).

When the conditions given in Equation (4b) is not satisfied, trace-type information is not adequate for investigating performance of an application. Trace durations may contain more information that can be used to investigate performance of the application.

Duration Sampling

Computer-implemented methods perform duration sampling on trace durations independent of the trace type. Traces of the trace data are sorted based on duration. For example, the traces may be sorted from shortest (longest) duration to longest (shortest) duration. Unlike conventional duration-based sampling, duration sampling described herein produces a plurality of duration-sampling rates, each duration-sampling rate corresponds to a different bin of the histogram of trace durations. The duration-sampling rates are used to separately sample traces in the corresponding bins of the histogram.

Returning to FIG. 17, traces of the set of trace data 1702 are sorted according to trace durations to obtain duration-sorted traces 1716. For the sake of illustration, trace types and span information are omitted. The durations are denoted by $D_n$, where n=1, . . . , N. In this example, the traces are sorted from longest duration to shortest duration with $D_1$ representing the longest trace duration and $D_N$ representing the shortest duration.

Computer-implemented methods compute upper and lower thresholds for distinguishing outlier traces of the duration-sorted traces. Traces with durations that are greater than the upper threshold are discarded, and traces with durations that are less than the lower threshold are discarded. A histogram is constructed from the traces remaining in the duration-sorted traces.

Upper and lower quantiles are used to partition the duration-sorted traces into three groups of traces. The upper and lower quantiles are given by $$M(\text{upper}) = q_{1-s}$$

$$M(\text{lower}) = q_s$$

where 0<s<1 (e.g., s=0.05 or s=0.1).

The lower quantile $q_s$ is a time that partitions the duration-sorted traces such that s traces have durations that are less than or equal to the quantile $q_s$. The upper quantile $q_{1-s}$ is a time that partitions the duration-sorted traces such that s traces have durations that are greater than or equal to the quantile $q_{1-s}$. For example, if s=0.1, the lower quantile $q_{0.1}$ denotes a time that partitions the duration-sorted traces such that 10% of the traces have durations that are less than or equal to $q_{0.1}$ and the upper quantile $q_{0.9}$ denotes a time that partitions the duration-sorted traces such that 10% of the traces have durations that are greater than or equal to $q_{0.9}$. Upper distances are computed for traces with durations that are greater than or equal to the upper quantile by $$\text{dist(upper)} = |\text{data(upper)} - M(\text{upper})| \quad (5a)$$

and lower distances are computed for traces with durations that are less than or equal to the lower quantile by $$\text{dist(lower)} = |\text{data(lower)} - M(\text{lower})| \quad (5b)$$

where data(upper) represents a trace duration that is greater than or equal to M(upper); and data (lower) represents a trace duration that is less than or equal to M(low).

A mean average deviation ("MAD") is computed for the set of upper distances and is denoted by MAD(upper). A MAD is computed for the set of lower distances and is denoted by MAD(lower). Upper and lower thresholds for the duration-sorted traces are computed as follows:

$$Th_{upper} = \min(M(\text{upper}) + \Gamma \times \text{MAD(upper)}, \max(\text{duration})) \quad (6a)$$

and $$Th_{lower} = \max(M(\text{lower}) - \Gamma \times \text{MAD(lower)}, \min(\text{duration})) \quad (6b)$$

where

0<Γ<1 (e.g., Γ=0.25, 0.20, or 0.30);

max(duration) is the maximum trace duration; and min(duration) is the minimum trace duration.

A trace duration $D_n$ is identified as an outlier if the trace duration satisfies one of the following conditions:

$$D_n > Th_{upper} \quad (7a)$$

$$D_n < Th_{lower} \quad (7b)$$

A histogram is constructed from traces with durations that satisfy the following condition:

$$Th_{upper} \geq D_n \geq Th_{lower} \quad (7c)$$

Figure 19:
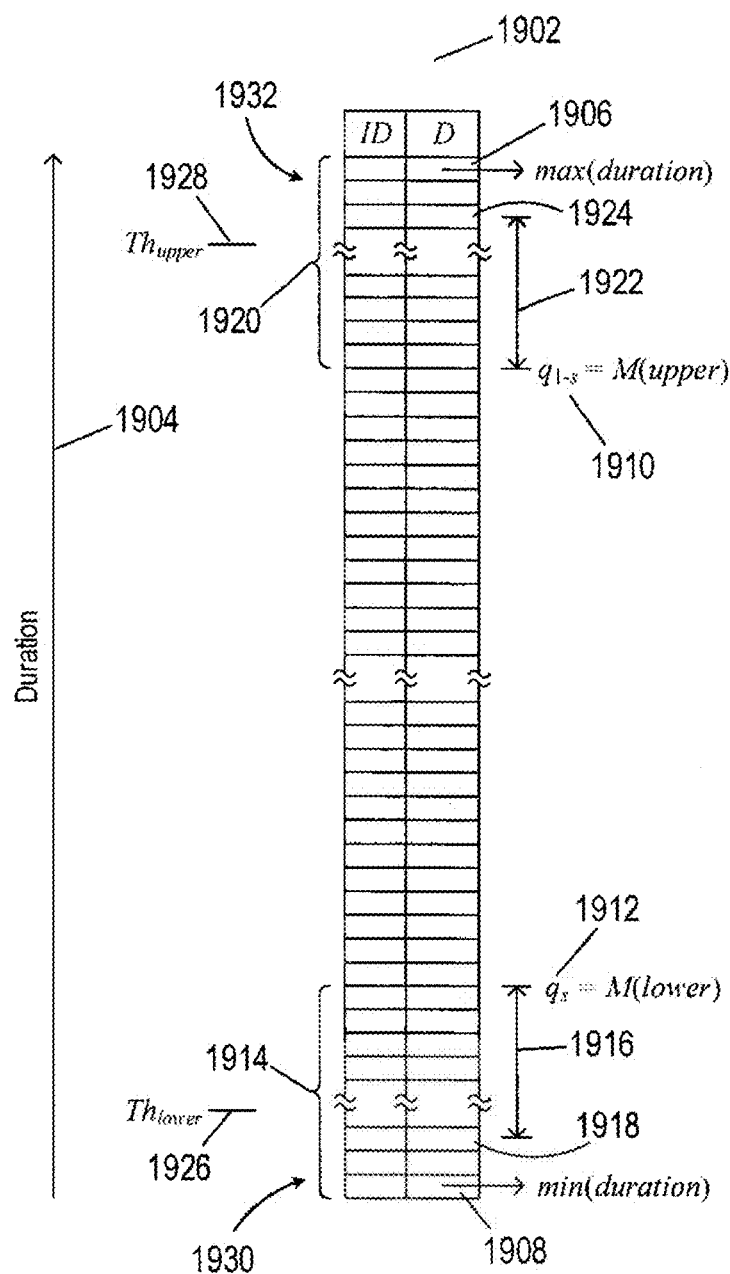
FIG. 19 shows an example of partitioning duration-sorted traces.

FIG. 19 shows an example of partitioning duration-sorted traces 1902. Directional arrow 1904 represents increasing durations of the traces with trace 1906 have the maximum duration max(duration) trace 1908 having the minimum duration min(duration). Mark 1910 represents an upper quantile $q_{1-s}$. Mark 1912 represents a lower quantile $q_s$. The quantiles $q_{1-s}$ and $q_s$ partition the duration-sorted traces 1902 into three groups of traces. The first group comprises s fraction of the traces with durations greater than or equal to $q_{1-s}$. The second group comprises s fraction of the traces with durations less than or equal to $q_s$. The third group comprises 1-2 s fraction of traces with durations between $q_s$ and $q_{1-s}$. Distances are calculated for traces 1914 according to Equation (5a). For example, directional arrow 1916 represents a distance between trace duration 1918 and the lower quantile $q_s$ 1912. Distances are calculated for traces 1920 according to Equation (5b). For example, directional arrow 1922 represents a distance between trace duration 1924 and the upper quantile $q_{1-s}$ 1910. The MAD MAD (lower) is computed for the distances associated with traces 1914. Is The MAD MAD(upper) is computed for the distances associated with traces 1920. Lower threshold 1926 is computed using Equation (6b). Upper threshold 1928 is computed using Equation (6a). In this example, traces 1930 with durations that are less than the lower threshold 1926 and are identified as outliers and traces 1932 with durations that are greater than the upper threshold 1928 and are identified as outliers.

Traces with durations that satisfy either of the conditions given by Equations (7a) and (7b) are outliers and lie within the intervals [min(duration),$Th_{lower}$) and ($Th_{upper}$,max(duration)], respectively. The range of time between the upper and lower thresholds is partitioned into B equal duration intervals denoted by [$c_{b-1}$, $c_b$), for b=1, . . . , B−1, and [$c_{B-1}$, $c_B$], where $c_0 = Th_{lower}$ and $c_B = Th_{upper}$. Each bin of the histogram corresponds to a time interval. A trace with a duration that satisfies the condition given by Equation (7c) and lies within one of the intervals is assigned to a bin that corresponds to the interval. The number of traces in each bin are counted. The total number of traces in each bin are denoted by $n_b$, where b=1, . . . , B. For example, $n_b$ represents the total number of traces in the interval [$c_{b-1}$, $c_b$) and $n_B$ represents the total number of traces in the interval [$c_{B-1}$, $c_B$]. The number of traces in the intervals between the upper and lower thresholds are used to construct a histogram of traces by assigning traces to bins that correspond to the intervals between the upper and lower thresholds and counting the number of traces in each bin.

Figure 20:
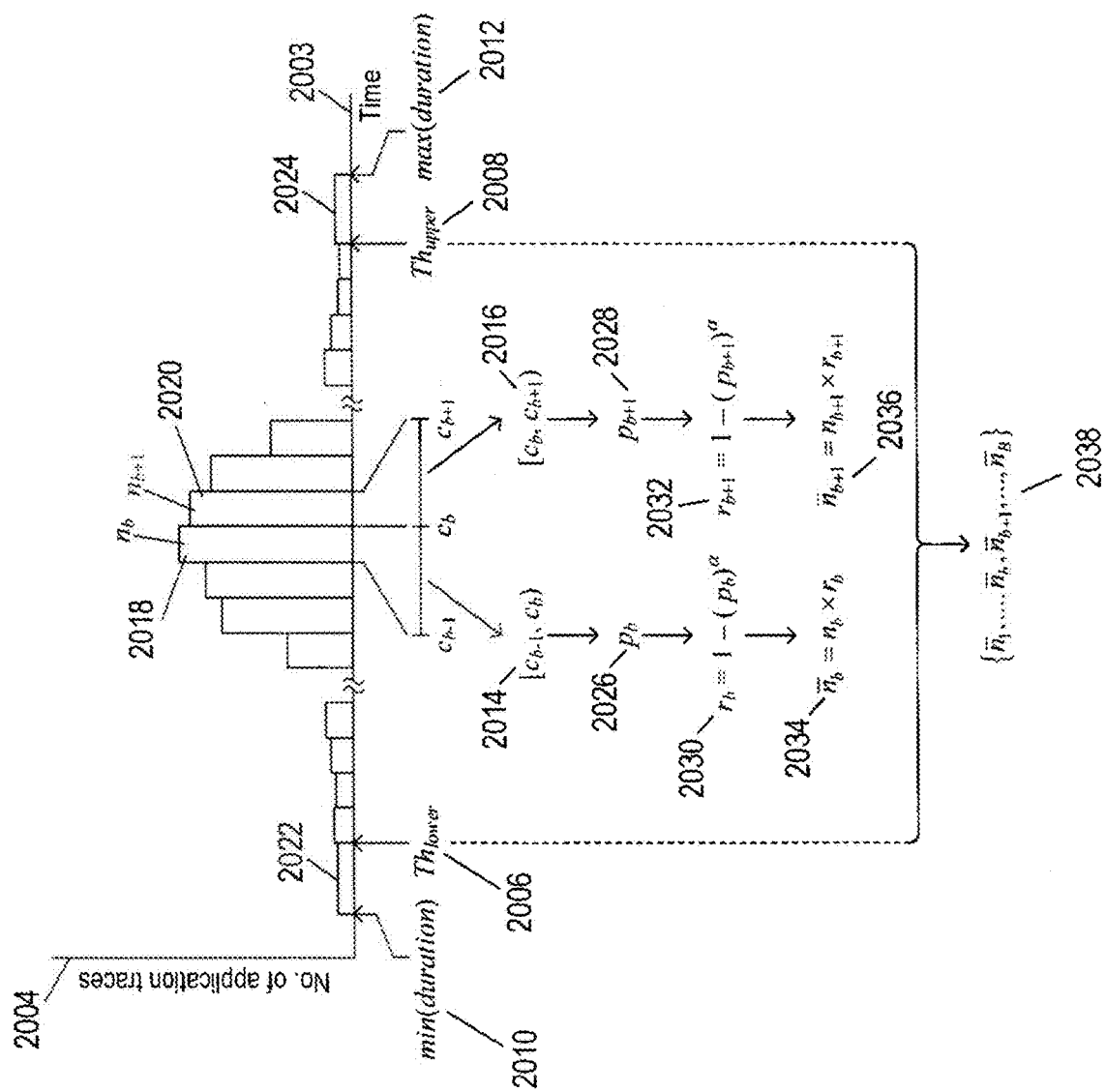
FIG. 20 shows an example histogram constructed from trace data.

FIG. 20 shows an example histogram constructed from trace data. Horizontal axis 2002 represents time. Vertical axis 2004 represents number of traces. Time axis 2002 is partitioned into intervals between a lower threshold 2006 and an upper threshold 2008. In this example, the time axis 2002 includes a minimum duration 2010 and a maximum duration 2012. Bars represent the number of traces with durations that lie within the intervals (i.e., number of traces that lie within corresponding bins). For example, FIG. 20 shows a magnified view of intervals 2014 and 2016. Bar 2018 represents the number of traces, $n_b$, in the interval 2014. Bar 2020 represents the number of traces, $n_{b+1}$, in the interval 2016. Bar 2022 represents the number of outlier traces in the interval [min(duration), $Th_{lower}$). Bar 2024 represents the number of outlier traces in the interval ($Th_{upper}$, max(duration)].

A histogram may also be constructed for the trace durations using the t-digest approach described in "Computing extremely accurate quantiles using t-digests," T. Dunning et. al., arXiv.org, Cornell University, Feb. 11, 2019. Instead of storing the entire set of trace data based on trace durations, t-digest stores only the results of data clustering, such as centroids of clusters and trace counts in each cluster.

A histogram of traces in the B bins is given by $$\text{Hist}(B) = \{n_1, \ldots, n_B\}$$

where $n_b$ is the number of traces in the b-th bin with durations in the interval $[c_{b-1}, c_b)$ for $b = 1, \ldots, B-1$; and $n_B$ is the number of traces in the B-th bin with durations in the interval $[c_{B-1}, c_B]$.

The frequency of occurrence of traces in the b-th bin of the histogram is given by:

$$p_b = \frac{n_b}{N_H} \quad (8)$$

where $$N_H = \sum_{b=1}^{B} n_b \quad (9)$$

The duration-sampling rate for traces in the b-th bin is given by $$r_b = 1 - (p_b)^\alpha \quad (9)$$

where $0 < \alpha$ and is called the "duration-sampling parameter."

The duration-sampling rate in Equation (9) is the fraction of traces to be sampled from the b-th bin and stored in a data storage device. The duration-sampling parameter $\alpha$ corresponds to an amount of trace sampling based on the user-selected sampling level described above. For example, "conservative" sampling corresponds to $\alpha = 1$, "aggressive" sampling corresponds to $\alpha = 0.5$, and "super aggressive" sampling corresponds to $\alpha = 0.25$. The duration-sampling parameter $\alpha$ may be selected to provide the user-selected sampling level as described below.

The duration-sampling rate in Equation (9) may be different for each bin and is inversely proportional to the frequency of occurrences of the traces in each bin. For example, suppose the number of traces in a histogram comprises 10,000 traces with 460 traces in a bin $B_1$ (i.e., $n_1 = 460$) and 2.035 traces in a bin $B_2$ (i.e., $n_2 = 2.035$). The frequency of occurrence of traces in $B_1$ is $p_1 = 0.046$ and the frequency of occurrence of traces in $B_2$ is $p_2 = 0.204$. The following table shows the duration-sampling rates for the example traces in $B_1$ and $B_2$:

| Table of Duration-sampling Rates | | | |
|---|---|---|---|
| Bins | Conservative ($\alpha = 1$) | Aggressive ($\alpha = 0.5$) | Sup. Agg. ($\alpha = 0.25$) |
| $B_1$ | 0.954 | 0.786 | 0.537 |
| $B_2$ | 0.796 | 0.548 | 0.328 |

Note that the less frequently occurring traces in the bin $B_1$ are sampled with a larger duration-sampling rate than the more frequently occurring traces in the bin $B_2$ across the conservative, aggressive, and super aggressive sampling rates.

The number of traces sampled from the b-th bin and stored in the data storage device is given by:

$$\bar{n}_b = n_b \times r_b \quad (10)$$

where $\bar{n}_b$ is rounded to the nearest integer number.

Equation (9) represents how each bin has a corresponding sampling rate with Equation (10) corresponding to the number $\bar{n}_b$ traces are randomly sampled from the $n_b$ traces in the b-th bin. The $\bar{n}_b$ sampled traces are stored in a data storage device. The remaining unsampled traces ($n_{rem} = n_b - \bar{n}_b$) are discarded by deleting the unsampled traces from a data storage device.

Returning to FIG. 20, a frequency of occurrence $p_b$ 2026 is computed for traces with durations in the interval $[c_{b-1}, c_b)$ 2014 and a frequency of occurrence $p_b$ 2028 is computed for traces with durations in the interval $[c_b, c_{b+1})$ 2016. A duration-sampling rate $r_b$ 2030 is computed for traces in the interval $[c_{b-1}, b_b)$ 2014 (i.e., corresponding b-th bin). A duration-sampling rate $r_{b+1}$ 2032 is computed for traces in the interval $[c_b, c_{b+1})$ 2014 (i.e., corresponding (b+1)-th bin). The number of traces sampled from the b-th bin are $\bar{n}_b$ 2034. The number of traces sampled from the (b+1)-th bin are $\bar{n}_{b+1}$ 2036. The set of sample traces 2038 obtained from sampling each bin of the traces are stored in a data storage device.

The sampling rate over the B bins can be measured via a modified Gini index that corresponds to a distribution $\{p_b\}_{b=1}^{B}$. The total number of traces obtained after sampling of bin is given by:

$$\bar{N}_H = \sum_{b=1}^{B} \bar{n}_b = \sum_{b=1}^{B} r_b \times n_b = N_H \sum_{b=1}^{B} p_b(1 - (p_b)^\alpha) = N_H \times G^{(\alpha)}$$

where the modified Gini index is given by $$G^{(\alpha)} = \sum_{b=1}^{B} p_b(1 - (p_b)^\alpha) = 1 - \sum_{b=1}^{B} (p_b)^{\alpha+1}$$

The modified Gini index equals the fraction of traces sample from the bins:

$$G^{(\alpha)} = \frac{\bar{N}_H}{N_H}$$

The compression rate across the durations of traces is given by $$C^{(\alpha)} = 1 - G^{(\alpha)} \quad (11)$$

Hybrid Sampling

When both trace types and trace durations are important for evaluating performance of an application, a hybrid combination of trace-type sampling and duration-based sampling may be applied across different trace types and different trace durations. Hybrid trace-type and duration-based sampling performs accurate sampling across different trace types that include traces with different durations.

Figure 21:
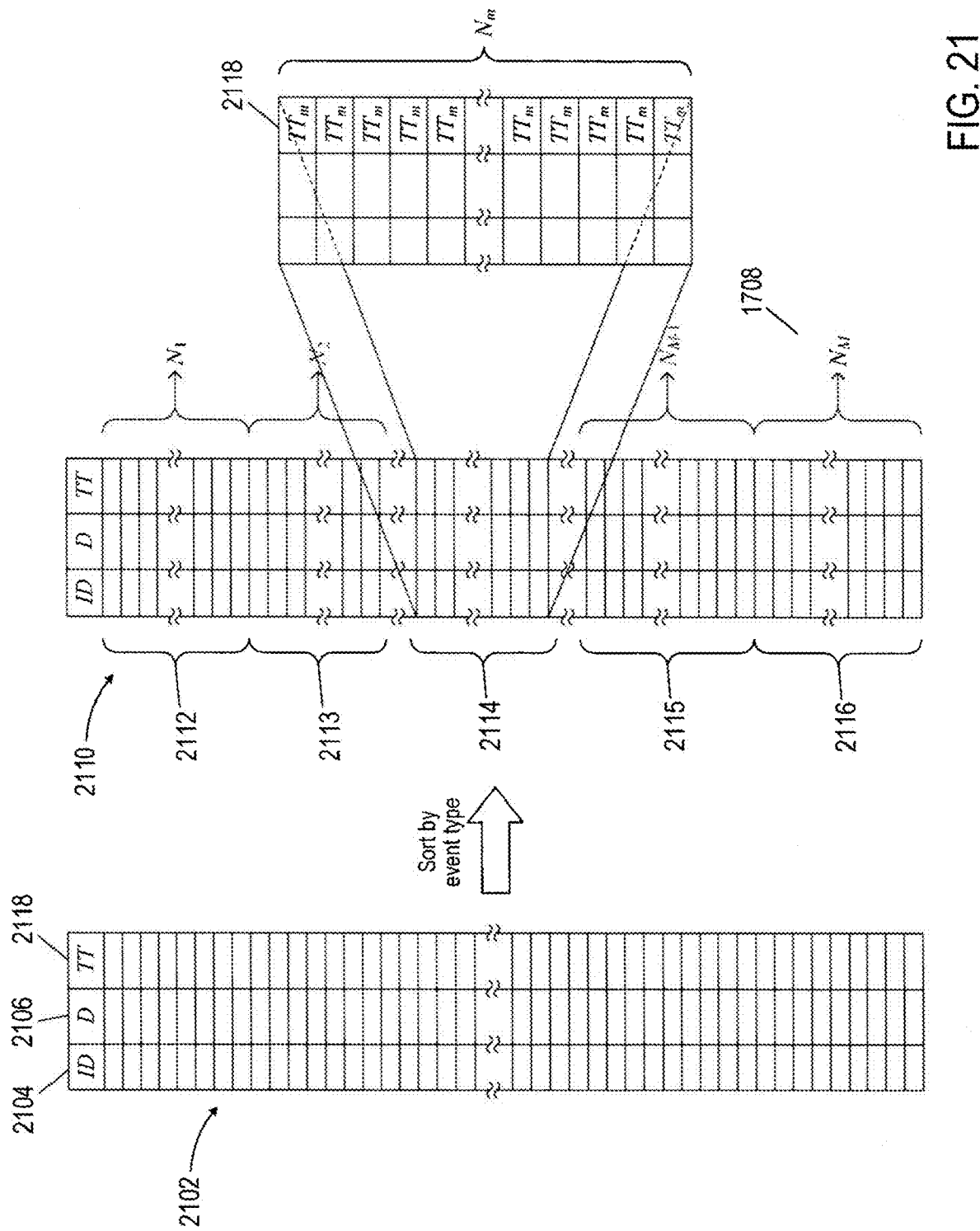
FIG. 21 shows a set of trace data sorted according to trace type.

Trace data is sorted into different trace types as described above with reference to FIG. 17. FIG. 21 shows a set of trace data 2102. Column 2104 contains a list of trace IDs. Column 2106 contains a list of trace durations. Column 2108 contains a list of trace types. For the sake of illustration, information regarding trace spans has been omitted. The set of trace data 2102 is sorted according to trace type to obtain a set of sorted trace data 2110. Groups of traces 2112-2116 contain $N_1$, $N_2$, $N_m$, $N_{M-1}$, and $N_M$ traces, respectively, each group having traces with the same trace type. But the trace types are different for each group. For example, the group of traces 2114 contains $N_m$ traces with the same m-th trace type 2118 denoted by $TT_m$.

A frequency of occurrence is computed for each group of traces as described above with reference to FIG. 18. The traces in each group of traces are sorted according to trace duration. A histogram is constructed for each group of sorted traces according to trace duration as describe above with reference to Equations (4a)-(6c). The range of time between upper and lower thresholds is partitioned into B equal duration intervals denoted by $[c_{b-1}, c_b)$, for b=1, ..., B-1, and $[c_{B-1}, c_B]$, where $c_O$ and $C_B$ correspond to the lower and upper thresholds, respectively. The number of traces in each interval (i.e., bin) are counted. The total number of traces in each interval are denoted by $n_b^{(m)}$, where subscript b=1, ..., B and superscript (m) identifies the m-th trace type of the group of traces. A frequency of occurrence is computed for the traces in each interval as follows:

$$p_b^{(m)} = \frac{n_b^{(m)}}{N_H^{(m)}} \tag{12}$$

where $$N_H^{(m)} = \sum_{b=1}^{B} n_b^{(m)}$$

Figure 22:
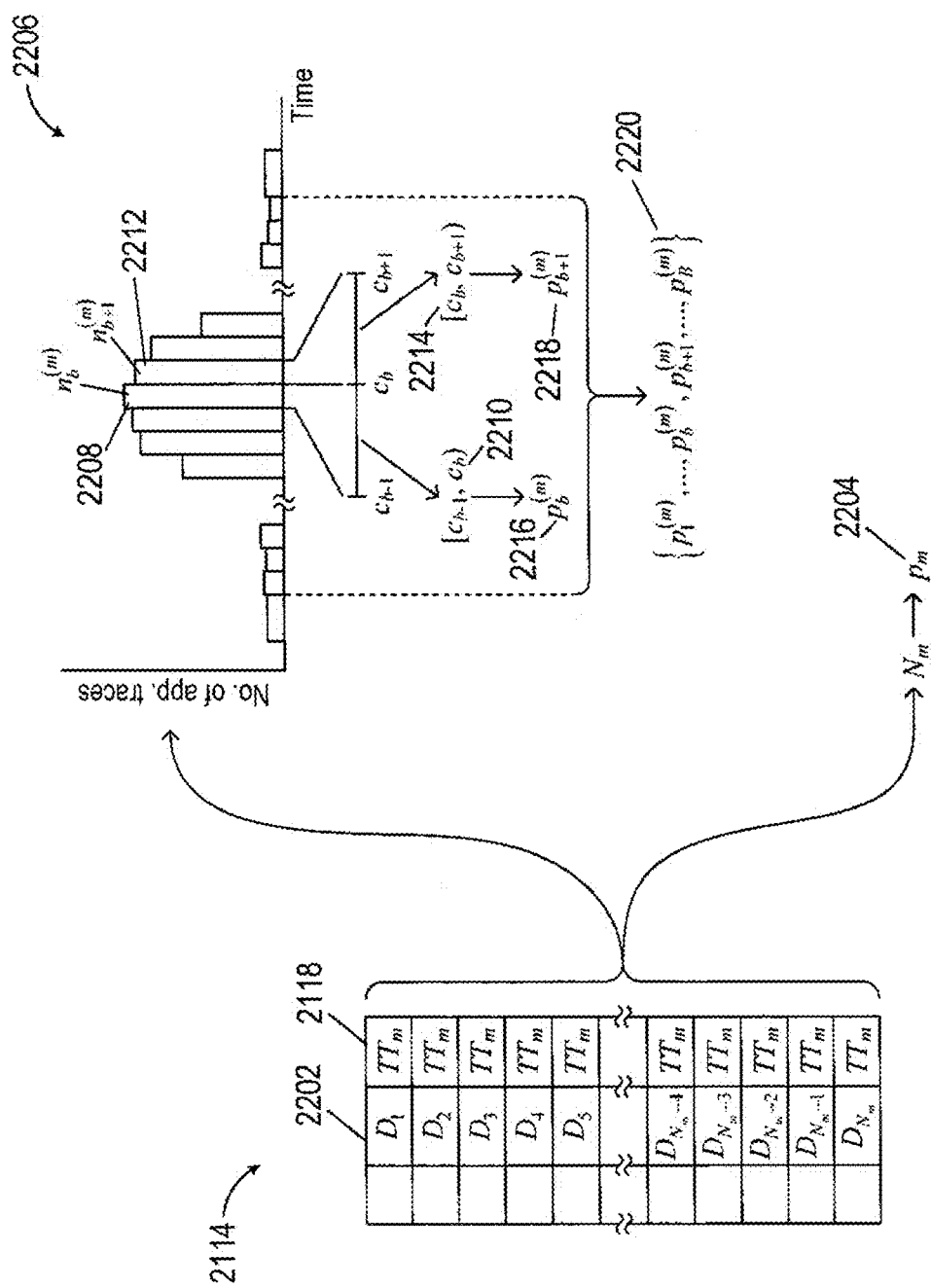
FIG. 22 shows an example of a group of traces sorted according to trace duration.

FIG. 22 shows an example of the group of traces 2114 of FIG. 21 sorted by trace duration. In this example, the traces are sorted from longest duration to shortest duration with $D_1$ representing the longest trace duration and $D_{N_m}$ representing the shortest duration. Column 2022 list durations of the traces in the group of traces after the traces in the group of traces 2114 has been sampled. A frequency of occurrence 2204 for the m-th trace type computed as described above with reference to Equation (1). Histogram 2206 is constructed from the durations of the group of traces 2114. The range of time between upper and lower thresholds 2206 and 2208 is partitioned into B equal duration intervals denoted by $[c_{b-1}, c_b)$, for b=1, ..., B-1, and $[c_{B-1}, c_B]$. where $c_O$ and $c_B$ correspond to the lower and upper thresholds, respectively. Bar 2208 represents the total number of traces $n_b^{(m)}$ in the interval $[c_{b-1}, c_b)$ 2210 and bar 2212 represents the total number of traces $n_b^{(m)}$ in the interval $[c_b, c_{b+1})$ 2214. A frequency of occurrence is computed for each interval to obtain a set of frequencies of occurrences 2220.

Figure 23:
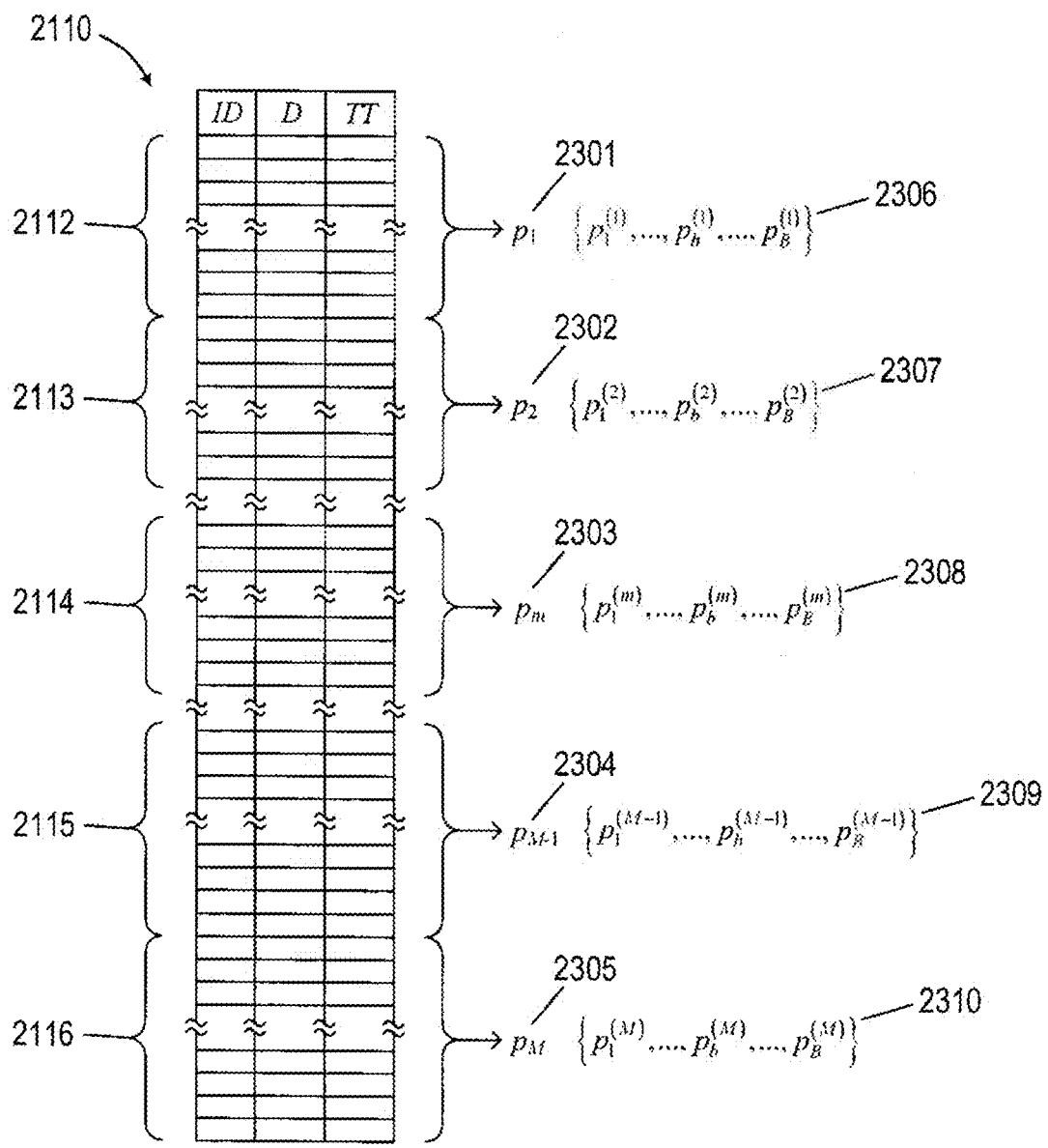
FIG. 23 shows examples of frequency of occurrences obtained for groups of traces and frequencies of occurrences for bins of each group of trace types.

For each group of trace types, a frequency of occurrence, $p_m$, is computed, where m=1, ..., M. For each bin of each group of trace types, a frequency of occurrence, $p_b^{(m)}$, is computed, where b=1, ..., B. FIG. 23 shows examples of frequency of occurrences 2301-2305 obtained for each of the groups of traces 2112-2116 of the set of sort traces 2110 in FIG. 21 and sets of frequencies of occurrences 2306-2310 for the B bins of each group of trace types 2112-2116.

A hybrid-sampling rate for each bin of the m-th group of traces is given by $$r_b^{(m)} = 1 - (p_m)^\beta (p_p^{(m)})^\alpha \tag{13}$$

where $0 \leq \alpha$ and $0 \leq \beta$.

The hybrid-sampling rate in Equation (13) may be different for each bin of each group of traces and is inversely proportional to the frequency of occurrences of the traces in each bin and each group of traces.

The number of traces sampled from the b-th bin and stored in the data storage device is given by:

$$\bar{n}_b^{(m)} = n_b^{(m)} \times r_b^{(m)} \tag{14}$$

where $\bar{n}_b$ is rounded to the nearest integer number.
Equation (14) represents how each bin has a corresponding sampling rate given by Equation (13) corresponding to the number $\bar{n}_b^{(m)}$ of traces that are randomly sampled from the $n_b^{(m)}$ traces in the b-th bin. The remaining unsampled traces (i.e., $n_{rem}^{(m)} = n_b^{(m)} - \bar{n}_b^{(m)}$) are discarded by deleting the unsampled traces from a data storage device.

The term $p_m p_b^{(m)}$ is the frequency of occurrence of the m-th trace type in the b-th bin. The sampling parameters $\alpha$ and $\beta$ correspond to an amount of trace sampling based on the user-selected level of sampling described above. For example, "conservative" sampling corresponds to $\alpha = \beta = 1$, "aggressive" sampling corresponds to $\alpha = \beta = 0.5$, and "super aggressive" sampling correspond; to $\alpha = \beta = 0.25$. Note that parameters $\alpha$ and $\beta$ are not limited to being equal to the same value. The parameters $\alpha$ and $\beta$ can be selected to place more sampling weight on trace type and less sampling weight on durations by selected as described below in optimization of sampling parameters.

The final sampling rate can be measured via a modified Gini index that corresponds to two-dimensional distribution $\{p_m p_b^{(m)}\}$, where b=1, ... B and m=1, ..., M. The total number of traces obtained after sampling B bins of the m-th trace type is given by:

$$\bar{N}_m = \sum_{b=1}^{B} \bar{n}_b^{(m)} = \sum_{b=1}^{B} r_b^{(m)} \times n_b^{(m)} = N_m \sum_{b=1}^{B} p_b^{(m)} (1 - (p_m)^\beta (p_b^{(m)})^\alpha) = N_m \times G_m^{(\beta,\alpha)}$$

The total number of traces obtained after sampling B bins of the M groups of traces is given by $$\bar{N} = \sum_{m=1}^{M} \bar{N}_m =$$

$$N \sum_{m=1}^{M} p_m G_m^{(\beta,\alpha)} = N \sum_{m=1}^{M} \sum_{b=1}^{B} p_m p_b^{(m)} (1 - (p_m)^\beta (p_b^{(m)})^\alpha) = N \times G^{(\beta,\alpha)}$$

where the modified Gini index is given by $$G^{(\beta,\alpha)} = \sum_{m=1}^{M} \sum_{b=1}^{B} p_m p_b^{(m)} (1 - (p_m)^\beta (p_b^{(m)})^\alpha) = 1 - \sum_{m=1}^{M} \sum_{b=1}^{B} (p_m)^{\beta+1} (p_b^{(m)})^{\alpha+1}$$

The modified Gini index equals the fraction of traces sample from the bins:

$$G^{(\beta,\alpha)} = \frac{\bar{N}}{N}$$

The compression rate for hybrid sampling of the traces is given by $$C^{(\beta,\alpha)} = 1 - G^{(\beta,\alpha)} \quad (15)$$

In an alternative implementation, rather than constructing a histogram for each trace type, a histogram is constructed for the full set of trace data as described above and a two-dimensional frequency of occurrence is computed for traces in each bin of the histogram and each trace type as follows:

$$p_{m,b} = \frac{n_{m,b}}{N_{M,B}} \quad (16)$$

where
b=1, ..., B;
m=1, ..., M;
$n_{m,b}$ is the total number of traces in the b-th bin and have the m-th trace type; and $$N_{M,B} = \sum_{m=1}^{M}\sum_{b=1}^{B} n_{m,b}$$

A hybrid-sampling rate for the b-th bin of the in-th group of traces is given by $$r_{m,b} = 1 - (p_{m,b})^{\alpha} \quad (17)$$

where $0 \le \alpha$.
The hybrid-sampling rate in Equation (17) is inversely proportional to the frequency of occurrences of the traces in each bin and each group of traces.

The number of traces sampled from the b-th bin with m-th trace type is given by:

$$\bar{n}_{m,b} = n_{m,b} \times r_{m,b} \quad (18)$$

where $\bar{n}_{m,b}$ is rounded to the nearest integer number. Equation (18) represents the number that are randomly sampled from the $n_{m,b}$ traces in the b-th bin and have the m-th trace type. The remaining unsampled traces (i.e., $n_{m,b}^{rem} = \bar{n}_{m,b} - n_{m,b}$) are discarded by deleting the unsampled traces from the data storage device.

The sampling parameters $\alpha$ corresponds to an amount of trace sampling based on the user-selected level of sampling described above. For example, "conservative" sampling corresponds to $\alpha=1$. "aggressive" sampling corresponds to $\alpha=0.5$, and "super aggressive" sampling corresponds to $\alpha=0.25$.

The final sampling rate can be measured via a modified Gini index that corresponds to a two-dimensional distribution $\{p_{m,b}\}$, where b=1, ... B and m=1, ..., M. The total number of traces obtained after sampling B bins of the M trace types is given by:

$$\bar{N}_{M,B} = \sum_{m=1}^{M}\sum_{b=1}^{B} \bar{n}_{m,b} = \sum_{m=1}^{M}\sum_{b=1}^{B} n_{m,b} \times (1-(p_{m,b})^{\alpha}) = N_{M,B}\sum_{m=1}^{M}\sum_{b=1}^{B} p_{m,b}(1-(p_{m,b})^{\alpha})$$

where the modified Gini index is given by $$\bar{G}^{(\alpha)} = \sum_{m=1}^{M}\sum_{b=1}^{B} p_{m,b}(1-(p_{m,b})^{\alpha})$$

The modified Gini index equals the fraction of sampled traces given by:

$$\bar{G}^{(\alpha)} = \frac{\bar{N}_{M,B}}{N_{M,B}}$$

The compression rate for hybrid sampling of the traces is given by $$\bar{C}^{(\alpha)} = 1 - \bar{G}^{(\alpha)} \quad (19)$$

Sampling Parameters

In one implementation, the sampling parameters are selected by a user. GUI 1500 in FIG. 15 may include fields that enable a user to input values for $\alpha$ and $\beta$. For example, the GUI 1500 may include fields that enable a user to define "conservative" sampling corresponds to $\alpha=\beta=1$. "aggressive" sampling corresponds to $\alpha=\beta=0.5$. and "super aggressive" sampling corresponds to $\alpha=\beta=0.25$.

In another implementation, the sampling parameters are determined based on the user-selected sampling level input via the GUI in FIG. 15. The sampling rates and corresponding compression rates depend on the corresponding modified Gini index $G^{(\gamma_i)}$ defined via a set of parameters $\gamma=\{\gamma_1, ..., \gamma_\tau\}$, where $\gamma_i \in \gamma$ and represents $\alpha$, $\beta$, or ($\beta$, $\alpha$). The efficiency of a sampling rate depends on the value of the parameters $\gamma_i$ that will produce a user-selected sampling level as described above with reference to FIG. 15. Alternatively, a user selects a sampling level that has a corresponding sampling rate and a corresponding parameter $\gamma_i$. For example, suppose a user defines a "conservative" sampling rate as storing 15% of unsampled traces. The optimal parameter value $\gamma_0$ satisfies the modified Gini index:

$$G^{(\gamma_0)} \approx 0.15$$

The parameter $\gamma_0$ is used as the trace-type sampling parameter $\beta$ in Equation (2), used as the duration-sampling parameter $\alpha$ in Equation (9), and used as the combination of trace-type and duration-sampling parameter in Equation (13). Suppose a user defines an "aggressive" sampling rate as storing 10% of unsampled traces. The optimal parameter value $\gamma_1$ satisfies the modified Gini index:

$$G^{(\gamma_1)} \approx 0.10$$

The parameter $\gamma_1$ is used as the trace-type sampling parameter $\beta$ in Equation (2), used as the duration-sampling parameter $\alpha$ in Equation (9), and used as the combination of trace-type and duration-sampling parameter in Equation (13). Suppose a user defines a "super aggressive" sampling as storing 5% of unsampled traces. The optimal parameter value $\gamma_2$ satisfies the following condition:

$$G^{(\gamma_2)} \approx 0.05$$

The parameter $\gamma_2$ is used as the trace-type sampling parameter $\beta$ in Equation (2), used as the duration-sampling parameter $\alpha$ in Equation (9), and used as the combination of trace-type and duration-sampling parameter in Equation (13). Optimization of the parameter $\gamma$ is solved based on the latest historical set of trace data. When traces of application exhibit static behavior the set optimal parameters rare hard coded for long term use. In case of an application with highly dynamic behavior, the optimal parameters γ are regularly determined.

The optimal parameters and corresponding modified Gini indices (i.e., percentage of sampled traces) may be computed in advance. When a user selects a particular sampling level the corresponding parameter may be obtained from the predetermined relationships between the optimal parameters and the modified Gini indices (i.e., percentage of sampled traces).

Figure 24A:
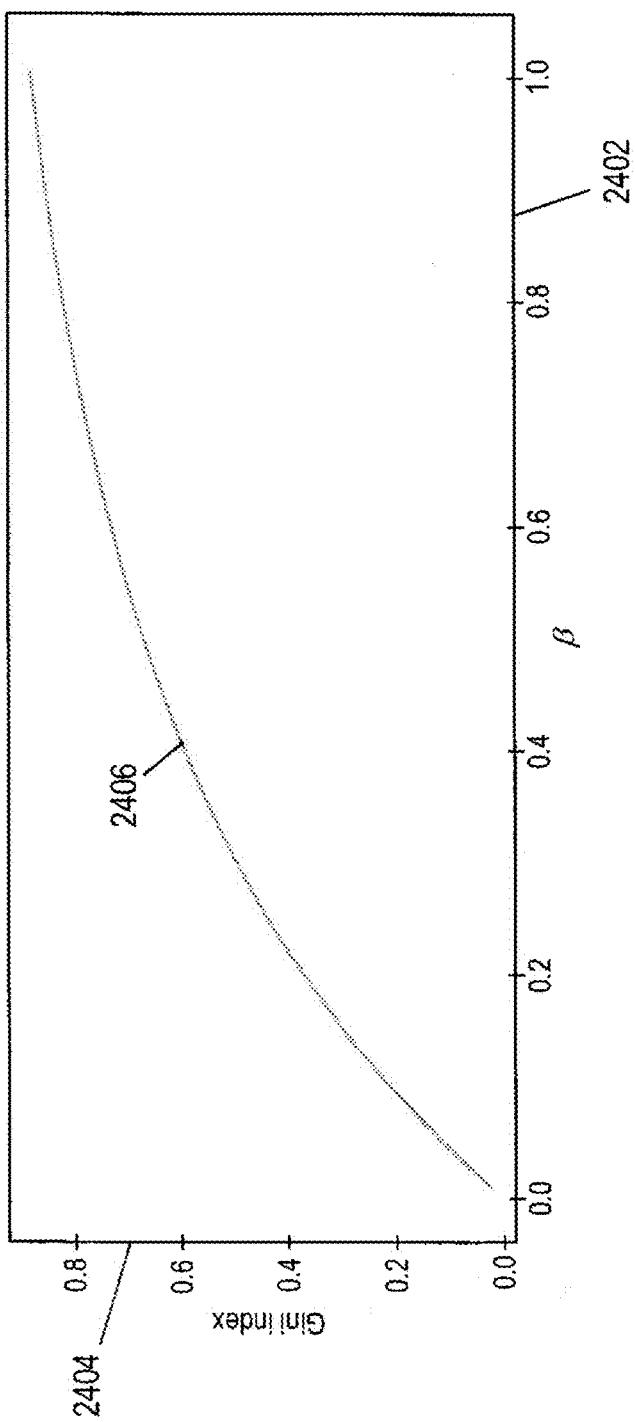
FIGS. 24A-24D show plots of Gini indices versus sampling parameters.

FIG. 24A shows a plot of Gini indices versus trace-type sampling parameters β. Horizontal axis 2402 represents a range of trace-type sampling parameters β. Vertical axis 2404 represents a range of modified Gini indices. Curve 2406 represents the modified Gini index as a function of the trace-type sampling parameter β. Table I shows trace-type sampling parameters β and the corresponding modified Gini index values:

TABLE I

Modified Gini index versus trace-type sampling parameter β

| β | 0.02 | 0.025 | 0.03 | 0.035 | 0.04 | 0.045 | 0.05 | 0.055 | 0.06 | 0.065 | 0.07 |
|---|---|---|---|---|---|---|---|---|---|---|---|
| $G^{(\beta)}$ | 0.046 | 0.058 | 0.07 | 0.08 | 0.09 | 0.10 | 0.11 | 0.12 | 0.13 | 0.14 | 0.15 |

Relations ($\beta$, $G^{(\beta)}$) in Table I may be stored in a data storage device and retrieved from the data storage device based on a user-selected sampling level. The trace-type sampling parameter β that corresponds to a modified Gini index closest to the user-selected sampling level is used to obtain the trace-type sampling rate in Equation (2). For example, when a user selects a sampling level of 15% (i.e., modified Gini index of 0.15), the corresponding trace-type sampling parameter 0.07 (i.e., β=0.07) is retrieved from Table I and used to obtain the trace-type sampling rate in Equation (2). When a user selects a sampling level of 10% (i.e., modified Gini index of 0.10), the corresponding trace-type sampling parameter 0.045 (i.e., β=0.045) is retrieved from Table I and used to obtain the trace-type sampling rate in Equation (2). When a user selects a sampling level of 5% (i.e., closest modified Gini index is 0.045), the corresponding trace-type sampling parameter 0.02 (i.e., β=0.02) is retrieved from Table I and used to obtain the trace-type sampling rate in Equation (2).

Figure 24B:
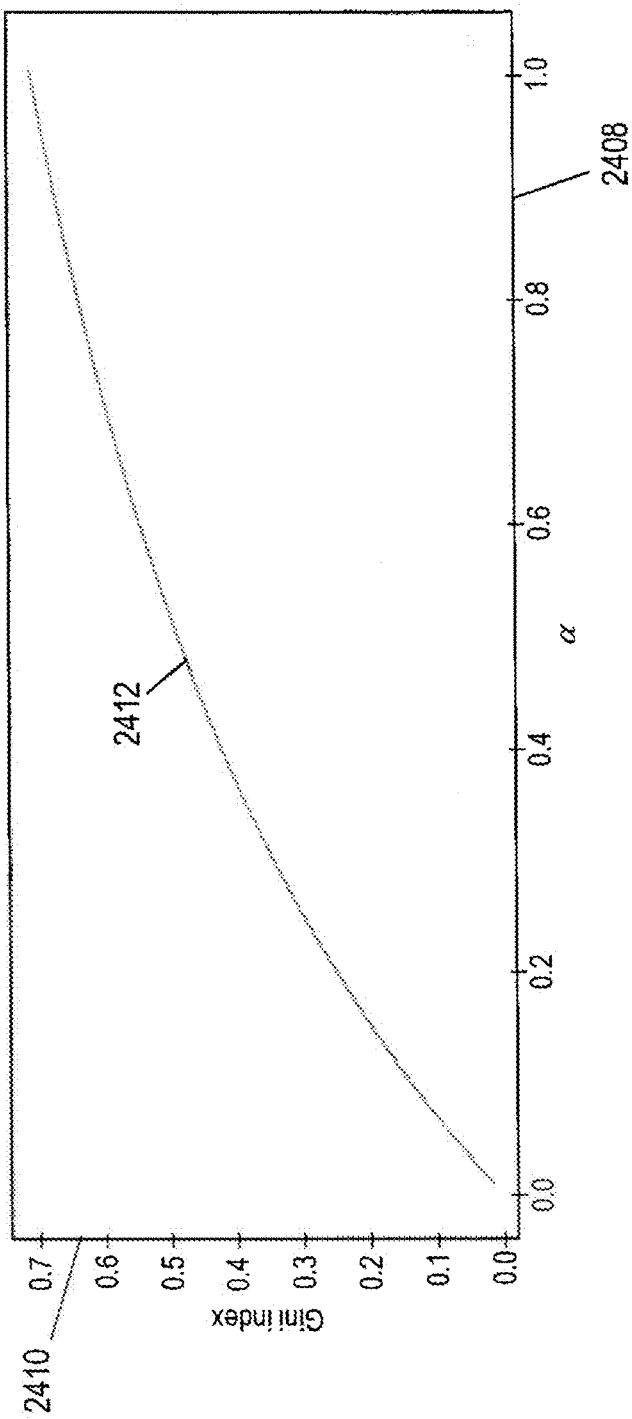

FIG. 24B shows a plot of modified Gini index versus duration-sampling parameters α. Horizontal axis 2408 represents a range of duration-sampling parameters α. Vertical axis 2410 represents a range of modified Gini indices. Curve 2412 represents the modified Gini index as a function of the duration-sampling parameter α. Table II shows duration-sampling parameters α and the corresponding modified Gini indices:

TABLE II

Modified Gini index versus duration-sampling parameter α

| α | 0.01 | 0.02 | 0.035 | 0.04 | 0.05 | 0.06 | 0.07 | 0.08 | 0.09 | 0.1 | 0.11 |
|---|---|---|---|---|---|---|---|---|---|---|---|
| $G^{(\alpha)}$ | 0.015 | 0.03 | 0.051 | 0.059 | 0.072 | 0.086 | 0.099 | 0.11 | 0.13 | 0.14 | 0.15 |

Relations ($\alpha$, $G^{(\alpha)}$) in Table II may be stored in a data storage device and retrieved from the data storage device based on a user-selected sampling level. The duration-sampling parameter α that corresponds to the modified Gini index closest to the user-selected sampling level is used to obtain the duration-sampling rate in Equation (9). For example, when a user selects a sampling level of 15% (i.e., modified Gini index of 0.15), the corresponding duration-sampling parameter 0.11 (i.e., α=0.11) is retrieved from Table II and used to obtain the duration-sampling rate in Equation (9). When a user selects a sampling level of 10% (i.e., closest modified Gini index is 0.099), the corresponding duration-sampling parameter 0.07 (i.e., α=0.07) is retrieved from Table II and used to obtain the duration-sampling rate in Equation (9). When a user selects a sampling level of 5% (i.e., closest modified Gini index is 0.051), the corresponding duration-sampling parameter 0.035 (i.e., α=0.035) is retrieved from Table II and used to obtain the duration-sampling rate in Equation (9).

Figure 24C:
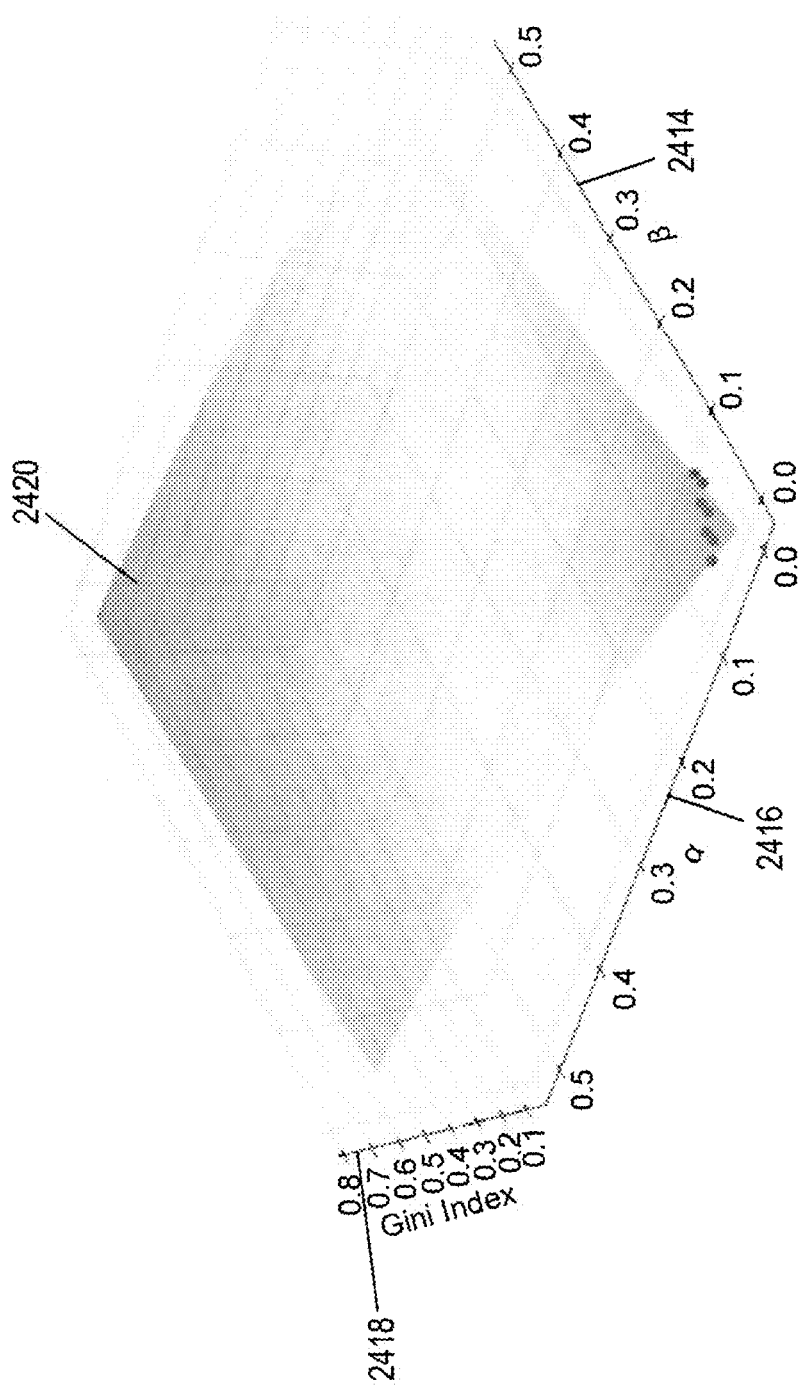

FIG. 24C shows a plot of Gini index versus trace-type and duration-sampling parameters β and α. Axis 2414 represents a range of trace-type sampling parameters β. Axis 2416 represents a range of duration-sampling parameters α. Axis 2418 represents a range of modified Gini indices. Curve 2420 represents the Gini index as a function of the sampling parameters β and α. Table III shows sampling parameters β and α and the corresponding modified Gini indices:

TABLE III

Modified Gini index versus sampling parameters β and α

| α | 0.02 | 0.07 | 0.05 | 0.03 | 0.08 | 0.01 | 0.06 |
|---|---|---|---|---|---|---|---|
| β | 0.01 | 0.01 | 0.02 | 0.03 | 0.03 | 0.04 | 0.04 |
| $G^{(\beta,\alpha)}$ | 0.049 | 0.1 | 0.1 | 0.1 | 0.15 | 0.1 | 0.15 |

Relations (($\beta$, $\alpha$), $G^{(\beta,\alpha)}$) in Table III may be stored in a data storage device and retrieved from the data storage device based on a user-selected sampling level. The sampling parameters β and α that corresponds to a modified Gini index closest to the user-selected sampling level is used to obtain the duration-sampling rate in Equation (13). For example, when a user selects a sampling level of 15% (i.e., modified Gini index of 0.15), the corresponding sampling parameters β=0.04 and α=0.06 are retrieved from Table III and used to obtain the hybrid sampling rate in Equation (13). When a user selects a sampling level of 10% (i.e., modified Gini index is 0.01), a combination of the sampling parameters β and α are retrieved from Table III and used to obtain the hybrid sampling rate in Equation (13). Table III shows that different combinations of sampling parameters may be used for a modified Gini index of 0.1. In one implementation, when multiple combinations of a sampling parameters are available, rather than using different sampling parameters the number of different parameters may be reduced by using sampling parameters that are equal, such as α=β=0.03.

When a user selects a sampling level of 5% (i.e., closest modified Gini index is 0.049), the corresponding sampling parameter $\beta$=0.01 and $\alpha$=0.02 are retrieved from Table III and used to obtain the hybrid sampling rate in Equation (13).

Figure 24D:
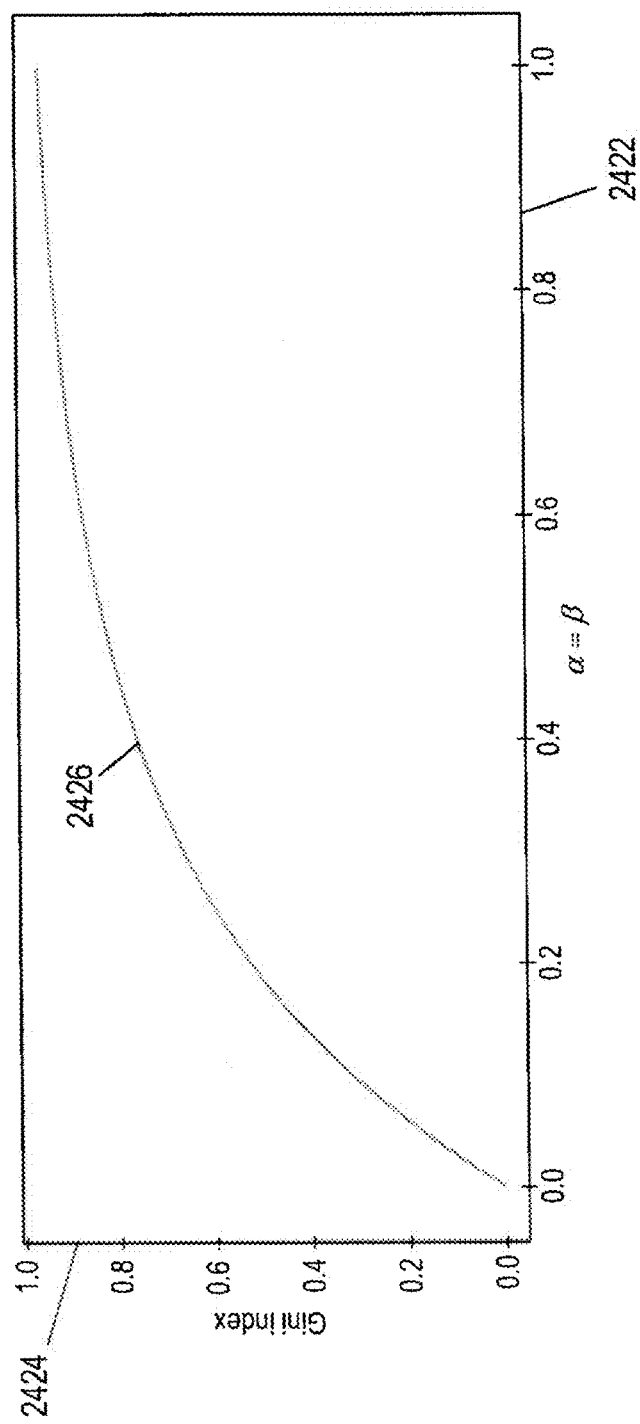

FIG. 24D shows a plot of modified Gini indices versus a sampling parameter. In this example. the same value is used for the trace-type sampling parameter $\beta$ and the duration-sampling parameter $\alpha$ (i.e., $\alpha$=$\beta$). Horizontal axis 2422 represents a range of sampling parameters $\alpha$=$\beta$. Vertical axis 2424 represents a range of modified Gini indices. Curve 2426 represents the modified Gini index as a function of the sampling parameter. Table IV shows sampling parameter $\alpha$ (i.e., $\alpha$=$\beta$) and the corresponding modified Gini index values:

TABLE IV

Modified Gini index versus trace-type sampling parameter $\alpha$

| $\alpha$ | 0.011 | 0.013 | 0.015 | 0.025 | 0.027 | 0.029 | 0.039 | 0.041 | 0.043 |
|---|---|---|---|---|---|---|---|---|---|
| $G^{(\alpha,\alpha)}$ | 0.04 | 0.049 | 0.057 | 0.093 | 0.097 | 0.1 | 0.14 | 0.147 | 0.153 |

Relations ($\alpha$, $G^{(\alpha,\alpha)}$) in Table IV may be stored in a data storage device and retrieved from the data storage device based on a user-selected sampling level. The sampling parameter $\alpha$ that corresponds to the modified Gini index closest to the user-selected sampling level is used to obtain the hybrid sampling rate in Equation (11) with $\alpha$=$\beta$. For example, when a user selects a sampling level of 15% (i.e., the closest modified Gini index of 0.147), the corresponding sampling parameters $\alpha$=$\beta$=0.041 is retrieved from Table IV and used to obtain the hybrid sampling rate in Equation (11). When a user selects a sampling level of 10% (i.e., modified Gini index is 0.1), the corresponding hybrid sampling parameters $\alpha$=$\beta$=0.029) is retrieved from Table IV and used to obtain the hybrid sampling rate in Equation (11). When a user selects a sampling level of 5% (i.e., closest modified Gini index is 0.049), the corresponding sampling parameters $\alpha$=$\beta$=0.013) is retrieved from Table IV and used to obtain the hybrid sampling rate in Equation (11).

Optimizing Sampling Parameters

In practice, historical optimization of the sampling parameters $\alpha$ and $\beta$ is not feasible due to the dynamic nature of applications. Instead, the compression rate of the sampling rate is monitored over for a recent time window selected by a user. The duration of the time window may be one-half hour, one hour, two hours, twelve hours, or sixteen hours. The compression rate $C^{(\gamma)}$ is calculated for the corresponding sampling rate applied in the time window. For example, when the sampling rate is performed using Equation (2), the compression rate is calculated using Equation (4a). When the sampling rate is performed using Equation (9), the compression rate is calculated using Equation (11). When the sampling rate is performed using Equation (13), the compression rate is calculated using Equation (15). When the sampling rate is performed using Equation (17), the compression rate is calculated using Equation (19). After the compression rate has been calculated for the time window, a difference is calculated between the compression rate and a user-selected compression rate as follows:

$$\Delta = |C^{(\gamma)} - C_s| \quad (20)$$

where $\gamma$ represents the sampling parameter (i.e., $\gamma$=$\alpha$, $\gamma$=$\beta$, or $\gamma$=($\alpha$, $\beta$));

$C^{(\gamma)}$ is the compression rate of the sampling rate with sampling parameter $\gamma$ of traces over the recent time period; and $C_s$ is the user-selected compression rate.

The user-selected compression rate is given by $C_s=1-G_s$, where $G_s$ is the modified Gini index that corresponds to the user-selected sampling level. For example, when a user selects a sampling level of 15%, the modified Gini index is $G_s$=0.15, and the user-selected compression rate is $C_s$=0.85.

When the difference satisfies the following condition $$\Delta \leq Th_{Opt} \quad (21)$$

where $Th_{Opt}$ is the optimization threshold (e.g., $Th_{Opt}$=0.01, 0.02, or 0.05), the sampling rate is unchanged. On the other hand, when $\Delta > Th_{Opt}$, the sampling parameter of the sampling rate is adjusted using the following function;

$$factor(\Delta) = 2 - \exp(-10\Delta) \quad (22a)$$

where $0 \leq \Delta \leq 100$; and $1 \leq factor \leq 2$.

The factor in Equation (22a) is used to compute an adjusted sampling parameter as follows:

$$\gamma_{adj} = factor \times \gamma \quad (22b)$$

Alternatively, the factor in Equation (22a) is used to compute an adjusted sampling parameter as follows:

$$\gamma_{adj} = \frac{1}{factor} \times \gamma \quad (22c)$$

The adjusted sampling parameter of Equation (22b) replaces the previously used sampling parameter in the sampling rate of Equations (2), (9), (13) and (17).

A trace is randomly sampled with a corresponding sampling rate, r, given by one of the Equations (2), (9), (13) and (17), based on the Bernoulli distribution, where the probability of a success (i.e., sampling the trace) is the sampling rate r and the probability of a failure (i.e., discarding the trace) is the probability 1−r. Using a Bernoulli random binary number generator ("BRBNG") with input r, the BRBNG outputs a number 1 for a success with probability r and outputs a number 0 for a failure with probability 1−r. When the BRBNG outputs a number 1, the trace is sampled by storing the trace in a data storage device. On the other hand, when the BRBNG outputs a number 0, the trace is discarded or deleted from memory or from a data storage device. Note that assignment of the values 1 and 0 may be reversed provided 0 is associated with probability of a success r and 1 is associated with probability of a failure 1−r. In an alternative implementation, a random number generator (i.e., pseudo-random number generator) is used to output a random number, U, for each trace, where $0 \leq U \leq 1$. When $U \leq r$, the trace is sampled by storing the trace in a data storage device. On the other hand, when $U > r$, the trace is discarded or deleted from memory or from a data storage device.

The computer-implemented methods described below with reference to FIGS. 25-33 are stored in one or more data storage devices as machine-readable instructions that when executed by one or more processors of the computer system, such as the computer system shown in FIG. 1, sample traces of an application executed in a distributed computing system.

Figure 25:
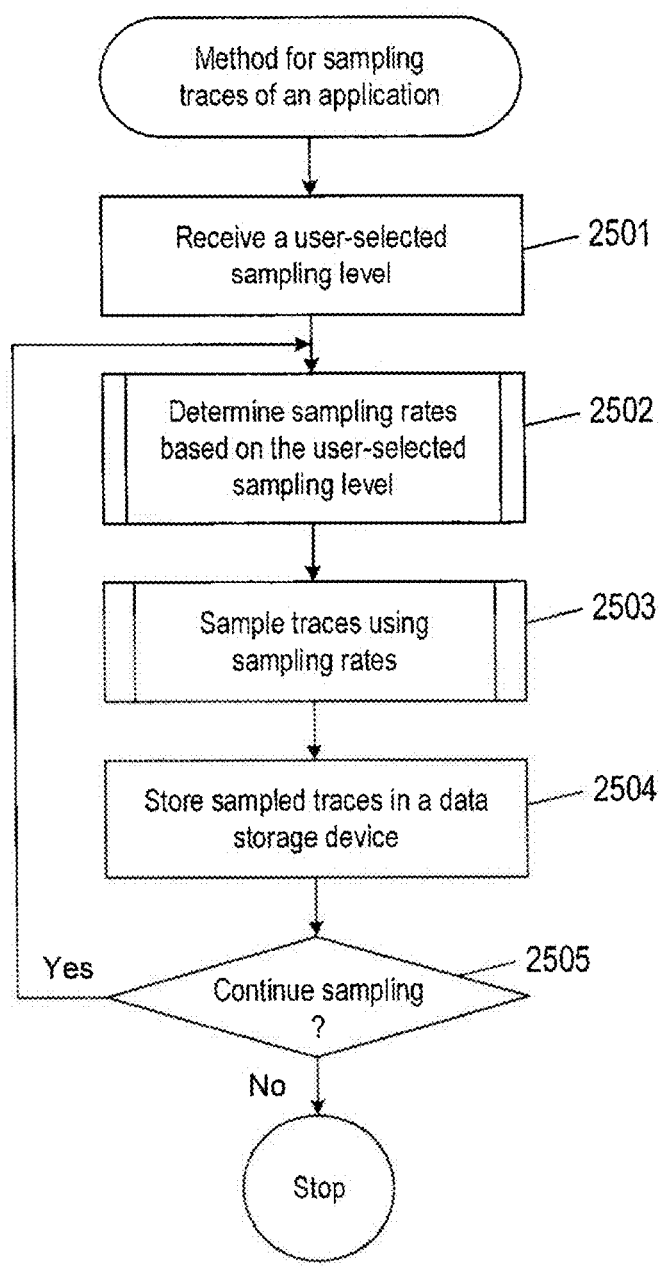
FIG. 25 is a flow diagram illustrating an example implementation of a "method for sampling traces of an application."

FIG. 25 is a flow diagram illustrating an example implementation of a "method for sampling traces of an application." In block 2501, a user-selected sampling level is received as input using a GUI as described above with reference to FIG. 15. In block 2502, a "determine sampling rates based on the user-selected sampling level" procedure is performed. An example implementation of the "determine sampling rates based on the user-selected sampling level" procedure is described below with reference to FIG. 26. In block 2503, a "sample traces using the sampling rates" procedure is performed. An example implementation of the "sample traces using the sampling rates" procedure is described below with reference to FIG. 30. In block 2504, the sampled traces obtained in block 2503 are stored in a data storage device as described above with reference to FIG. 16. In decision block 2505, when sampling continues, the operations of determining sampling rates, sampling, and storing sampled traced for the application is repeated. Troubleshooting and root cause analysis is applied the sampled traces to identify the source of performance problems with the application. Remedial measures may be employed to correct the performance problems. For example, VMs or containers executing application components may be migrated to different hosts to increase performance. Additional VM or containers may be started to alleviate the workloads on already existing VMs and containers. Network bandwidth may be increased to reduce latency between peer VMs.

Figure 26:
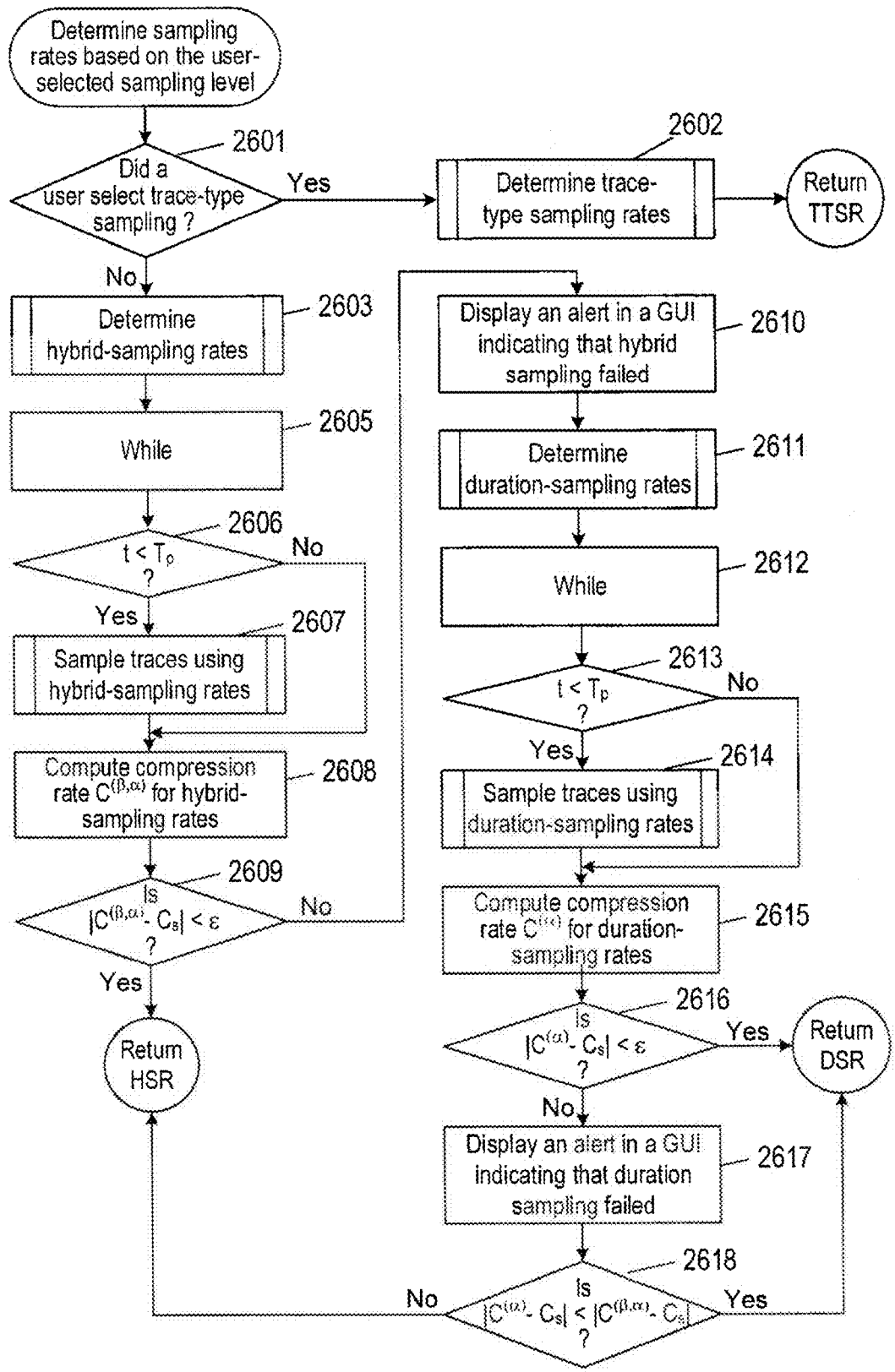
FIG. 26 is a flow diagram illustrating an example implementation of the "determine sampling rates based on the user-selected sampling level" procedure performed in FIG. 25.

FIG. 26 is a flow diagram illustrating an example implementation of the "determine sampling rates based on the user-selected sampling level" procedure performed in block 2502. In decision block 2601, when a user has selected trace-type sampling of the application traces, control flows to block 2602. In block 2602, a "determine trace-type sampling rates" procedure is performed. An example implementation of the "determine trace-type sampling rates" procedure is described below with reference to FIG. 28. The trace-type sampling rates ("TTSR") are return and used to perform sampling of the application traces in block 2503 of FIG. 25. In block 2603, a "determine hybrid-sampling rates" procedure is performed. An example implementation of the "determine hybrid-sampling rates" procedure is described below with reference to FIG. 27. Blocks 2605 and 2604 are a while loop in which a "sample traces using hybrid-sampling rates" procedure is performed on the application traces while the duration of the time spent sampling, t, in block 2607 is less than the duration of a period of time $T_p$. An example implementation of the "sample traces using hybrid-sampling rates" procedure is described below with reference to FIG. 31. In block 2608, a compression rate $C^{(\beta,\alpha)}$ is computed according to Equation (15) for hybrid sampling rates in Equation (13). In an alternative implementation where the sampling rates in Equation (17) are used to sample the application traces, the compression rate is computed in block 2608 according to Equation (19). In decision block 2609, when compression rate obtain in block 2608 satisfies the condition $|C^{(\beta,\alpha)}-C_s|<\varepsilon$, where $\varepsilon$ is a small user selected positive number (e.g., 0.01, 0.05, or 0.1) and $C_s$ is the user-selected compression rate, the hybrid-sampling rates obtained in block 2603 are used to perform sampling of the application traces in block 2503 of FIG. 25. Alternatively, when compression rate obtained in block 2608 satisfies the condition $|\overline{C}^{(\alpha)}-C_s|<\varepsilon$, the hybrid-sampling rates ("HSR") obtained in block 2603 are returned and used to perform sampling of the application traces in block 2503 of FIG. 25. Otherwise, control flows to block 2610. In block 2610, an alert is displayed in a GUI, or sent in an email to an administrator or application developer, indicating the hybrid sampling failed to satisfy the user-selected compression rate. In block 2611, a "determine duration-sampling rates" procedure is performed. An example implementation of the "determine duration-sampling rates" procedure is described below with reference to FIG. 29. Blocks 2612 and 2613 are a while loop in which a "sample traces using duration-sampling rates" procedure is performed on the application traces while the duration of the time spent sampling, t, in block 2614 is less than the duration of a period of time $T_p$. An example implementation of the "sample traces using duration-sampling rates" procedure is described below with reference to FIG. 33. In block 2615, a compression rate $C^{(\alpha)}$ is computed according to Equation (11) for duration-sampling rates in Equation (9). In decision block 2609, when compression rate obtain in block 2615 satisfies the condition $|C^{(\alpha)}-C_s|<\varepsilon$, the duration-sampling rates ("DSR") obtained in block 2611 are returned are used to perform sampling of the application traces in block 2503 of FIG. 25. Otherwise, control flows to block 2617. In block 2617, an alert is displayed in a GUI, or sent in an email to an administrator or application developer, indicating the duration sampling failed to satisfy the user-selected compression rate. In decision block 2618, when the condition $|C^{(\alpha)}-C_s|<|C^{(\beta,\alpha)}-C_s|$, the compression rate for duration sampling is closer to the user-selected compression rate than the compression rate for hybrid sampling and the duration-sampling rates obtained in block 2611 are returned. Otherwise, the compression rate for hybrid sampling is closer to the user-selected compression rate than the compression rate for duration sampling and the hybrid-sampling rates obtained in block 2603 are returned.

Figure 27:
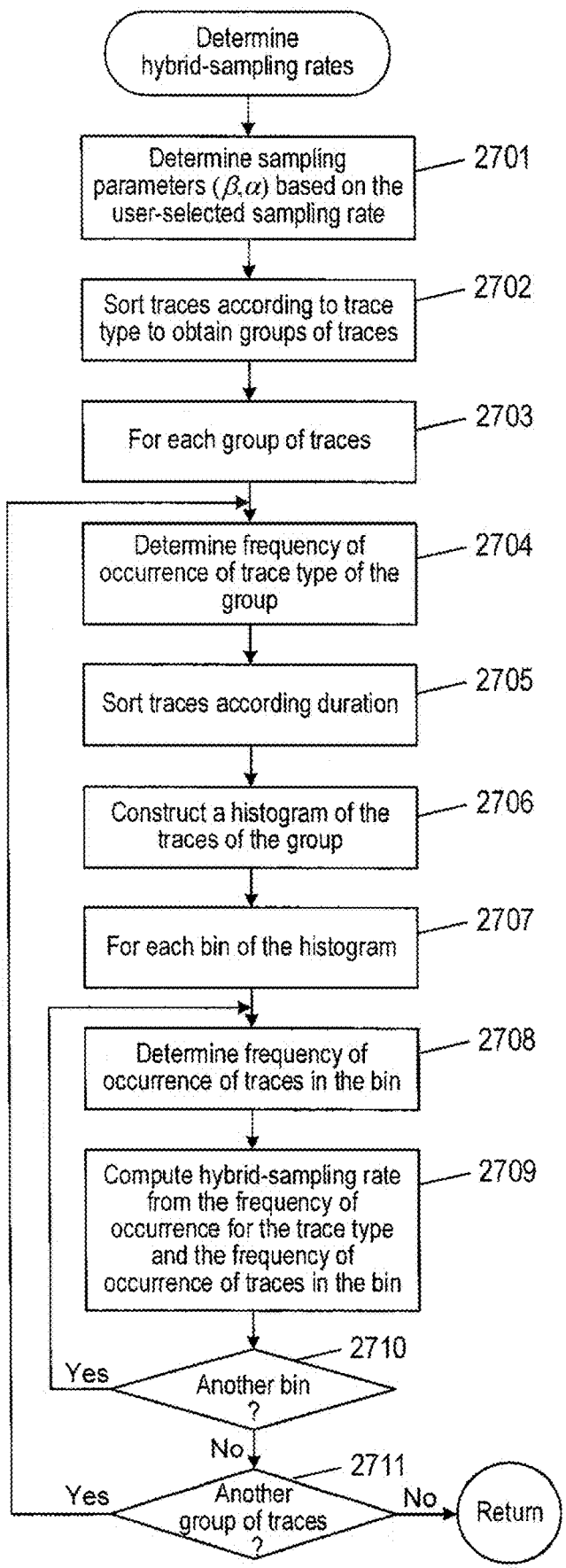
FIG. 27 is a flow diagram illustrating an example implementation of the "determine hybrid-sampling rates" procedure performed in FIG. 26.

FIG. 27 is a flow diagram illustrating an example implementation of the "determine hybrid-sampling rates" procedure performed in block 2603. In block 2701, sampling parameters are determined based on the user-selected sampling rate as described above with reference to Table III or Table IV. In block 2702, traces are sorted according to trace type to obtain groups of traces as described above with reference to FIG. 21. A loop beginning with block 2703 repeats the operations represented by blocks 2704-2710. In block 2704, a frequency of occurrence of traces in a group of traces is determined as described above with reference to Equation (1). In block 2705, traces with the group of traces are sorted according to trace duration as described above with reference to FIG. 22. In block 2706, a histogram is constructed as described above with reference to FIGS. 20 and 22. A loop beginning with block 2707 repeats the operations represented by blocks 2707 and 2708. In block 2708, a frequency of occurrence of traces in a bin of the histogram is determined as described above with reference to Equation (12). In block 2709, a hybrid-sampling rate is computed from the frequency of occurrence of traces obtained in block 2704, the frequency of occurrence of traces obtained in block 2709, and the sampling parameters ($\beta$, $\alpha$) according to Equation (13). In decision block 2710, blocks 2708 and 2709 are repeated for another bin of the histogram. Otherwise, control flows to block 2711. In decision block 2711, blocks 2704-2710 are repeated for another group of traces.

Figure 28:
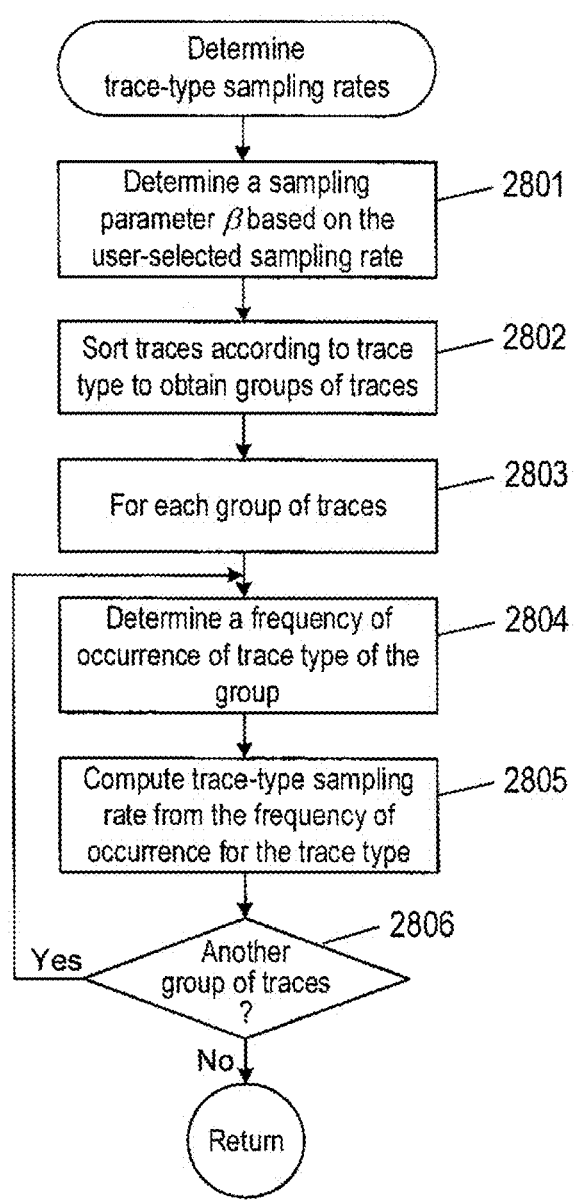
FIG. 28 is a flow diagram illustrating an example implementation of the "determine trace-type sampling rates" procedure performed in FIG. 26.

FIG. 28 is a flow diagram illustrating an example implementation of the "determine trace-type sampling rates" procedure performed in block 2602. In block 2801, a sampling parameter $\beta$ is determined based on the user-selected sampling rate as described above with reference to Table I. In block 2802, traces are sorted according to trace type to obtain groups of traces as described above with reference to FIG. 17. A loop beginning with block 2803 repeats the operations represented by blocks 2804-2805. In block 2804, a frequency of occurrence of traces in a group of traces is determined as described above with reference to Equation (1). In block 2805, a trace-type sampling rate is computed from the frequency of occurrence of traces obtained in block 2804 and the sampling parameter β according to Equation (2). In decision block 2806, blocks 2804-2805 are repeated for another group of traces.

Figure 29:
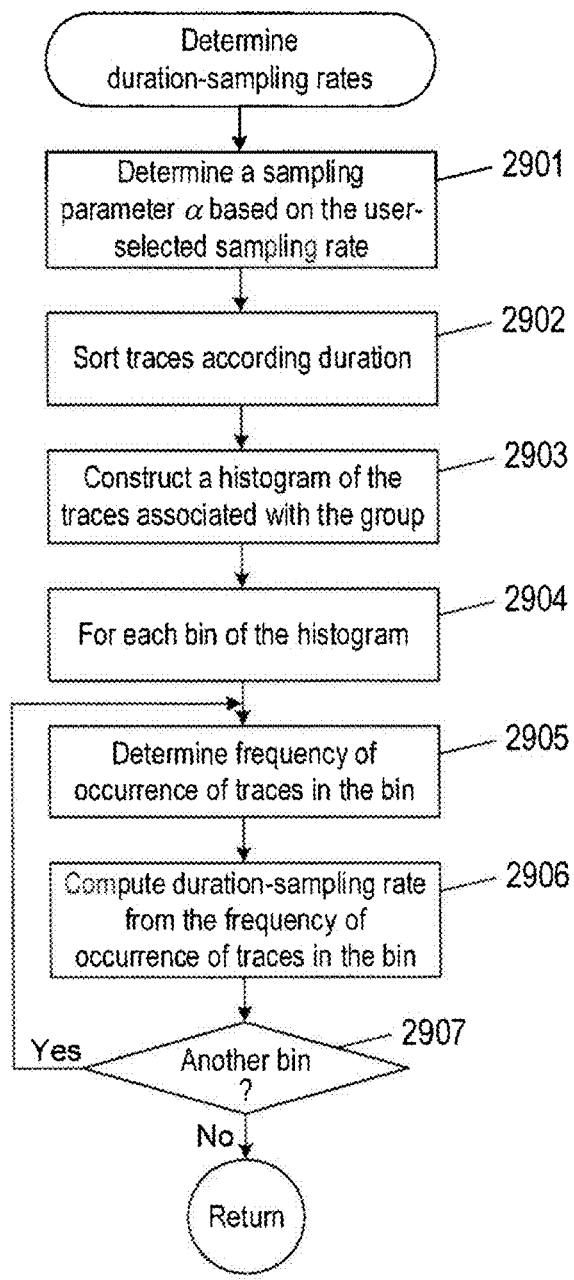
FIG. 29 is a flow diagram illustrating an example implementation of the "determine duration-sampling rates" procedure performed in FIG. 26.

FIG. 29 is a flow diagram illustrating an example implementation of the "determine duration-sampling rates" procedure performed in block 2611. In block 2901, a sampling parameter α are determined based on the user-selected sampling rate as described above with reference to Table II. In block 2902, traces are sorted according to trace duration as described above with reference to FIG. 19. In block 2903, a histogram is constructed as described above with reference to FIG. 19. A loop beginning with block 2904 repeats the operations represented by blocks 2905 and 2906. In block 2905, a frequency of occurrence of traces in a bin of the histogram is determined as described above with reference to Equation (8). In block 2906, a duration-sampling rate is computed from the frequency of occurrence of traces obtained in block 2905 and the sampling parameter a according to Equation (9). In decision block 2907, blocks 2905 and 2906 are repeated for another bin of the histogram.

Figure 30:
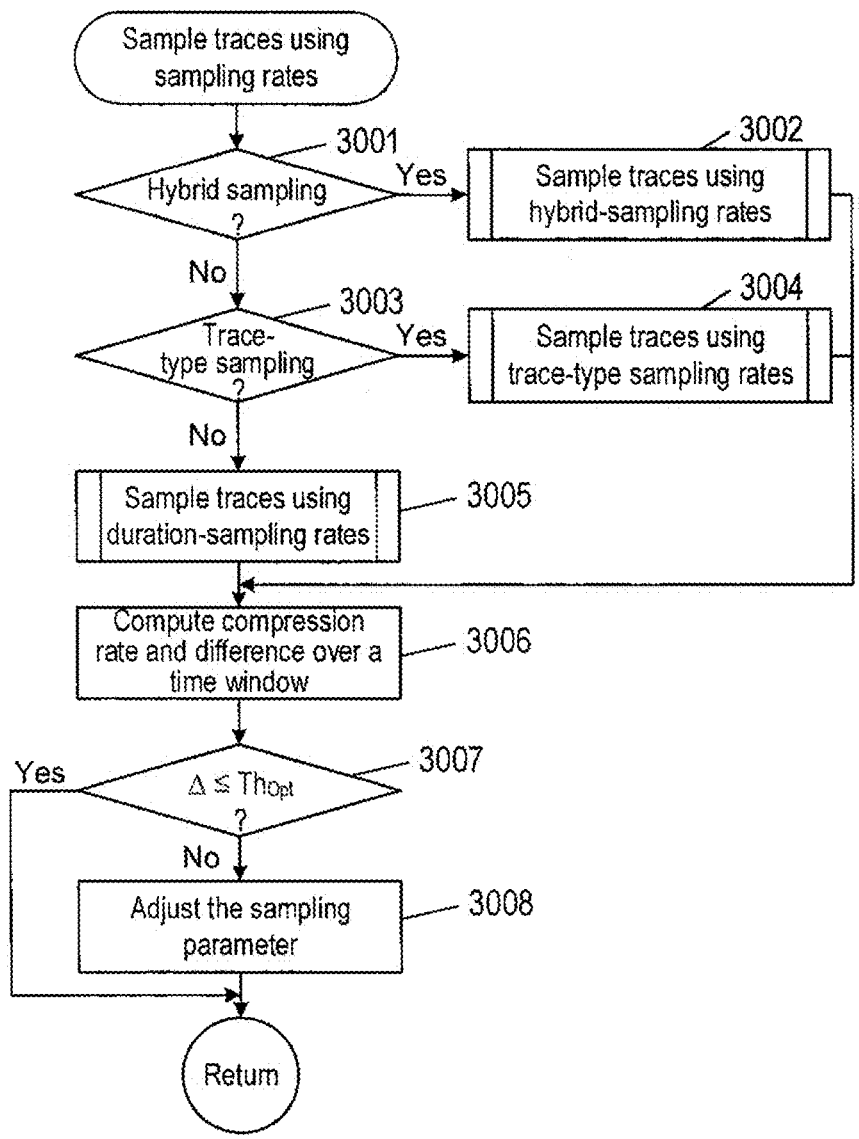
FIG. 30 is a flow diagram illustrating an example implementation of the "sample traces using sampling rates" procedure performed in FIG. 25.
Figure 31:
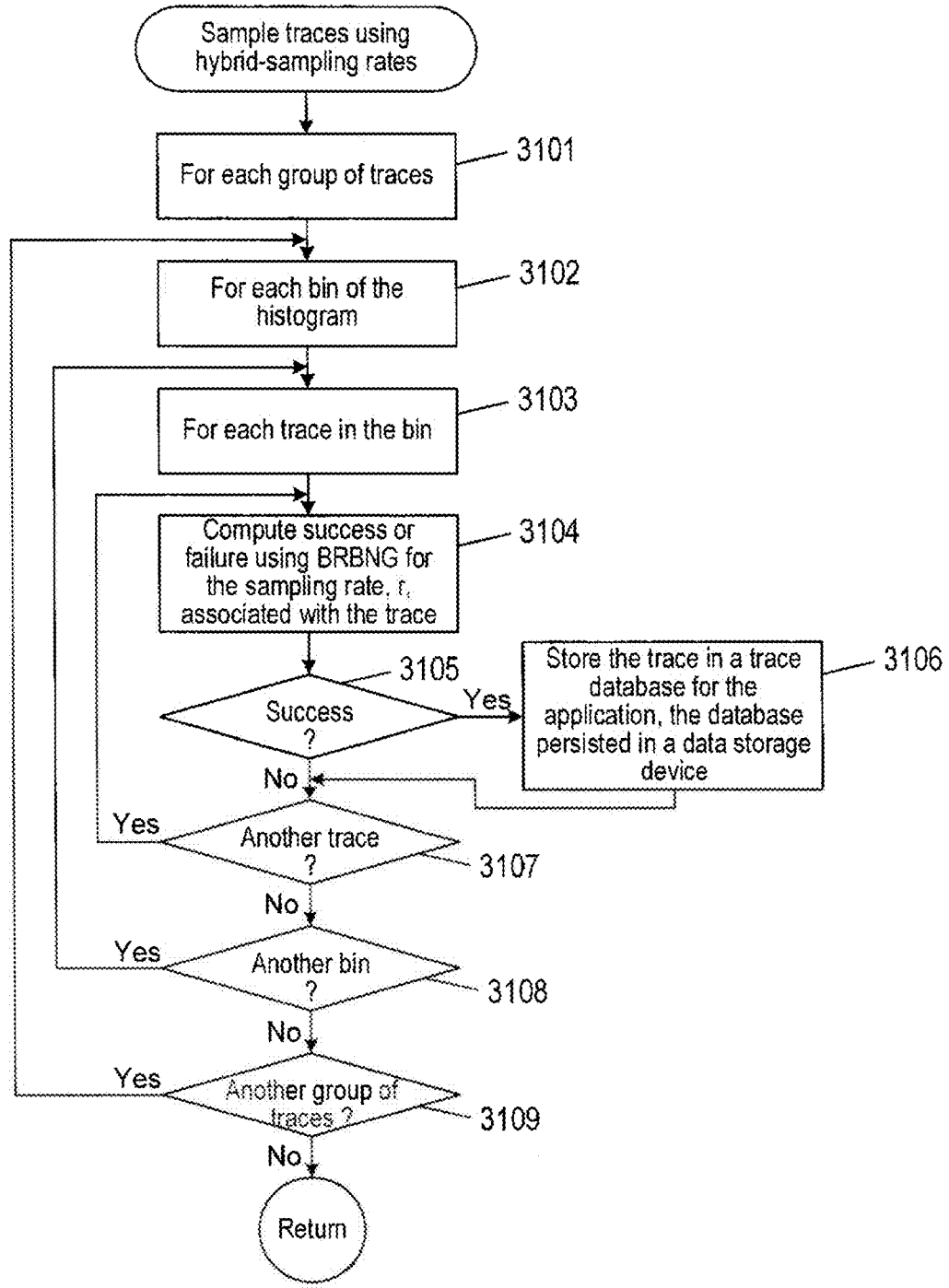
FIG. 31 is a flow diagram illustrating an example implementation of the "sample traces using hybrid-sampling rates" procedure performed in FIG. 30.
Figure 32:
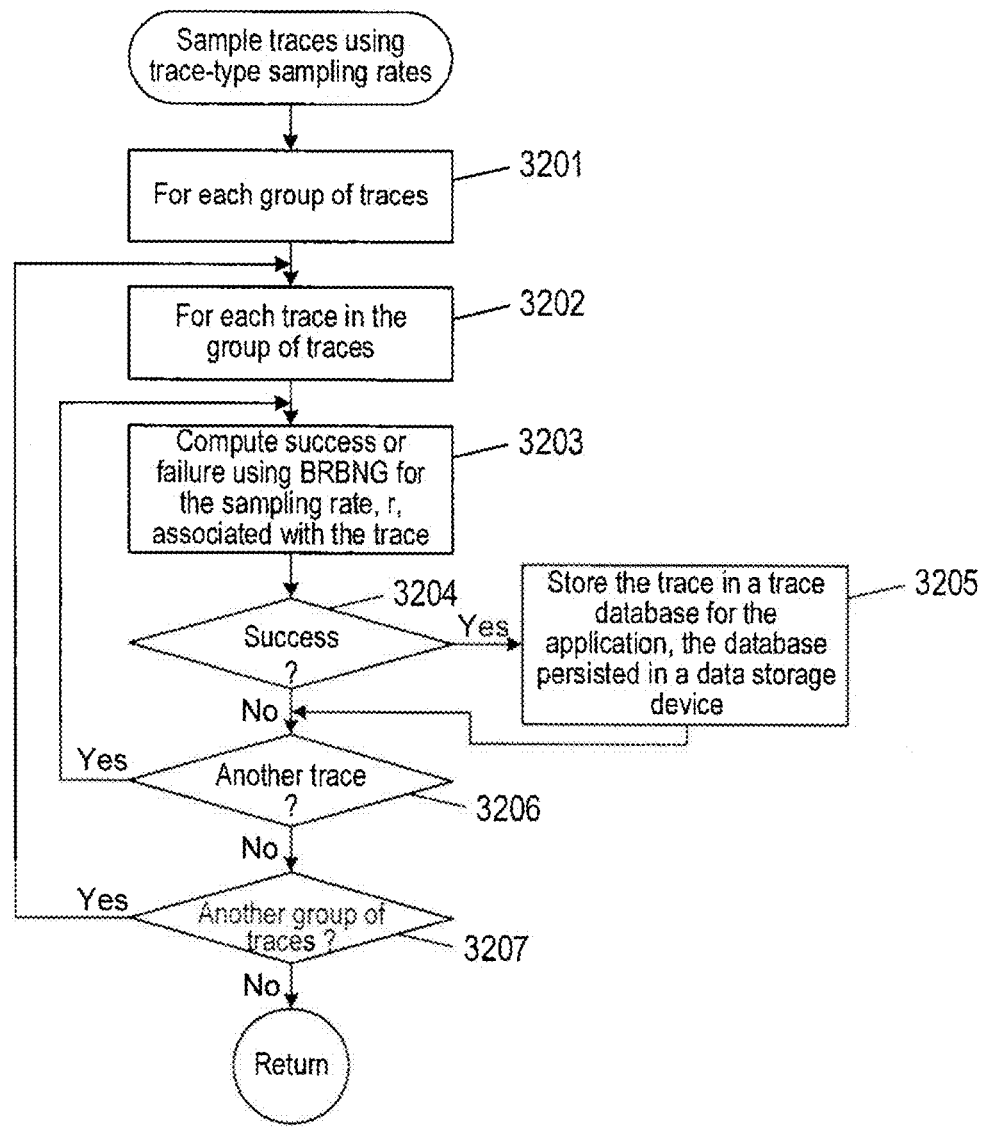
FIG. 32 is a flow diagram illustrating an example implementation of the "sample traces using trace-type sampling rates" procedure performed in FIG. 30.
Figure 33:
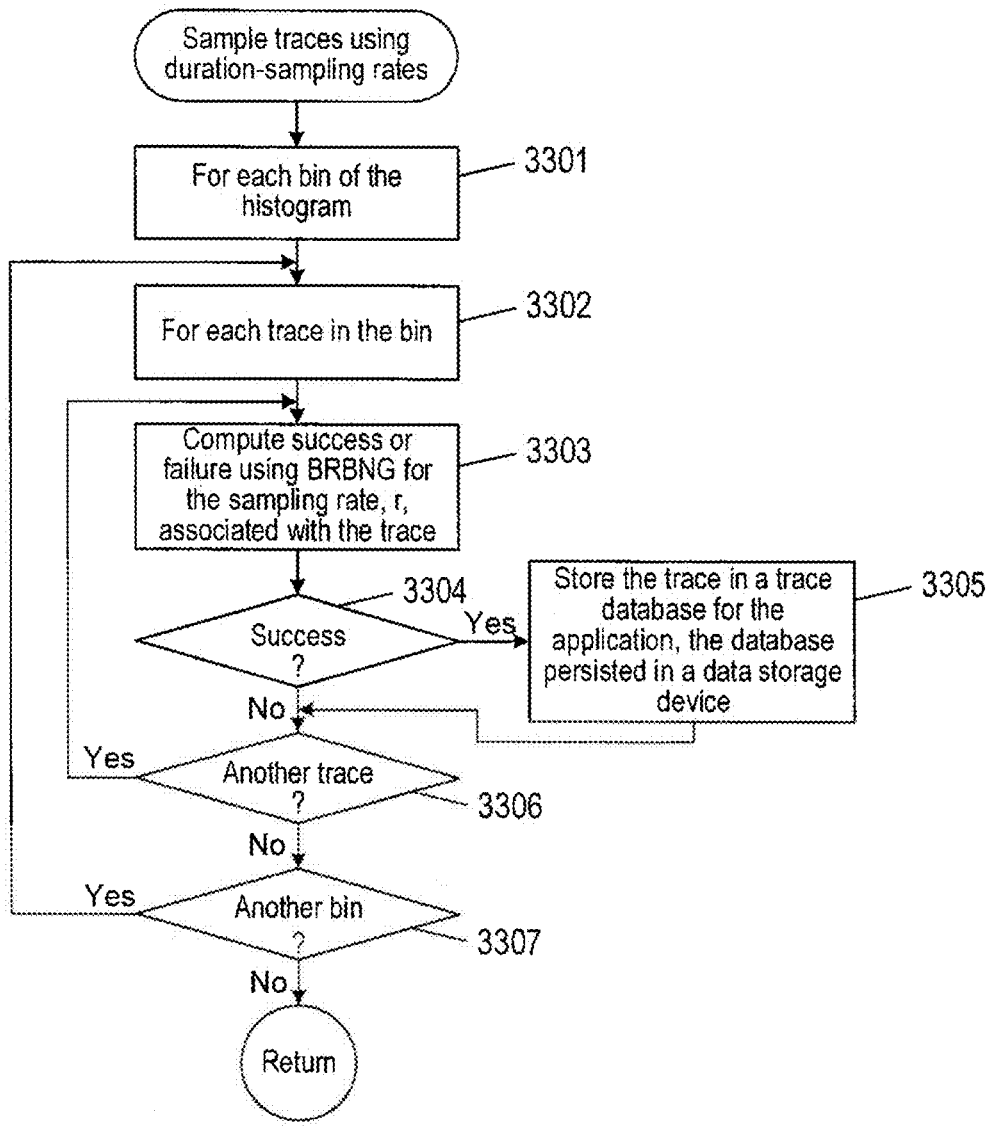
FIG. 33 is a flow diagram illustrating an example implementation of the "sample traces using duration-sampling rates" procedure performed in FIG. 30.

FIG. 30 is a flow diagram illustrating an example implementation of the "sample traces using the sampling rates" procedure performed in block 2502. In decision block 3001, when hybrid sampling has been selected, control flows to block 3002. In block 3002, the "sample traces using hybrid-sampling rates" procedure described below in FIG. 31 is performed. In decision block 3003, when trace-type sampling has been selected, control flows to block 3004. In block 3004, the "sample traces using trace-type sampling rates" procedure described below in FIG. 32 is performed. In block 3005, the "sample traces using duration-sampling rates" procedure described below in FIG. 33 is performed. In block 3006, a compression rate is computed as described above with reference to Equations (4a), (11), ( ) based on the sampling rate determined in block 2502. For example, when the trace-type sampling rate is used as described with reference to Equation (2), the compression rate is calculated using Equation (4a). When the duration-sampling rate is used as described above with reference to Equation (9), the compression rate is calculated using Equation (11). When the hybrid-sampling rate is used as described above with reference to Equation (13), the compression rate is calculated using Equation (15). When the hybrid-sampling rate is calculated using Equation (17), the compression rate is calculated using Equation (19). In block 3007, when $\Delta \leq Th_{Opt}$, control flows to block 3008 and the sampling parameter is adjusted as described above with reference to Equation (22b) or Equation (22c).

FIG. 31 is a flow diagram illustrating an example implementation of the "sample traces using hybrid-sampling rates" procedure performed in block 3002. A loop beginning with block 3101 repeats the operations represented by blocks 3102-3105 for each group of traces. A loop beginning with block 3102 repeats the operations represented by blocks 3103-3104 for each bin of the histogram obtained in block 2903 of FIG. 29. A loop beginning with block 3103, repeats the operations represented by blocks 3104-3106 for each trace in the bin. In block 3104, a success (e.g., "1") or a failure (e.g., "0") is computed with the BRBNG for the sampling rate associated with the trace given by Equation (13) or Equation (17). In decision block 3105, when output of the BRBNG is a success, control flows to block 3106. Otherwise, the output of the BRBNG is a failure and the trace is discarded. In block 3106, the trace is stored in a trace database for the application. The database is persisted in a data storage device. In decision block 3107, the operations represented by blocks 3104-3106 are repeated for all the traces in the bin. In decision block 3108, the operations represented by blocks 3103 and 3104 are repeated for another bin. In decision block 3109, the operations represented by blocks 3102 and 3105 are repeated for another group of traces.

FIG. 32 is a flow diagram illustrating an example implementation of the "sample traces using trace-type sampling rates" procedure performed in block 3004. A loop beginning with block 3201 repeats the operations represented by blocks 3202-3206 for each group of traces. A loop beginning with block 3102, repeats the operations represented by blocks 3203-3205 for each trace in the group. In block 3203, a success (e.g., "1") or a failure (e.g., "0") is computed with the BRBNG for the sampling rate associated with the trace given by Equation (2). In decision block 3204, when output of the BRBNG is a success, control flows to block 3205. Otherwise, the output of the BRBNG is a failure and the trace is discarded. In block 3205, the trace is stored in a trace database for the application. The database is persisted in a data storage device. In decision block 3206, the operations represented by blocks 3203-3205 are repeated for each of the traces in the group. In decision block 3207, the operations represented by blocks 3202-3206 are repeated for another group of traces.

FIG. 33 is a flow diagram illustrating an example implementation of the "sample traces using duration-sampling rates" procedure performed in block 3005. A loop beginning with block 3301 repeats the operations represented by blocks 3302-3303 for each bin of the histogram obtained in block 2702 of FIG. 27. A loop beginning with block 3202, repeats the operations represented by blocks 3303-3305 for each trace in the bin. In block 3303, a success (e.g., "1") or a failure (e.g., "0") is computed with the BRBNG for the sampling rate associated with the trace given by Equation (9). In decision block 3204, when output of the BRBNG is a success, control flows to block 3305. Otherwise, the output of the BRBNG is a failure and the trace is discarded. In block 3305, the trace is stored in a trace database for the application. The database is persisted in a data storage device. In decision block 3306, the operations represented by blocks 3303-3305 are repeated for each of the traces in the bin. In decision block 3304, the operations represented by blocks 3303 and 3303 are repeated for another bin.

Results

Figure 34A:
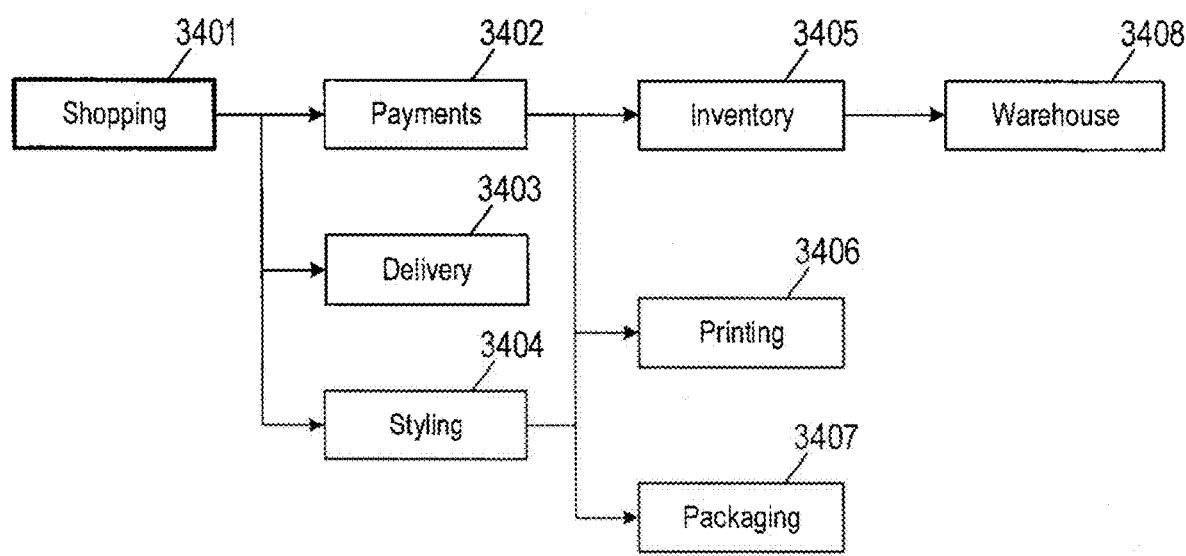
FIG. 34A shows an example of a distributed shopping application with different services.
Figure 34B:
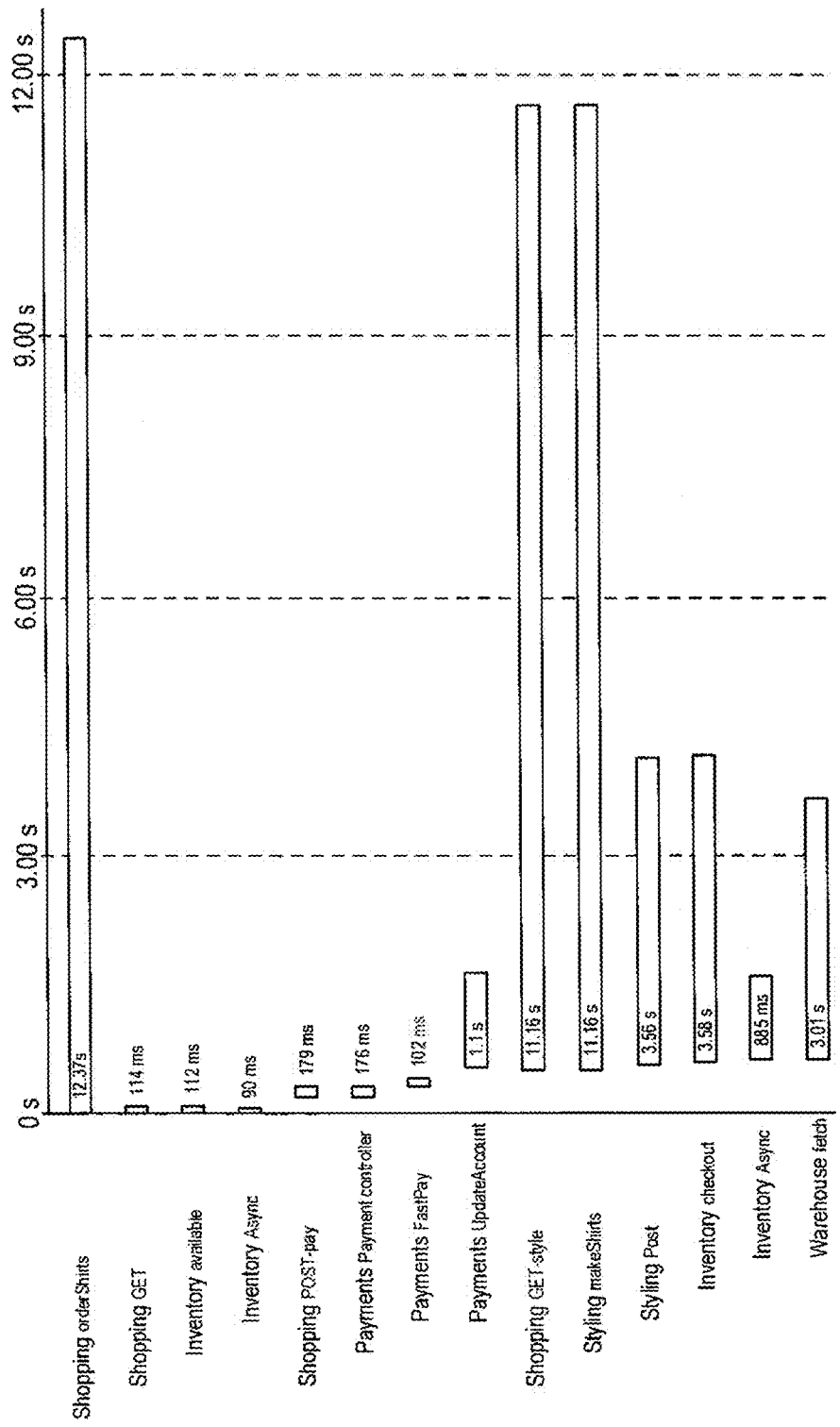
FIG. 34B shows an example of a trace for the distributed application.

FIG. 34A shows an example of a distributed shopping application with different services identified in blocks 3401-3408. Each block represents a computational operation performed by an application component. The services are executed in response to a user completing a purchase of an item. The shopping application generated 20,425 traces that were stored in a trace database. FIG. 34B shows an example of a trace for the distributed application. A trace type corresponds to the root span "Shopping orderShirts." Homologous, or similar, traces had the same order of similar spans as shown in FIG. 34B. FIGS. 34C-34H show results of sampling the 20,425 traces using trace-type sampling, duration sampling, and hybrid sampling as described above.

Figure 34D:
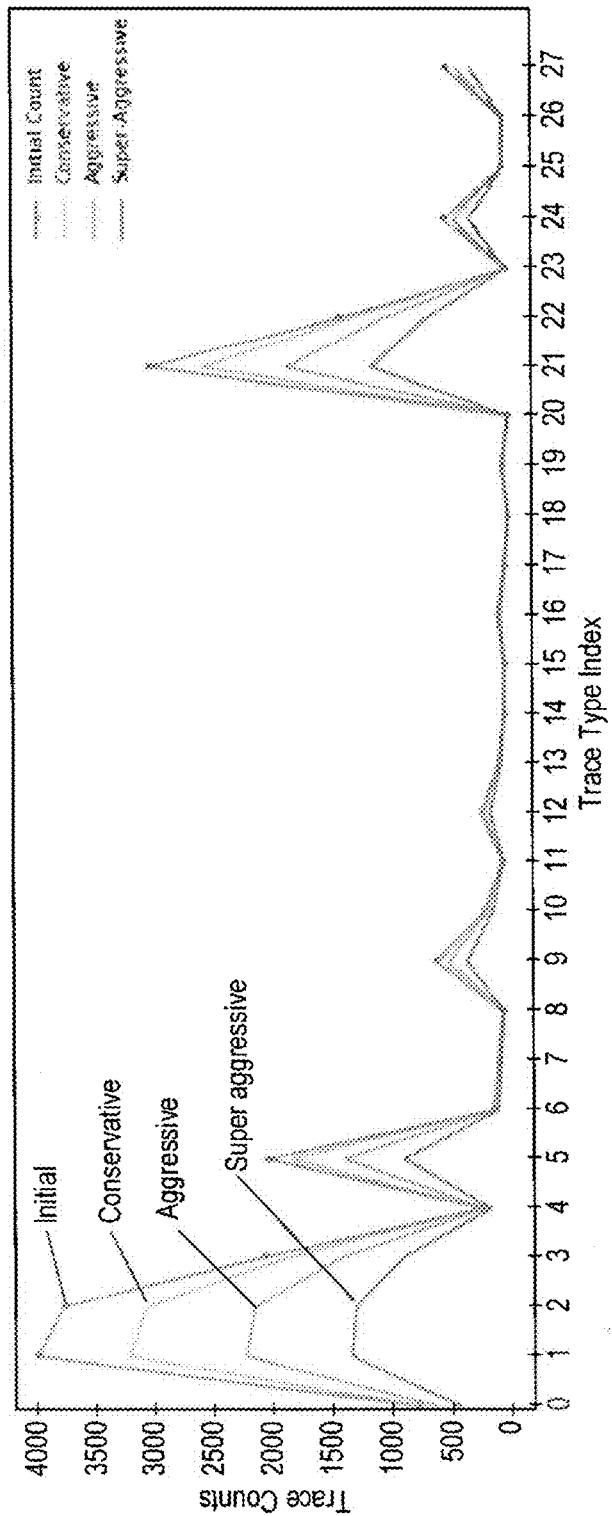

FIGS. 34C-34D show sampling results obtained from performing trace-type sampling on the 20,425 traces. The 20,425 traces comprise twenty-eight different trace types. FIG. 34C shows sampling results obtained from sampling the 28 different trace types. The trace types are indexed from 0-27 and listed in column 3410. Sampling was performed using the trace-type sampling rate described above with reference to Equation (2) for each trace type with "conservative" sampling performed with β=1. "aggressive" performing with β=0.5, and "super aggressive" sampling performed with β=0.25. Conservative sampling preserved 87.7% of the set of traces with a 12.3% compression rate. Aggressive sampling preserved 66.7% of the set of traces with a compression rate 33.3%. Super aggressive sampling preserved 43.5% of the set of traces with the compression rate 56.5%. Column 3412 shows the initial counts of each of the 28 trace types before sampling. Columns 3414, 3416, and 3418 show the counts of sampled (i.e., preserved) traces for each of the 28 trace types after sampling with the three different sampling rates. FIG. 34D shows a plot of the number of traces (columns 3412, 3414, 3416, and 3418) for the 28 different trace types before and after applying the three different sampling rates. The plot shows that trace-type sampling with the different sampling rates preserved traces from the rare trace types (e.g., little difference between numbers of sampled traces identified by indices 6-8 and 11-20) while larger differences for the sampling rates applied to more frequently occurring trace types (e.g., trace indices 1-3, 5, and 21-22). Trace-type sampling significantly reduced the number traces stored for the more frequently occurring traces while preserving most of the rarer trace types.

Figure 34F:
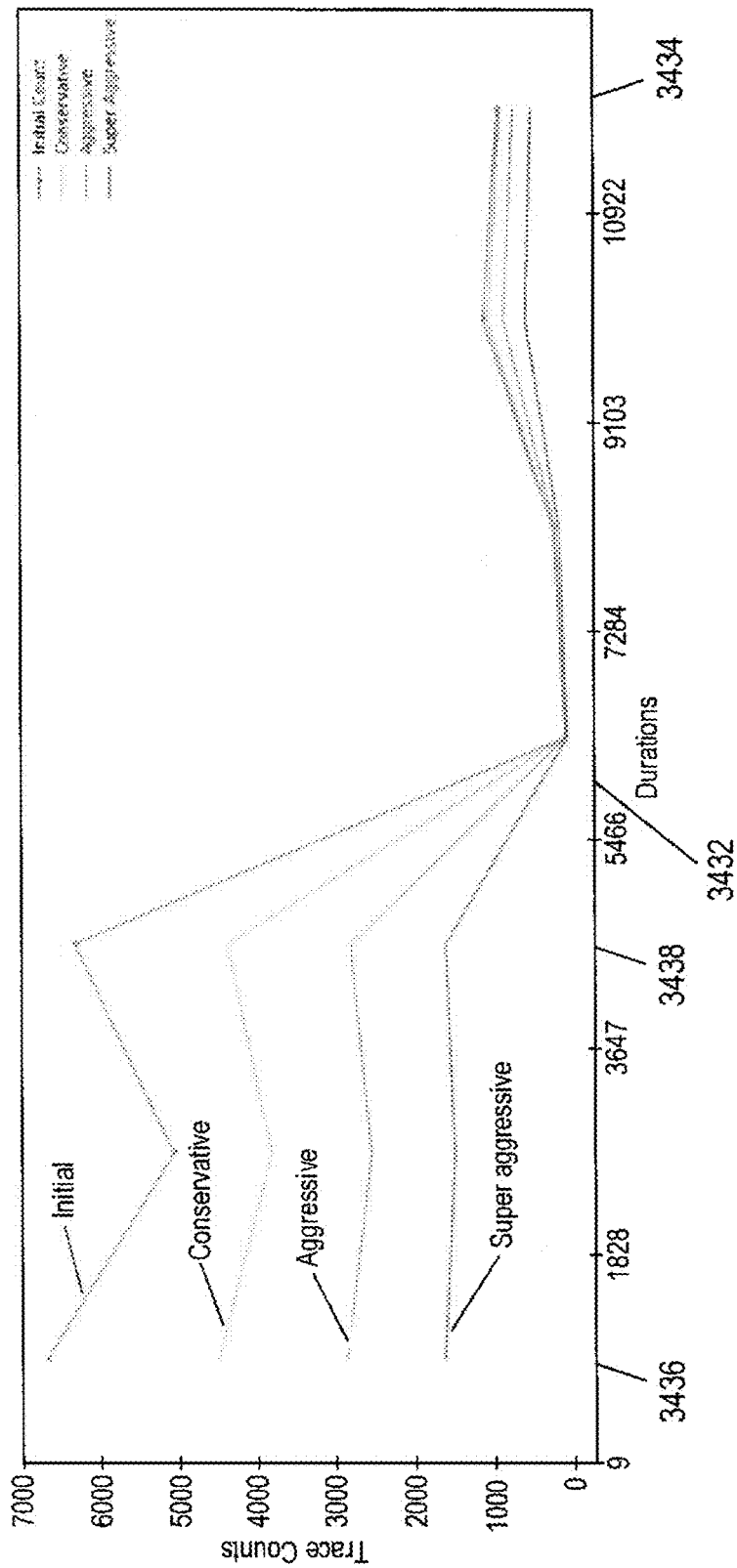

FIGS. 34E and 34F show sampling results obtained from performing duration sampling on the 20,425 traces. FIG. 34E show the intervals of a histogram that correspond to seven bins indexed in column 3420 from 0-6. Note the actual number of bins is larger due to outlying durations. Column 3422 labeled "Durations" shows the seven intervals, and column 3424 labeled "Initial" list the initial counts of the number of traces in each bin before sampling. Note that bins 0-2 contain the largest number of traces while bins 3 and 4 contain fewer traces. Sampling was performed as described above for each bin as described above with reference to Equation (9) with "conservative" sampling performed with α=1, "aggressive" performing with α=0.5, and "super aggressive" sampling performed with α=0.25. Columns 3426, 3428, and 3430 show the counts of sampled (i.e., preserved) traces for each of the 7 bins after sampling with the three different sampling rates. The conservative sampling preserves 73.1% of all traces with a compression rate 26.9%, aggressive sampling preserves 49.3% with a compression rate 50.7%, and the super aggressive sampling stores 29.5% with a compression rate 70.5%. FIG. 34F shows a plot of the number of traces (columns 3424, 3426, 3428, and 3430) with different durations before and after applying the three different sampling rates used to obtain the results in FIG. 34E. The plot shows that duration sampling preserved traces from the rare durations (e.g., little difference between sampled durations 3432 and 3434) while larger sampling rates applied to more frequently occurring durations were sampled with smaller sampling rates (e.g., large differences between sampled durations 3436 and 3438). Duration sampling significantly reduced the number traces stored for the more frequently occurring durations while preserving most of the rarer durations.

Figure 34H:
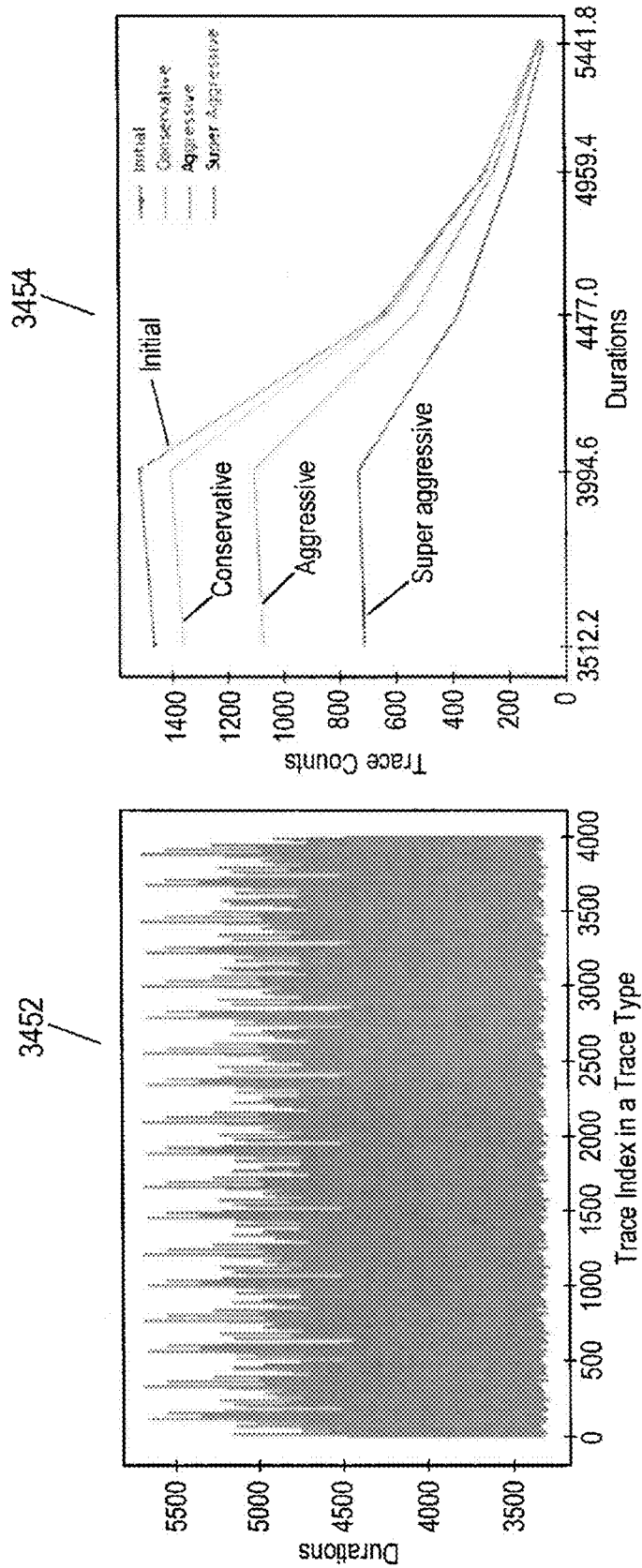

FIGS. 34G and 34H show sampling results obtained from performing hybrid sampling on trace type 1 of the 20,425 traces. In FIG. 34G. the frequency of occurrence 3440 of trace type 1 is 0.2 (i.e., 3,996/20,425). FIG. 34G show the histogram of durations for five bins labeled "Durations" in column 3442 and column 3444 labeled "N" is a count of the number of traces of trace type 1 in each bin before sampling. Sampling was performed as described above with reference to Equation (13) for each bin of the type 1 traces with "conservative" sampling performed with α=1, "aggressive" performing with α=0.5, and "super aggressive" sampling performed with α=0.25. Columns 3446, 3448, and 3450 show the counts of sampled (i.e., preserved) traces for each of the 5 bins after sampling. The conservative sampling stores 94.0% of all traces with a compression rate is 6%, aggressive sampling stores 76.0% with a compression rate 24.0%, and the super aggressive sampling stores 51.5% with a compression rate 48.5%. Plot 3452 in FIG. 34H shows a scatterplot of durations corresponding to trace type 1 described in FIG. 34G. Plot 3454 of FIG. 34H shows the trace counts after sampling. The plot shows that hybrid sampling with the different sampling rates preserved traces from the rare durations while sampling significantly reduced the number traces stored for the more frequently occurring.

It is appreciated that the previous description of the disclosed embodiments is provided to enable any person skilled in the art to make or use the present disclosure. Various modifications to these embodiments will be apparent to those skilled in the art, and the generic principles defined herein may be applied to other embodiments without departing from the spirit or scope of the disclosure. Thus, the present disclosure is not intended to be limited to the embodiments shown herein but is to be accorded the widest scope consistent with the principles and novel features disclosed herein.

The invention claimed is:

1. A method stored in one or more data storage devices and executed using one or more processors of a computer system for sampling traces of an application executed in a distributed computing system, the method comprising:
   determining different sampling rates for the traces based on frequency of occurrence of trace types that correspond to root spans of the traces and/or durations of the traces, wherein the different sampling rates are inversely proportional to the frequency of occurrence of the trace types and/or the durations;
   using the different sampling rates to sample traces stored in a data storage device or in a buffer such that less frequently occurring trace types are sampled with larger trace-type sample rates than more frequently occurring trace types and/or less frequently occurring durations are sampled with larger duration-sampling rates than more frequently occurring durations;
   deleting unsampled traces from the data storage device or from the buffer; and
   storing the sampled traces in the data storage device.

2. The method of claim 1 wherein determining the different sampling rates comprises:
   sorting the traces according to trace type to obtain one or more groups of traces, each group of traces having a different associated trace type;
   receiving a sampling level via a graphical user interface;
   determining a trace-type sampling parameter and a duration-sampling parameter based on the user-selected sampling level; and
   for each group of traces,
       determining a frequency of occurrence of a trace type associated with the group of traces,
       constructing a histogram of the durations, each bin of the histogram corresponding to a time interval and containing traces with durations in the time interval,
       determining a frequency of occurrence of traces in each bin of the histogram, and
       determining a hybrid sampling rate for each bin of the histogram based on the frequency of occurrence of traces in each bin, the frequency of occurrence of the trace type, the trace-type sampling parameter, and the duration-sampling parameter.

3. The method of claim 1 wherein determining the different sampling rates comprises:
sorting the traces according to trace type to obtain one or more groups of traces, each group of traces having a different associated trace type;
receiving a sampling level via a graphical user interface;
determining a trace-type sampling parameter based on the user-selected sampling level; and
for each group of traces,
determining a frequency of occurrence of a trace type associated with the group of traces, and
determining a trace-type sampling rate based on the frequency of occurrence of the trace type and the trace-type sampling parameter.

4. The method of claim 1 wherein determining the different sampling rates comprises:
receiving a sampling level via a graphical user interface;
determining a duration-sampling parameter based on the user-selected sampling level;
constructing a histogram of traces based on the durations, each bin of the histogram corresponding to a time interval and containing traces with durations in the time interval;
determining a frequency of occurrence of traces in each bin of the histogram; and
for each bin of the histogram, determining a duration-sampling rate based on the frequency of occurrence of traces in the bin and the duration-sampling parameter.

5. The method of claim 1 wherein determining the different sampling rates comprises:
computing a modified Gini index based on frequency of occurrences based on the at least one of trace types of the traces and durations of the traces;
computing a compression rate based on the modified Gini index;
computing a user-selected compression rate based on the sampling level;
computing a metric based the compression rate and the user-selected compression rate;
computing an adjusted sampling parameter based on the metric when the metric is less than an optimization threshold; and
adjusting the sampling rates based on the adjusted sampling parameter.

6. The method of claim 1 wherein determining the different sampling rates comprises:
computing modified Gini indices over a range of sampling parameter values, each modified Gini index corresponding to a different sampling parameter value;
identifying a modified Gini index of the modified Gini indices that corresponds to the sampling level;
using the modified Gini indices to determine a sampling parameter that corresponds to the modified Gini index; and
computing the sampling rates based on the sampling parameter.

7. The method of claim 1 wherein using the different sampling rates comprises:
sorting traces into groups of traces, wherein each group of traces includes traces with the same trace type; and
sampling each group of traces with one of the sampling rates, wherein for each group of traces the sampling rate is inversely proportional to a frequency of occurrence of the trace type in the trace.

8. The method of claim 1 wherein using the different sampling rate comprises:
sorting traces into bins of a histogram of the durations, each bin of the histogram corresponding to a time interval that contains traces with durations in the time interval; and
sampling traces in each bin with one of the sampling rates, wherein for each bin of the histogram the sampling rate is inversely proportional to a frequency of occurrence of the traces in the bin.

9. A computer system for sampling application traces of an application executed in a distributed computer system, the system comprising:
one or more processors;
one or more data storage devices; and
machine-readable instructions stored in the one or more data storage devices that when executed using the one or more processors controls the system to perform operations comprising:
determining different sampling rates for the traces based on frequency of occurrence of trace types that correspond to root spans of the traces and/or durations of the traces;
using the different sampling rates to sample traces stored in a data storage device or in a buffer, wherein less frequently occurring trace types and/or durations are sampled with larger sampling rates than sampling rates used to sample more frequently occurring trace types and/or durations;
deleting unsampled traces from the data storage device or from the buffer; and
storing the sampled traces in a the data storage device.

10. The computer system of claim 9 wherein determining the different sampling rates comprises:
sorting the traces according to trace type to obtain one or more groups of traces, each group of traces having a different associated trace type;
receiving a sampling level via a graphical user interface;
determining a trace-type sampling parameter and a duration-sampling parameter based on the user-selected sampling level; and
for each group of traces,
determining a frequency of occurrence of a trace type associated with the group of traces,
constructing a histogram of the durations, each bin of the histogram corresponding to a time interval and containing traces with durations in the time interval,
determining a frequency of occurrence of traces in each bin of the histogram, and
determining a hybrid sampling rate for each bin of the histogram based on the frequency of occurrence of traces in each bin, the frequency of occurrence of the trace type, the trace-type sampling parameter, and the duration-sampling parameter.

11. The computer system of claim 9 wherein determining the different sampling rates comprises:
sorting the traces according to trace type to obtain one or more groups of traces, each group of traces having a different associated trace type;
receiving a sampling level via a graphical user interface;
determining a trace-type sampling parameter based on the user-selected sampling level; and
for each group of traces,
determining a frequency of occurrence of a trace type associated with the group of traces, and determining a trace-type sampling rate based on the frequency of occurrence of the trace type and the trace-type sampling parameter.

12. The computer system of claim 9 wherein determining the different sampling rates comprises:
    receiving a sampling level via a graphical user interface;
    determining a duration-sampling parameter based on the user-selected sampling level;
    constructing a histogram of traces based on the durations, each bin of the histogram corresponding to a time interval and containing traces with durations in the time interval;
    determining a frequency of occurrence of traces in each bin of the histogram; and
    for each bin of the histogram, determining a duration-sampling rate based on the frequency of occurrence of traces in the bin and the duration-sampling parameter.

13. The computer system of claim 9 wherein determining the different sampling rates comprises:
    computing a modified Gini index based on frequency of occurrences based on the at least one of trace types of the traces and durations of the traces;
    computing a compression rate based on the modified Gini index;
    computing a user-selected compression rate based on the sampling level;
    computing a metric based the compression rate and the user-selected compression rate;
    computing an adjusted sampling parameter based on the metric when the metric is less than an optimization threshold; and
    adjusting the sampling rates based on the adjusted sampling parameter.

14. The computer system of claim 9 wherein determining the different sampling rates comprises:
    computing modified Gini indices over a range of sampling parameter values, each modified Gini index corresponding to a different sampling parameter value;
    identifying a modified Gini index of the modified Gini indices that corresponds to the sampling level;
    using the modified Gini indices to determine a sampling parameter that corresponds to the modified Gini index; and
    computing the sampling rates based on the sampling parameter.

15. The computer system of claim 9 wherein using the different sampling rates comprises:
    sorting traces into groups of traces, wherein each group of traces includes traces with the same trace type; and
    sampling each group of traces with one of the sampling rates, wherein for each group of traces the sampling rate is inversely proportional to a frequency of occurrence of the trace type in the trace.

16. The computer system of claim 9 wherein using the different sampling rate comprises:
    sorting traces into bins of a histogram of the durations, each bin of the histogram corresponding to a time interval that contains traces with durations in the time interval; and
    sampling traces in each bin with one of the sampling rates, wherein for each bin of the histogram the sampling rate is inversely proportional to a frequency of occurrence of the traces in the bin.

17. A non-transitory computer-readable medium encoded with machine-readable instructions that when executed by one or more processors of a computer system perform operations comprising:

determining different sampling rates for the traces based on frequency of occurrence of trace types that correspond to root spans of the traces and/or durations of the traces;
using the different sampling rates to sample traces stored in a data storage device or in a buffer, wherein less frequently occurring trace types and/or durations are sampled with larger sampling rates than sampling rates used to sample more frequently occurring trace types and/or durations;
deleting unsampled traces from the data storage device or from the buffer; and
storing the sampled traces in a the data storage device.

18. The medium of claim 17 wherein determining the different sampling rates comprises:
    sorting the traces according to trace type to obtain one or more groups of traces, each group of traces having a different associated trace type;
    receiving a sampling level via a graphical user interface;
    determining a trace-type sampling parameter and a duration-sampling parameter based on the user-selected sampling level; and
    for each group of traces,
        determining a frequency of occurrence of a trace type associated with the group of traces,
        constructing a histogram of the durations, each bin of the histogram corresponding to a time interval and containing traces with durations in the time interval,
        determining a frequency of occurrence of traces in each bin of the histogram, and
        determining a hybrid sampling rate for each bin of the histogram based on the frequency of occurrence of traces in each bin, the frequency of occurrence of the trace type, the trace-type sampling parameter, and the duration-sampling parameter.

19. The medium of claim 17 wherein determining the different sampling rates comprises:
    sorting the traces according to trace type to obtain one or more groups of traces, each group of traces having a different associated trace type;
    receiving a sampling level via a graphical user interface;
    determining a trace-type sampling parameter based on the user-selected sampling level; and
    for each group of traces,
        determining a frequency of occurrence of a trace type associated with the group of traces, and
        determining a trace-type sampling rate based on the frequency of occurrence of the trace type and the trace-type sampling parameter.

20. The medium of claim 17 wherein determining the different sampling rates comprises:
    receiving a sampling level via a graphical user interface;
    determining a duration-sampling parameter based on the user-selected sampling level:
    constructing a histogram of traces based on the durations, each bin of the histogram corresponding to a time interval and containing traces with durations in the time interval;
    determining a frequency of occurrence of traces in each bin of the histogram; and
    for each bin of the histogram, determining a duration-sampling rate based on the frequency of occurrence of traces in the bin and the duration-sampling parameter.

21. The medium of claim 17 wherein determining the different sampling rates comprises:

computing a modified Gini index based on frequency of occurrences based on the at least one of trace types of the traces and durations of the traces;

computing a compression rate based on the modified Gini index:

computing a user-selected compression rate based on the sampling level;

computing a metric based the compression rate and the user-selected compression rate;

computing an adjusted sampling parameter based on the metric when the metric is less than an optimization threshold; and adjusting the sampling rates based on the adjusted sampling parameter.

22. The medium of claim 17 wherein determining the different sampling rates comprises:

computing modified Gini indices over a range of sampling parameter values, each modified Gini index corresponding to a different sampling parameter value;

identifying a modified Gini index of the modified Gini indices that corresponds to the sampling level;

using the modified Gini indices to determine a sampling parameter that corresponds to the modified Gini index; and computing the sampling rates based on the sampling parameter.

23. The medium of claim 17 wherein using the different sampling rates comprises:

sorting traces into groups of traces, wherein each group of traces includes traces with the same trace type; and sampling each group of traces with one of the sampling rates, wherein for each group of traces the sampling rate is inversely proportional to a frequency of occurrence of the trace type in the trace.

24. The medium of claim 17 wherein using the different sampling rate comprises:

sorting traces into bins of a histogram of the durations, each bin of the histogram corresponding to a time interval that contains traces with durations in the time interval; and sampling traces in each bin with one of the sampling rates, wherein for each bin of the histogram the sampling rate is inversely proportional to a frequency of occurrence of the traces in the bin.

* * * * *